United States Patent
Lee

(10) Patent No.: US 6,836,483 B1
(45) Date of Patent: Dec. 28, 2004

(54) MESSAGE SYSTEM FOR ASYNCHRONOUS TRANSFER

(75) Inventor: Kenny Ying Theeng Lee, Duluth, GA (US)

(73) Assignee: Research Investment Network, Inc., Irvine, CA (US)

( * ) Notice: Subject to any disclaimer, the term of this patent is extended or adjusted under 35 U.S.C. 154(b) by 0 days.

(21) Appl. No.: 09/338,935

(22) Filed: Jun. 23, 1999

Related U.S. Application Data

(60) Provisional application No. 60/090,441, filed on Jun. 24, 1998.

(51) Int. Cl.[7] .............................................. H04L 12/56
(52) U.S. Cl. ............................ 370/395.31; 370/395.71; 370/429
(58) Field of Search .......................... 370/395.1, 395.3, 370/395.31, 395.32, 395.7, 395.71, 396, 397, 398, 399, 409, 429, 473

(56) References Cited

U.S. PATENT DOCUMENTS

| | | | |
|---|---|---|---|
| 5,113,392 A | * 5/1992 | Takiyasu et al. ............. 370/473 |
| 5,414,702 A | * 5/1995 | Kudoh ...................... 370/395.7 |
| 5,450,399 A | * 9/1995 | Sugita ......................... 370/392 |
| 5,519,690 A |   5/1996 | Suzuka et al. |
| 5,521,917 A | * 5/1996 | Watanabe et al. ........... 370/399 |
| 5,555,256 A | * 9/1996 | Calamvokis ................. 370/399 |
| 5,602,830 A |   2/1997 | Fichou et al. |
| 5,790,804 A |   8/1998 | Osborne |
| 5,884,297 A |   3/1999 | Noven |
| 6,034,958 A | * 3/2000 | Wicklund ............... 370/395.32 |

\* cited by examiner

*Primary Examiner*—Min Jung
(74) *Attorney, Agent, or Firm*—Keiji Masaki; Steve A. Wong; Micah P. Goldsmith

(57) ABSTRACT

An asynchronous transfer mode system operates using virtual addresses VPI and VCI. Cells including these addresses are received. The data associated with these cells is stored in a table. The table contents are advantageously accessed according to a connection number. The proper connection number is more easily found by using two variables. A first variable is associated with a number of active connections. A second variable is associated with the last-used index in the table.

19 Claims, 37 Drawing Sheets

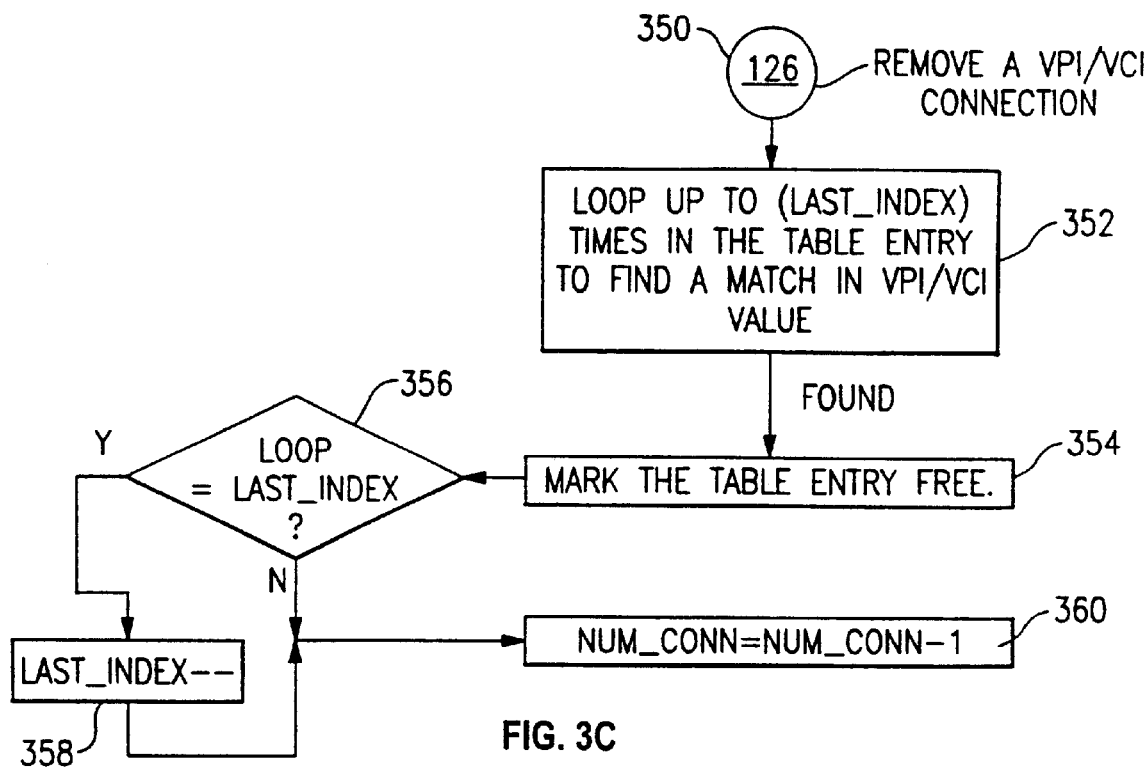
FIG. 3C
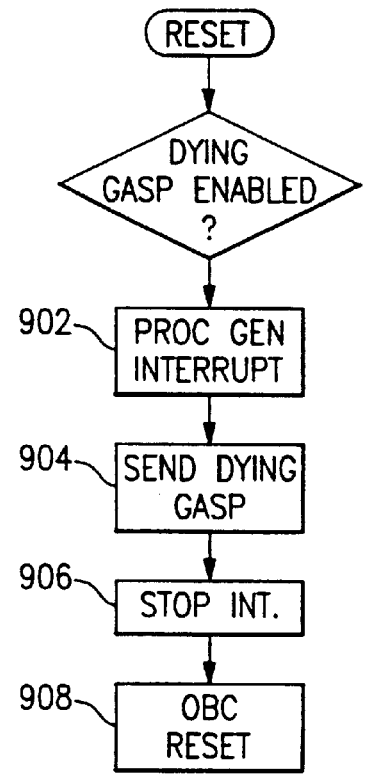
FIG. 7
FIG. 9

| SERVICEMONITOR PROPERTIES | ? X |
|---|---|
| SERVICES | ATM INTERFACE | OPTIONS | ADSL MODEM PARAMETERS | ADSL MODEM COUNTERS |

MODE: [     ]    FIRWARE VENDOR/VERSION: [                    ]

CURRENT OPERATIONAL LINE PARAMETERS
- ⊙ MODEM    ○ REMOTE END
- ATTENUATION: [    ] (DB)   RELATIVE CAPACITY OCCUPATION: [    ] (KBITS/S)
- NOISE MARGIN: [    ] (DB)   MAX ATTAINABLE BANDWIDTH: [    ] (KBITS/S)
- OUTPUT POWER: [    ] (DB)   ACTUAL BIT RATE: [    ] (KBITS/S)
- CARRIER LOAD: [                    ]

[DISCONNECT MODEM]

[ OK ]  [ CANCEL ]  [ APPLY ]  [ HELP ]

---

| SERVICEMONITOR PROPERTIES | ? X |
|---|---|
| SERVICES | ATM INTERFACE | OPTIONS | ADSL MODEM PARAMETERS | ADSL MODEM COUNTERS |

MODE: [     ]    FIRWARE VENDOR/VERSION: [                    ]

DEFECTS (LOSS OF)
- ○ MODEM    ○ REMOTE END
- CELL DELINEATION: [    ] (COUNT)   POWER: [    ] (COUNT)
- SIGNAL: [    ] (COUNT)   FRAME: [    ] (COUNT)

CHANNEL PERFORMANCE
- HEC VIOLATION: [    ] (COUNT)   CODE VIOLATION: [    ] (COUNT)
- FEC'S CORRECTED: [    ] (COUNT)   POLLING TIME: [    ] (PO:PP)
- ERRORED SECONDS: [    ] (SEC)

[ OK ]  [ CANCEL ]  [ APPLY ]  [ HELP ]

FIG. 25

MESSAGE SYSTEM FOR ASYNCHRONOUS TRANSFER

CROSS REFERENCE TO RELATED APPLICATIONS

This application claims the benefit of U.S. Provisional Application No. 60/090,441, filed Jun. 24, 1998.

FIELD

The disclosed system teaches a way of simplifying messages in asynchronous transfer mode. The present system specifically teaches specifying connection ranges among various information to simplify the connection.

BACKGROUND

Asynchronous transfer mode or ATM is a telecommunications protocol that allows packet based transfer of information. Cells of information are sent across an information network defined by a number of nodes. The information is sent from node-to-node.

An ATM transport network (i.e., a communication network which transmits information using ATM cell packets) is known to include an ATM layer and a physical layer. The ATM layer is based on the virtual path/virtual channel (VP/VC) concept. The VC identifies a unidirectional communication capability through which ATM cells are transported. One or more virtual channels (VCs) can be used in a particular virtual path (VP), which also identifies another level of the communication capability through which the ATM cells are transported.

An ATM cell is the smallest information unit. It includes a header field of 5 bytes or octets, and a payload field of 48 bytes or octets. The header field includes VP and VC identifiers. These identifiers are used for routing the information to an intended destination.

Communication in known ATM networks is initiated during a connection setup, after which cells belonging to one connection follow a predetermined path defined by the VPI and VCI on a particular link. The connection control information transferred during setup utilizes a unique Signalling VC (SVC) which is included in the VP. The SVC is identified by the virtual path ID (VPI) and virtual channel ID (VCI).

Cells destined for many different end points are sent over a single physical communications circuit. The header of each cell includes a channel identifier which is used to control the routing of the cell through the ATM system. The channel identifier determines routing of the cell.

In a typical ATM system there are 256 possible VIPs and 65,536 possible VCIs; thus, there are 16,777,216 possible channel indentifiers (VP/VCIs). One of the many challenges in designing an ATM network is how to handle this huge number of connections.

Specified traffic control protocols are used to determine the routing of the information. The routing is controlled using conventional addressing techniques.

Further details of ATM are well known in the art. In addition, different flavors and sub-types of ATM are known, including digital subscriber line ("DSL"), assymetric digital subscriber line ("ADSL"), and other flavors of digital subscriber line ("XDSL").

In all of these communication modes, a message is broken into multiple portions or cells. A conventional ATM system breaks the total message to be sent over ATM into 48 byte data portions. A typical data message might be, for example, 1500 bytes in length. Hence, the 1500 byte message is divided up into 31 of the 48 byte cells.

The ATM message is sent into the ATM environment with 48 byte increments, each addressed by 24 bits of VPI/VCI to instruct where the package is going.

The recipient node needs to form this data together into the original size. That original recipient receives a mixed message within multiple cells, typically having multiple VPIs and VCIs.

One way to handle the mixed message is to place each of the messages into a buffer as received, and remove the different cells from the buffer to form one total message.

This system includes certain limitations. For instance, if the VPI is used as an index to the buffer, the amount of memory for the addressing scheme can increase, and make it difficult to review the contents. Searching the array can take large amounts of processing power and memory. As the number of VPI/VCI connections increases, the array size can grow exponentially.

The present system teaches a simplified system.

SUMMARY

The present specification, in recognition of the above, defines an improved way of handling a message from a system which divides total messages into divided cells. Each of the cells is associated with an address. In a disclosed mode, that address can be a virtual address. A table is stored in memory which includes a list of connection number, address, and data for each of the connection number. Each of the cells is stripped of its address, associated with the connection number, and the data associated with that cell is put into the table. The table stores a plurality of information pieces about a number of simultaneous connections.

Access to the table is simplified by defining at least one variable associated with all of the simultaneous messages in the table. This variable is a variable that facilitates searching the table. One possible variable is a variable associated with the number of connections. Another variable is associated with the length of the table, e.g., the last-used index. In one disclosed mode, two variables are used, one of which is related to the last index, and the other which is related to the number of connections. If the two variables are equal, then the table is full, and the next entry in the table can be used for a new connection. Otherwise, the system can search to a value no higher than the last-used index, and by so doing, search less than all of the total number of values in the table.

The hardware and firmware forming a network interface card is also disclosed.

BRIEF DESCRIPTION OF THE DRAWINGS

These and other aspects will be described in detail with respect to the accompanying drawings, wherein:

FIGS. 3A–3C show flowcharts of software operations.

FIG. 7 shows different user selectable operations;

FIG. 9 shows dying gas used during reset;

FIG. 10 shows a power supply layout;

FIG. 25 shows the setup of network performance for global ATM;

DETAILED DESCRIPTION

Figure 1:
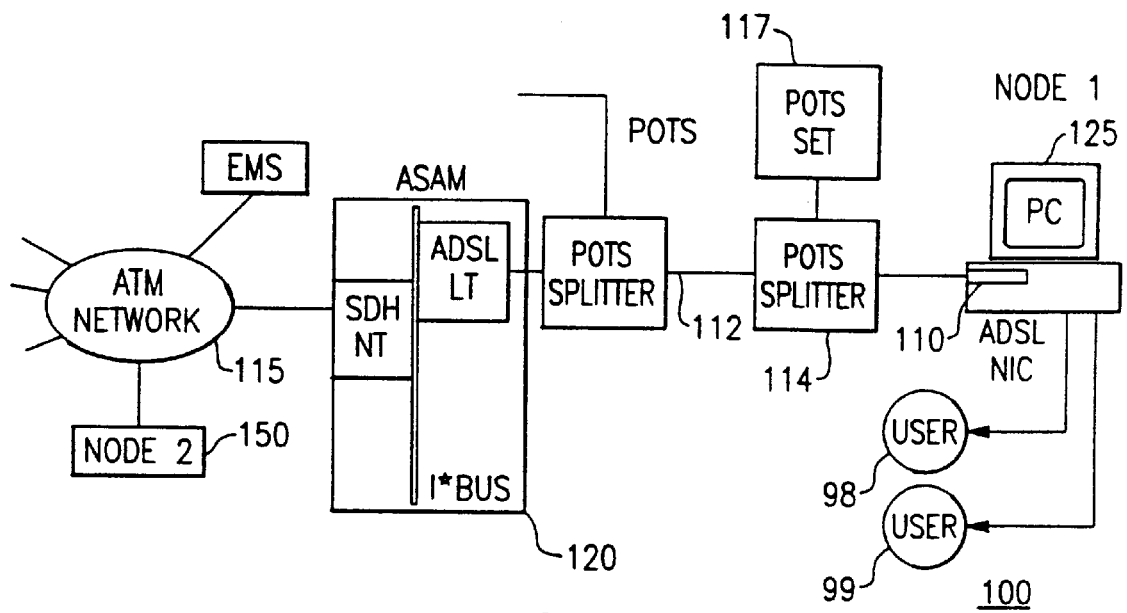
FIG. 1 shows a general network architecture of an ATM network.

The overall block diagram of the general network architecture is shown in FIG. 1. The embodiments described herein can operate as part of an ATM system. An ADSL interface card for communicating with an ADSL network is described. More generally, however, this system can operate within any system that carries out data communication by dividing a total message into separate addressed packets, or more specifically in an asynchronous transfer mode system.

A PC 125 is, for example, an Internet service provider that provides Internet service to a number of users 98, 99, and others that are not shown. PC 125 includes an ADSL network interface card or "NIC" 110. NIC 110 connects to the telephone line 112 via a plain old telephone system (POTS) splitter 114. Other POTS equipment 117 can include conventional telephone equipment.

A conventional ATM subscriber access multiplexer or "ASAM" 120 connects from telephone line 112 to ATM network 115. The ASAM 120 multiplexes a number of communications via the ATM network 115. In this system, the NIC 110 becomes a node connecting to the ATM network 115 which allows routing to other nodes, such as second node 150. While only one second node 150 is shown, the ATM network is typically connected to literally thousands of other nodes shown generally in FIG. 1. Any of the multiple nodes can send or receive a message. The connection among these nodes are based on their VCI/VPI identifiers.

Node 1 receives a number of cells that will form ATM messages.

Figure 2A:
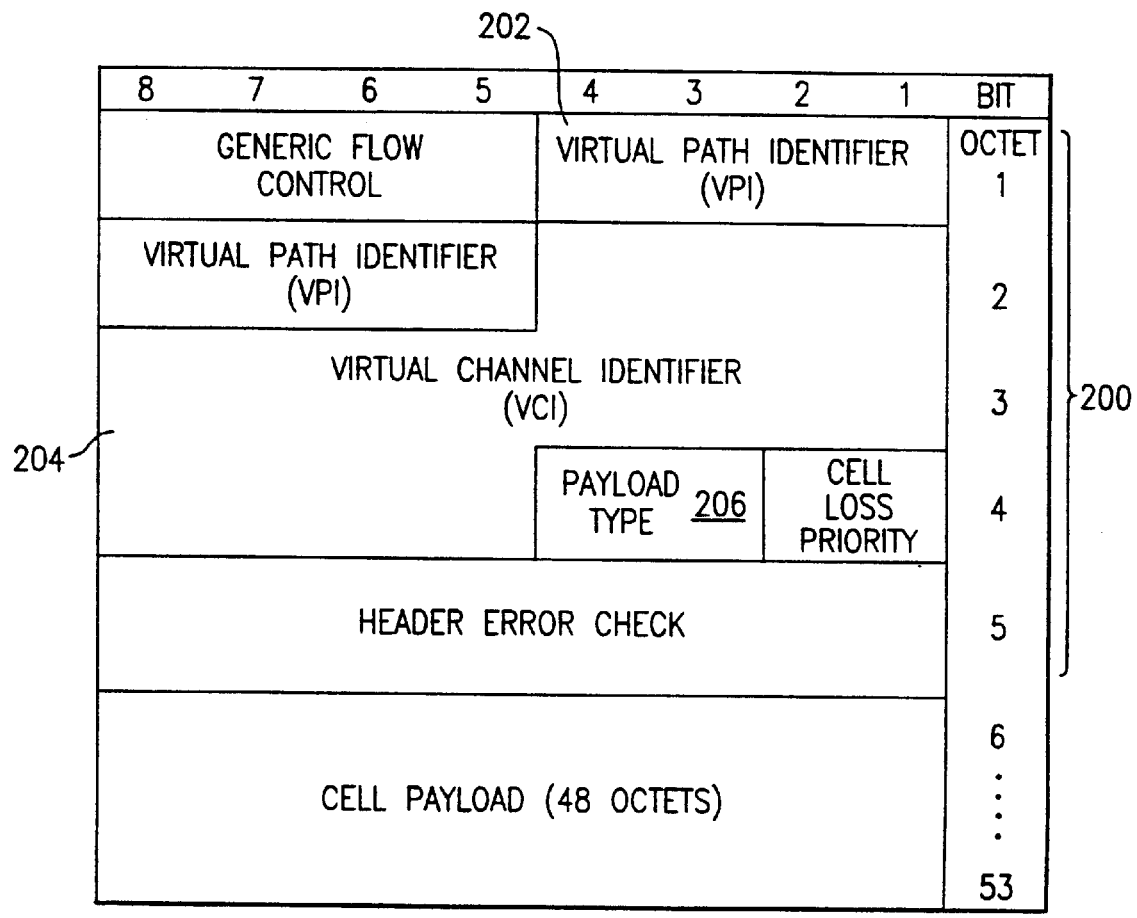
FIGS. 2A–2C shows a VPI/VCI header; along with other associated memory structures according to an embodiment of the present invention.

Each cell is of the general form shown in FIG. 2A. A 5 byte ("Octet") header 200 includes the virtual path identifier 202, virtual channel identifier 204, payload type 206, and other conventional ATM control data.

When the cells arrive at the NIC 110, the 5 bytes of header information are used to determine how to reconstruct the entire message among the multiple messages that are sent at once.

A typical way to operate is to put the entire information, including the 5 byte header information, into a buffer in memory, e.g., an array. The array could be addressed using the VPI and VCI as addresses to the array.

Figure 2B:
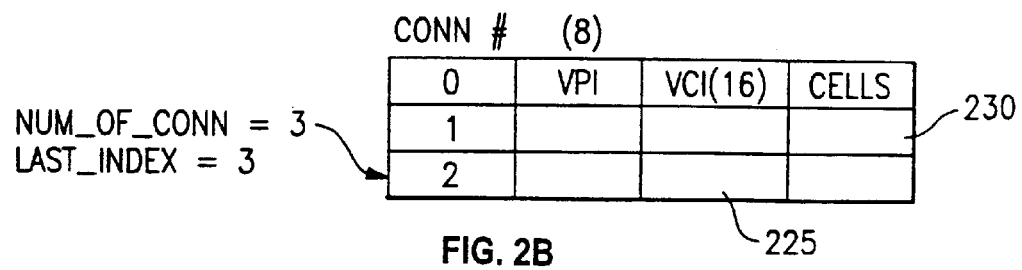

The disclosed system uses a special memory table 225 shown in FIG. 2B. Two additional variables are also maintained, related to all of the entries in the table 225. A first variable is related to the number of active messages, and defines the total current number of connections ("num_of_conn"). A second variable defines the last used index in the table ("last_index").

A connection number is defined for each message. The connection number can be, for example, between 0–31, thereby allowing 32 simultaneous connections. This connection number can be expressed as one byte of information.

The remainder of the table entry includes the 8 bit VPI and the 16 bit VCI corresponding to the connection number. The cell contents from the multiple cells of the message are filled into the table entry field 230.

The num_of_conn variable represents the number of current active connections within the table. FIG. 2B shows three connections, and therefore num_of_conn=3.

The last_index variable represents the last free index in the table entries, here again 3.

Figure 2C:
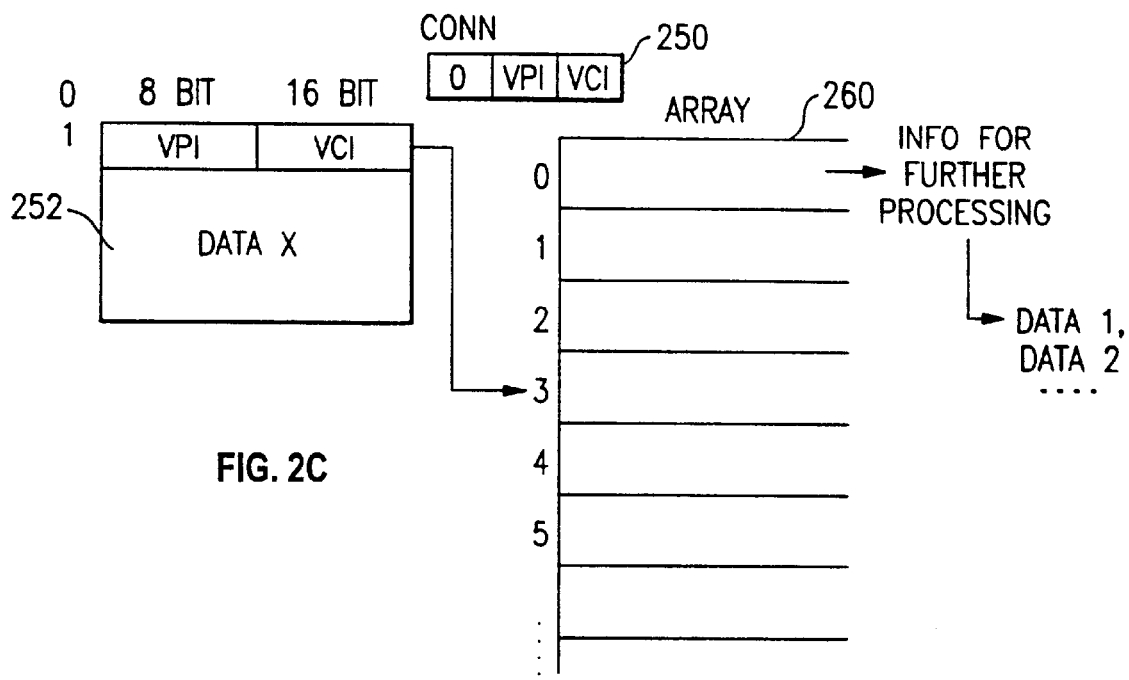

An alternative table form is shown in FIG. 2C. In this system, there are two tables. A first table part 250 translates between the VPI/VCI of an incoming cell 252, and its connection number. A second table part 260 arranges each of the data1, data2, data3 of the cells into a table arranged by connection numbers.

This table and variables are kept up-to-date with each new connection and each dropped connection as described herein. The ADSL NIC includes an internal controller that operates according to the flowcharts described herein to process the cells. The detailed operation is shown with respect to the flowcharts of FIGS. 3A–3C.

A cell arrives at step 304, having the general form shown in FIG. 2A.

At step 310, the cell header 200 is extracted, which provides the addressing information from its VPI/VCI. At this time, error checking can be carried out in conventional ways, and the VPI and VCI values are removed. The VPI and VCI values are used as addressing information and translated into connection numbers.

At step 315, a loop is formed from 0 up to the value of last_index value. Step 316 compares each VPI/VCI in the table against the current VPI/VCI from the received cell at 316. If there is a match, flow passes to step 320 where the current cell is added to the cells 230 for the current connection number. If not, the loop is compared against last_index at 317. If the loop value is greater than or equal to last_index, the current VPI/VCI is not in the table. The add_connection routine is called at 321. Otherwise, the loop value is incremented at 318, and the next value is tested.

Therefore, each VPI/VCI is handled as an connection number of 0–N, where N is the maximum allowed number of simultaneous messages. A typical value for N might be 32.

Importantly, the total allowed number of simultaneous messages does not increase the length of the search. Instead, the maximum search ends at the last_index value which represents the last-index that is used. The search length is increased only by the number of existing active connections instead of the numbers of allowed connections.

The add_connection writes new VPI/VCI values to the table index. This is carried out according to the routine shown in FIG. 3B.

Step 330 first determines if the number of connections variable (num_conn) is equal to the last-index variable (last_index). If so, then as in the example of FIG. 2B, the table is currently full. The system then uses the next consecutive entry after last_index as shown in step 332. The table entry corresponding to the last_index is set to the current VPI/VCI address at 332, and both the last_index and num_conn are incremented.

As described herein, when a connection is terminated, a value will be removed from the table, leaving a space in the table. The space is noted by setting the VPI/VCI value to all 0's. In that case, num_conn will not be equal to last_index at 330.

The flowchart passes to step 334 which carries out an error checking routine to first determine if num_conn is less than last_index. If not, an error is established at step 336.

If the num_conn is less than last_index, however, step 338 illustrates a loop from 0 up to the last_index value, to find a free table entry. That free table entry is then set to the current VPI/VCI at 340. Num_conn and last_index are both incremented at step 342.

Figure 3A:
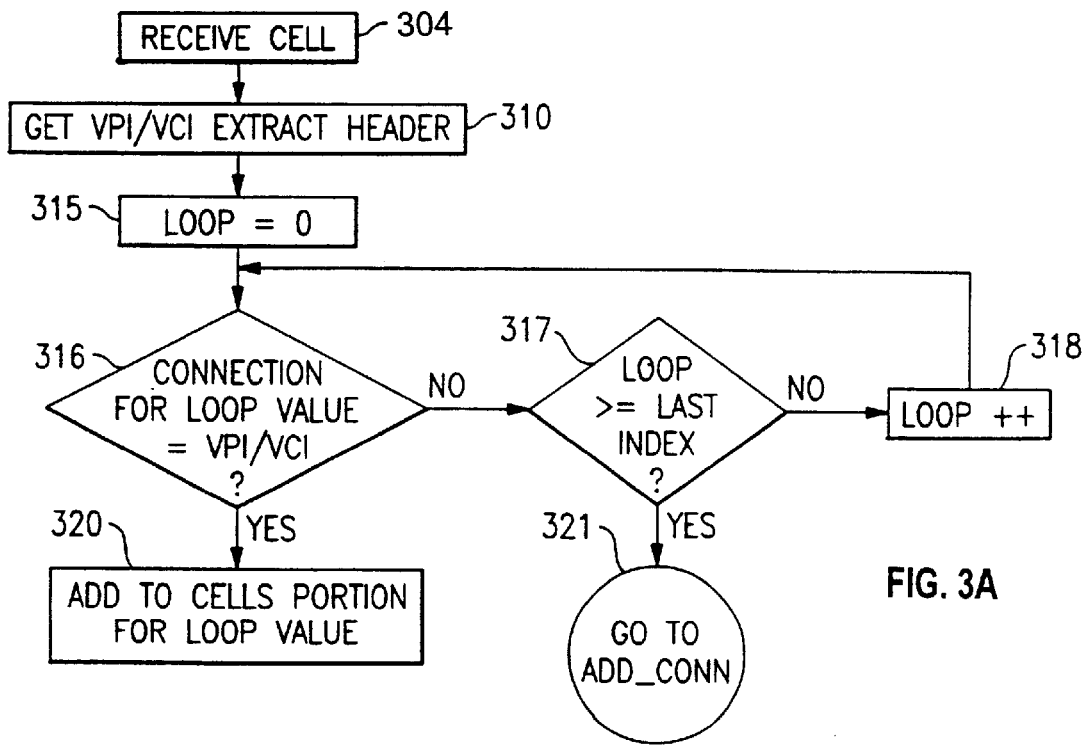
Figure 3B:
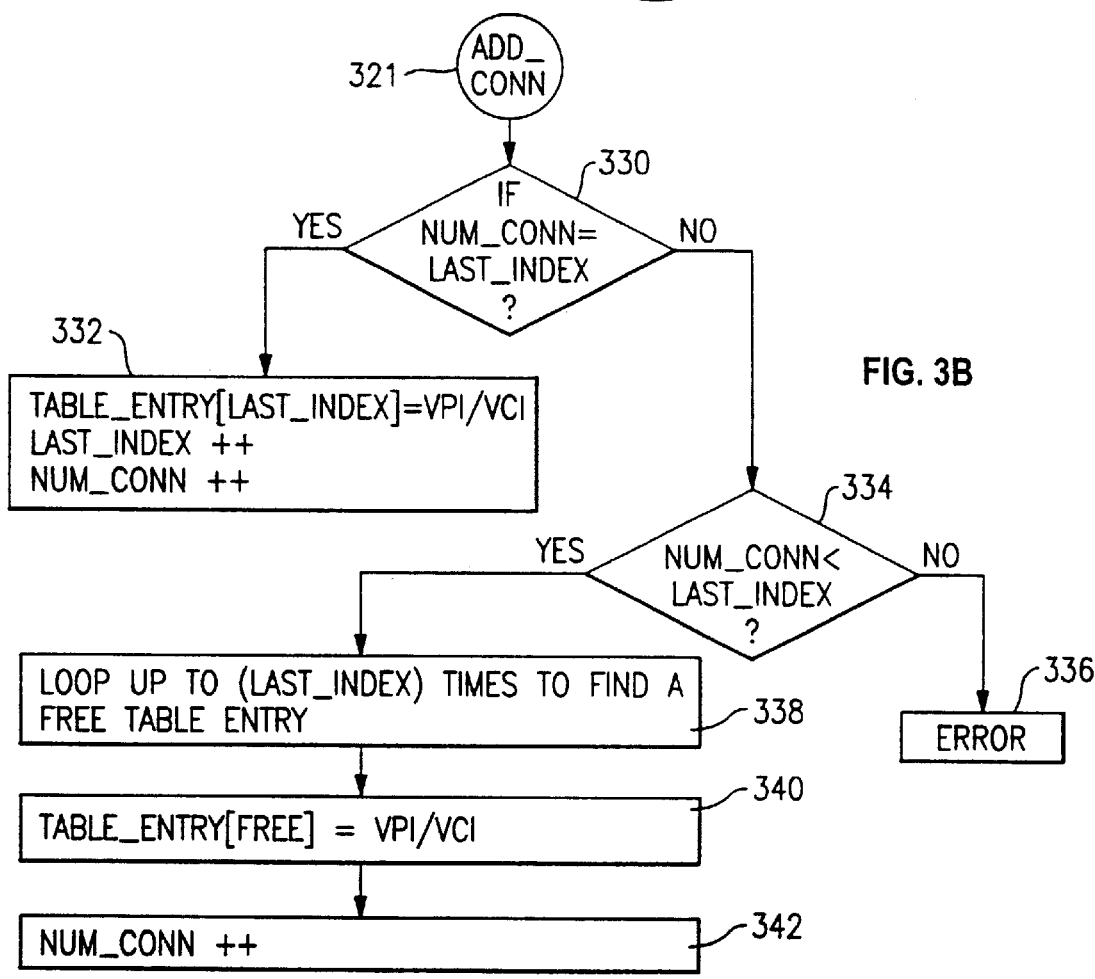

A VPI/VCI connection can also be removed as illustrated in FIG. 3C. Termination of an ATM message is known in the art. When a message is complete, the message being terminated passes its VPI/VCI address to the routine of FIG. 3C. This is received at step 350. Step 352 loops up to the value of last_index to find a match to the current VPI/VCI value. This is similar to steps 315, 316, 317 in FIG. 3A.

At step 354, the determined table entry is marked as being free by setting the VPI/VCI to all zeros. The number of connections is also decremented. However, last_index is not decremented unless the last entry in the table is being removed.

Step 356 shows determining if the current loop value= last_index. If so, last_index is decremented at 358. In either case, num_conn is decremented at 360.

Hence, this addressing becomes relatively simplified. The data from the cells is stored in an improved way. Moreover, the inherent way in which the information is stored automatically sorts the information into a more logical order.

The use of the two variables, including one that indicates the number of connections, and another that indicates the last information that is free, enables searching fewer than the total number of connections each time a cell is received. When the entire used part of the table is full, no searching needs to be done at all to add a new VPI/VCI. When the table is not full, the search continues only until the first empty point is reached. Even though a connection may be removed anywhere in the table, the search need not always search every entry. In fact, this search technique will never search the entire array, since if the array were full, num_conn would equal last_index.

Another routine, not shown, could periodically "crunch" the table 225 to remove blanks therein. This could be done on a timed basis, or when the activity gets below a certain level.

The previous discussion has referred to flowcharts, and it should be understood that these operations could be carried out by executing code in processors, in dedicated hardware that is formed using hardware definition language to effect these flowcharts, in firmware, or in any other form.

One disclosed embodiment which is described uses an internal PC printed circuit board as the NIC that implements the operation using firmware. This system described in the following uses a special processor on the NIC, along with PCI translator device formed using ATML's "HYDROGEN" chip set. This hydrogen firmware includes download software, control information passing, and POST initiation.

Figure 4:
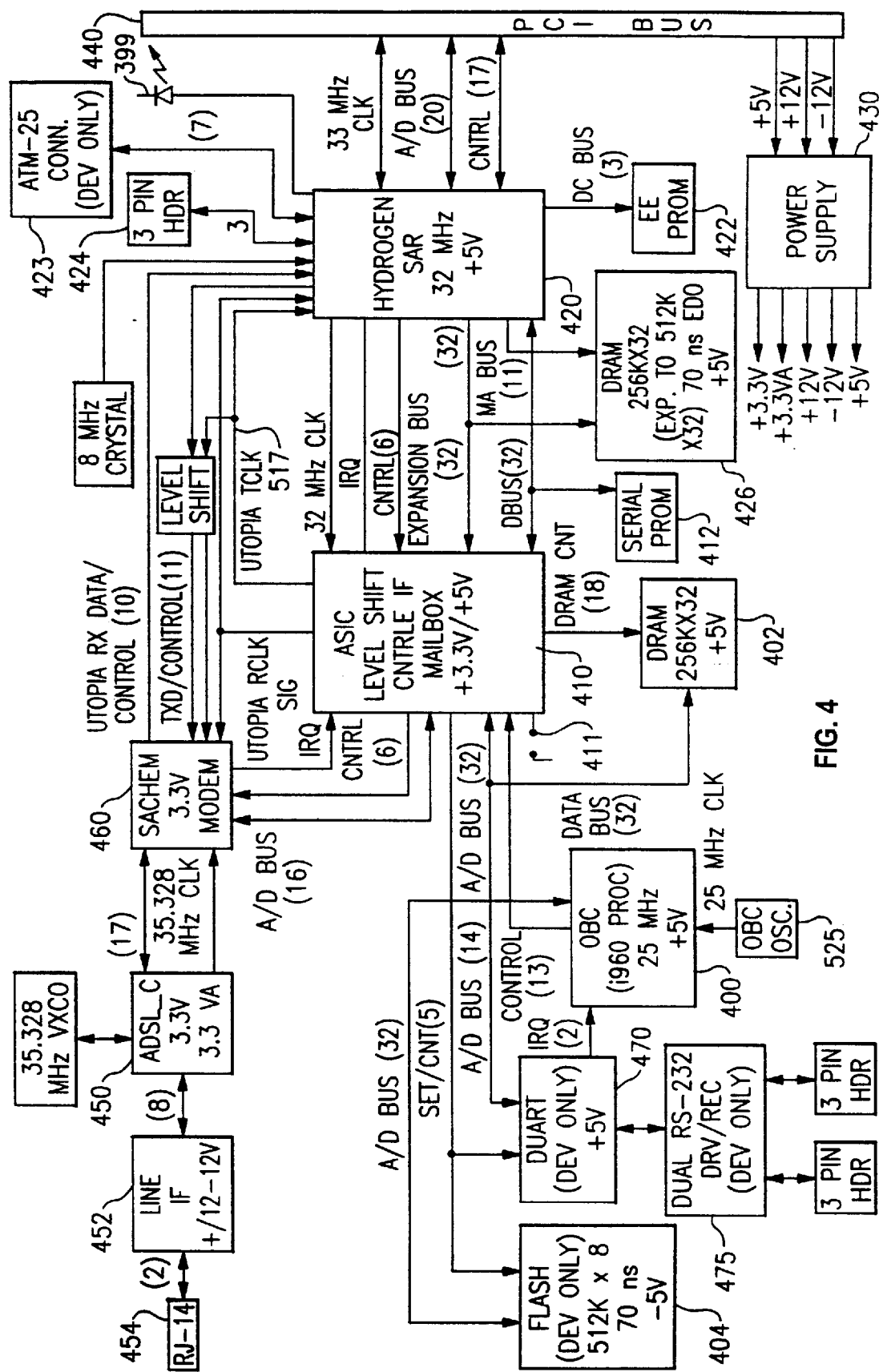
FIG. 4 shows a block diagram of the network interface card preferably used according to the present system.

The disclosed embodiment uses an internal PC printed circuit card in the PCI form factor. A block diagram of the board is shown in FIG. 4. The board includes, inter alia, an On Board Controller 400 ("OBC") that can include a processor, an FPGA/ASIC assembly 410, an SAR "Hydrogen" chip set 420, power supply 430, and PCI bus connector 440. The assembly runs Modem initialization, Power on Self Test (POST), performance monitoring, and control interface routines among others.

The Hydrogen 420 includes firmware that runs download software, control information passing, and POST initiation.

The ADSL NIC-ATM conforms to all physical requirements for a full size PCI bus card. Throughout this document, all references to the PCI bus are as defined in the PCI Local Bus Specification, Revision 2.1.

The ADSL NIC-ATM has the following dimensions:

| | |
|---|---|
| Length | 12.283" +/− 0.005" |
| Height | 4.21" +/0 0.05" |
| Assy. thickness | <0.745" |
| PCB thickness | 0.062" +/− 0.008" |
| Comp. height (comp.) | <0.57" |
| Comp. height (back side) | <0.105" |

The ADSL NIC-ATM PCB edge connector is configured as a 32 bit, 5 volt PCI bus interface card. An external interface is through an RJ-14 PCB mount connector using pins 2 and 5. This connector is accessed through a card edge mounting plate mounted on the PCB. An optional RJ-45 connector can be provided as a "stuffing" option, i.e. an option that can be added on to the basic structure.

At least one red/green bi-color LED 399 is mounted on the PCB in a location to be visible through the card edge mounting plate.

Figure 5:
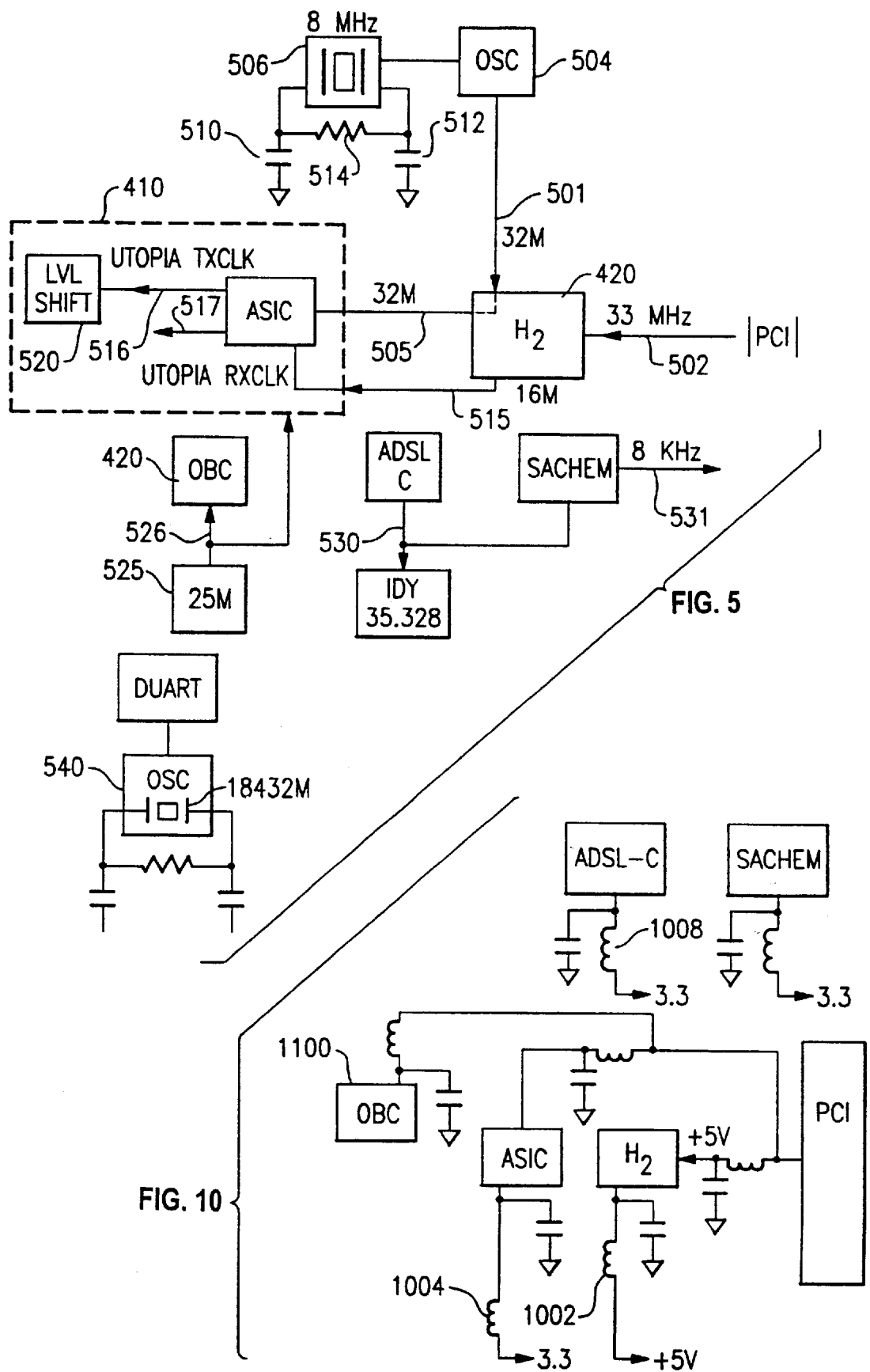
FIG. 5 shows a block diagram showing the clocking of the present system.

Clock distribution on the board requires multiple domains. The different clocks and their formation are illustrated in FIG.5. This includes Clock domains that exist on the Hydrogen IC, the PCI clock domain and the ARM 400 clock also have their own domains.

The Hydrogen chip takes the PCI 33 MHZ clock 502 from the No PCI bus edge connector 440 to the Hydrogen IC 420. The Hydrogen IC is placed to minimize the distance of this clock routing.

The Hydrogen 420 operates at 32 MHZ internally. This 32 MHZ clock 505 is derived from a 8 MHZ oscillator 504 connected to an external 8 MHZ crystal 502. The 8 MHZ crystal is placed to minimize the oscillator input and output trace lengths. Each side of the crystal is coupled to ground through 12 pF caps 510, 512. A 1 M ohm shunt resistor 514 across the crystal is also provided.

The 32 MHZ clock 505 is also output from the Hydrogen IC to the ASIC 410. This output is active whenever the 8 MHZ oscillator is operating.

A 16 MHZ "expansion bus" clock 515 is output from the Hydrogen IC to the ASIC. The ASIC is positioned to minimize the trace length of this clock signal. The bus clock is active whenever the system clock is operating.

The ASIC generates Utopia TXCLK 516 and RXCLK 517 signals and derived from the Expansion Bus Clock. These clock signals operate at 16 MHZ and are present whenever the Expansion Bus Clock is operating. The 16 MHZ operating frequency is within specified operating parameters of both the SACHEM (25 MHZ) and Hydrogen (33 MHZ) Utopia interfaces.

The TXCLK is routed from the ASIC through a level shift buffer 520 to minimize skew between TXCLK and TXD [0:7] when the Txdata is received at the SACHEM Utopia interface.

The level shift buffer can be part of the ASIC 410.

The OBC clock 526 is generated using an on board 25 MHZ oscillator 525. The oscillator is positioned near the OBC to minimize the length of this clock routing. The oscillator operates whenever power is applied to the board. This clock is also routed to the ASIC 410 for distribution/level shift to the SACHEM OBC interface.

The ADSL-C clock 530 is derived using an on board crystal driver/receiver 535. A 35.328 MHZ/crystal 534 is placed on the board to minimize the length of these signal traces. The external circuit to provide VXCO control is implemented as specified by Alcatel.

The Master Clock output from the ADSL-C 450 is routed to the SACHEM IC 460.

The Master Sachem Clock is received from the ADSL-C. Routing distance for this signal is also minimized.

The PCLK input is routed from the ASIC at the processor clock frequency.

The DUART clock is generated using an on board oscillator and an external 1.8432 MHZ Crystal 540. The crystal is placed to minimize the oscillator input and output trace lengths. Each side of the crystal is coupled to ground through a 12 pF cap. A 1 M ohm shunt resistor across the crystal is provided.

Initialization of the modem can be carried out on power up or on reset.

Figure 6:
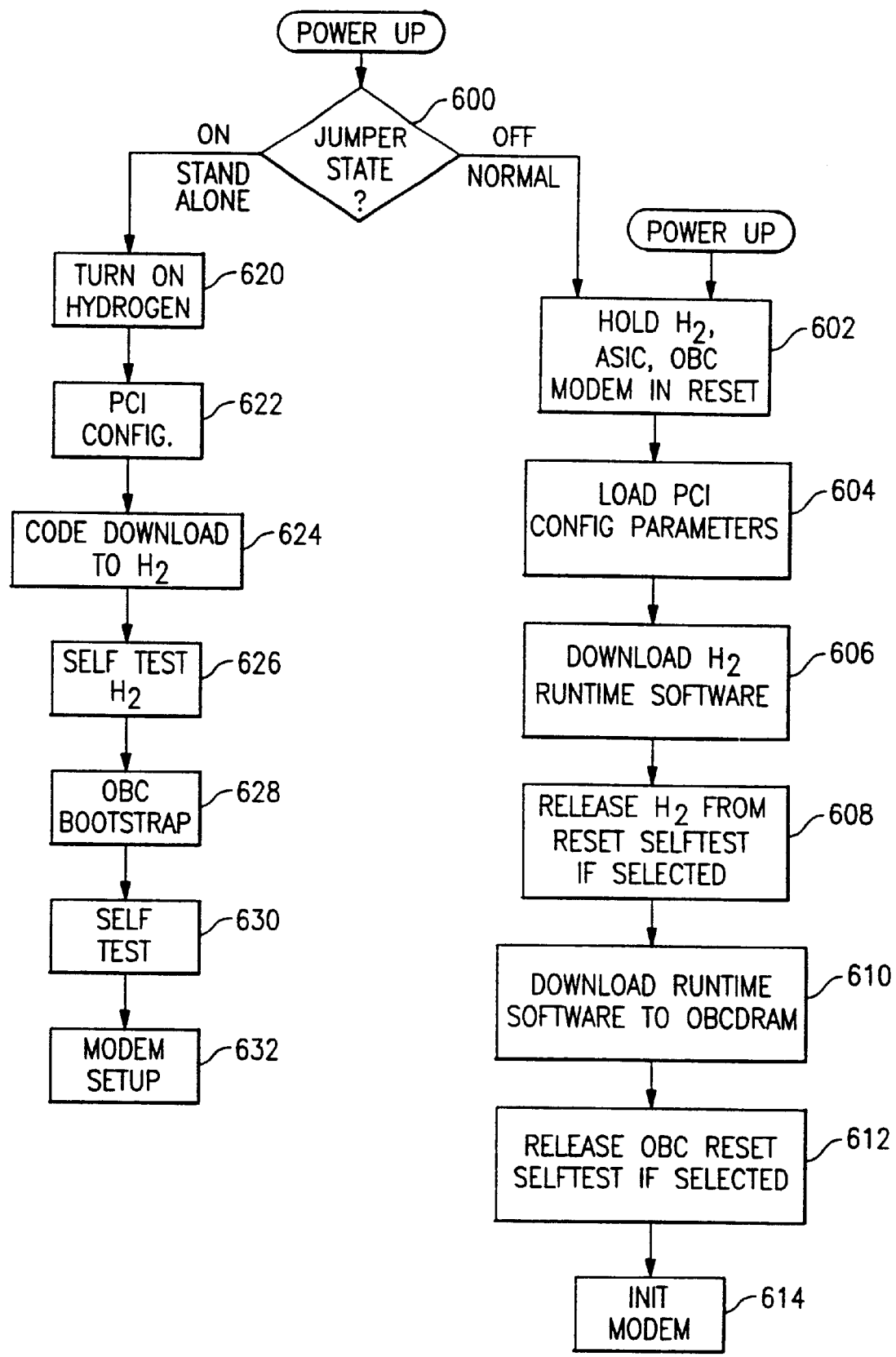
FIG. 6 shows a flowchart of the different power-up modes.

The power up routine is shown in FIG. 6. Normal and standalone modes of power up are supported. The mode is controlled by jumper selection of the state of the standalone pin 411 of the ASIC.

The operation of power up proceeds as shown in the flowchart of FIG. 6. Step 600 first determines the state of the jumper 411. If the jumper is off, normal power up is started at 602. When power is applied to the board, the Hydrogen IC, ASIC, OBC, and modem components are held in a reset state at 602. PCI bus configuration is performed at 604 by loading PCI configuration parameters from the serial boot PROM 412.

After PCI bus configuration is complete, the Hydrogen run time software is downloaded via the PCI bus 440, to the onboard PCI bus boot ROM 422 at 606. A number of user-defined configuration options are allowed, and are set via the user interface. One such option is the Hydrogen self test. Some of these options are shown in FIG. 7. Upon completion of this download at 600, the Hydrogen IC is released from reset, and executes a series of self test functions at 608 if Hydrogen self test is selected at 702. Upon completion of these tests, the Hydrogen 420 downloads the run time software image to the OBC DRAM 402, at 610, from the Host. After completion of this download, the Hydrogen 420 sends a command to the ASIC 410 to the OBC 400 to release from reset at 612. The OBC then executes optional self test functions if selected. The OBC performs modem initialization and setup at 614.

After completion of all self test and setup functions, both the Hydrogen and OBC are operational.

If the jumper 411 is detected as being on at 600, standalone power up mode is selected. This mode is used, for example, for testing and development. In this mode, power is applied to the board, causing the hydrogen 420 to operate. The standalone routine executes PCI configuration at 622, followed by download of code at 624. Optional self test functions and hydrogen initialization are carried out at 626. After completion, normal execution is carried out.

The OBC starts in standalone mode by bootstrapping from flash 404 at 628. Optional self test functions are carried out at 630, and OBC initialization and modem setup at 632, followed by normal execution.

Two modes of reset are also supported and controlled by jumper selection of the state of the standalone jumper 411 of the 315 ASIC 410. If a failure is detected by the host software during reset, the host software informs the user of the suspected failure via the user interface.

Figure 8:
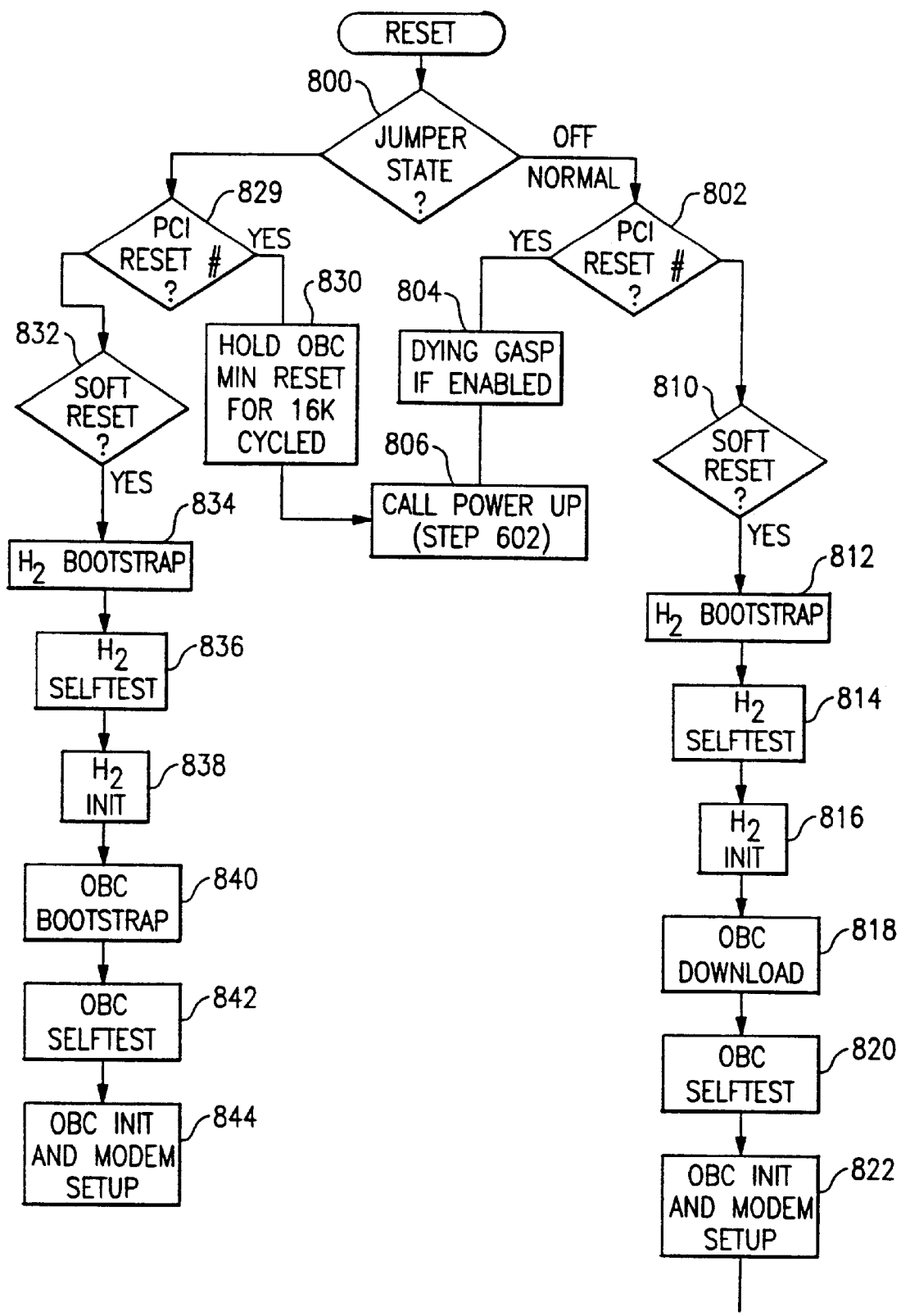
FIG. 8 shows the reset flowchart.
Figure 11:
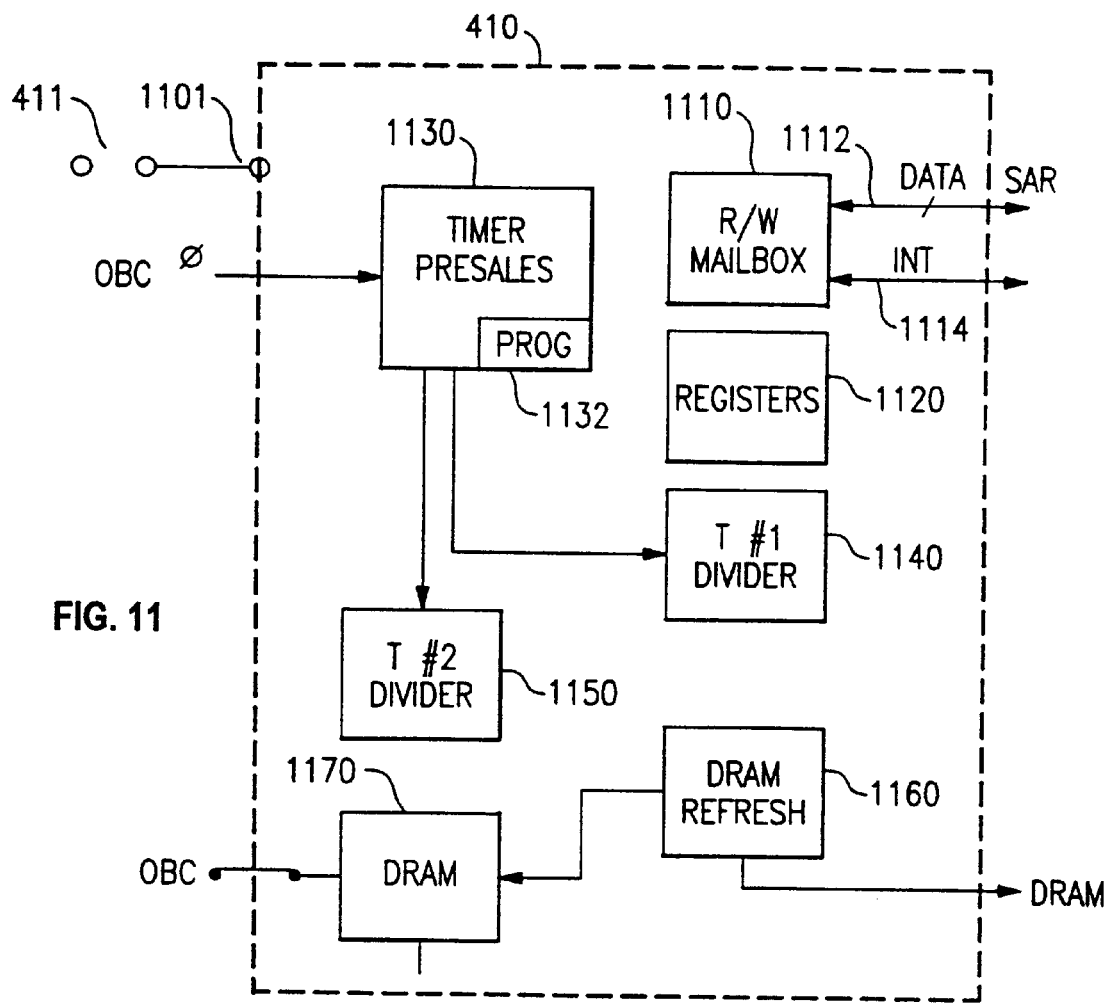
FIG. 11 shows a block diagram of the application specific integrated circuit ASIC which can be used.

The reset flowchart is shown in FIG. 8. If the jumper is off at 800, normal reset is declared.

A reset can be initiated from the PCI bus by assertion of the RESET# line detected at 800. The reset from PCI can only be alone after the assembly has been configured and is operational, with operating power still available to the assembly. If the dying gasp interrupt has been enabled for the assembly (at 706), a dying gasp message is transmitted at 804 before implementing the reset function. The dying gasp signal is a signal that is sent from the modem to applications and/or services that are communicating with the modem. The signal tells these services that the modem is about to be reset. Then, a power up (starting step 602) is called executing the power up instructions 602–614.

A "soft" reset can be initiated via a command from the Host detected at 810. Soft reset first carries out hydrogen bootstrap at 812. This is optional depending on soft reset definition. An optional hydrogen self test functions is carried out at 814. Hydrogen initialization is then done at 816. OBC download is optional (shown as 708) depending on soft reset definition, and is carried out at 818. OBC self test functions again optional, are done at 820. OBC initialization and modem setup are done at 822. Then, the normal OBC and hydrogen operation continues.

If the jumper 411 is on at 800, standalone reset is declared. A reset can then be initiated from the PCI bus by assertion of the RESET# line at 829. Note that the use of # after a signal name indicates an active low signal. This signal holds the OBC in reset at 830 (by the ASIC) for 16,384 clock cycles to ensure stable clock and VCC conditions. After this a complete power up cycle is called at 806. The ASIC then releases the OBC from reset for normal initialization functions to proceed.

When a "soft" reset is initiated via a command from the host at 832, the following sequence is executed by the Hydrogen IC:

Hydrogen bootstrap (optional depending on soft reset definition) at 834

Hydrogen self test functions (optional) at 836

Hydrogen initialization at 838

Normal Hydrogen operation

The OBC then executes the following sequence:

Bootstrap from Flash 404 (optional depending on soft reset definition) at 840 self test functions (optional) at 842

OBC initialization and modem setup at 844 normal execution

When the standalone mode is selected, the PC-NIC provides a push button reset capability.

"Dying gasp" is implemented whenever commanded by the Host processor software selected at 706. This function is implemented as part of a controlled power down/shutdown sequence for the Host or a Host application occurring under the control of the Host operating system.

The PCI-NIC can generate a Dying Gasp message 804 responsive to a hard reset initiated by assertion of the PCI bus RESET# line while power is still applied to the PC-NIC. An alternative is shown in FIG. 9. This support is provided by allowing the OBC 400, under software control, to enable a SAR-RESET# signal, to generate an interrupt at 902 rather than an OBC reset signal. The OBC then produces the Dying Gasp at 904. The OBC 400 then initiates a self reset at 908 by first disabling the RESET interrupt at 906 and then enabling the RESET signal to the OBC.

This implementation of Dying Gasp requires that the time to generate the dying gasp is less than the time required to start downloading the OBC code. Since a hard reset will initiate a complete restart of the computer and the operating system (on the order of several seconds minimum), the dying gasp message will be complete long before the download of code can begin.

No Dying Gasp message will be generated by unexpected power loss to the PC-NIC.

Switched +12 Volts can also be output to provide remote power for an active caps splitter. This output is current limited to 50 ma. and is intended for application in European markets.

Hydrogen IC

The Hydrogen IC is completely described in the CL-PS7900 data book from ATML and Cirrus Logic. Functions implemented in this IC include:

DRAM controller
PCI bus interface
Expansion Bus
Utopial Bus IF
ATM AFE
Watchdog Timer
UART
GPIO
Timer Hydrogen Memory Map

| Memory Region | Start Address | Length |
| --- | --- | --- |
| RAM | 00000000 | 200000 |
| Config. Regs | 10000000 | C |
| Control/status | 10000100 | 10 |
| List Mgr. regs | 10000200 | 50 |
| Timer | 10000400 | 10 |
| GPIO | 10000500 | 8 |
| UART | 10000600 | 14 |
| Watchdog | 10000700 | 8 |
| PCI | 10000800 | 20 |
| Network config | 10000900 | 18 |
| ASIC Registers | 20000000 | 18 |
| OBC memory | 20100000 | 100000 |
| Modem registers | 20200000 | 10000 |

*all addresses are in hex notation

PCI Bus Interface

The NIC uses the PCI bus interface of the Hydrogen chip to implement the PCI rev. 2:1 interface. The PCI bus pins on the Hydrogen chip 420 is connected to the PCI bus connector 440. Boundary scan on the PCI bus jumpers TDI to TDO.

The Hydrogen IC 420 requires the two Clock inputs described above. Clock 502 is for the PCI bus interface, and clock 501 is for internal processing. The Hydrogen 420 also generates output clocks for expansion bus operation, system clock, and reference clock.

The PCI Bus Clock input 502 is provided from the PCI bus. It operates at 33.33 MHZ (30 nsec period) maximum. This clock is used for all PCI bus functions and the PCI bus controller.

The ARM system clock input is a 64 MHZ internal system clock that is derived from the 8 MHZ crystal 506. A clock input ClkIn and crystal driver output (ClkOut) are provided on the Hydrogen chip to drive this crystal. The 8 MHZ clock drives an internal phase locked loop that generates the on board system clock. This is used to generate all on board clock signals for the Hydrogen IC.

Clock Outputs

The following clocks are provided by the Hydrogen IC.

| Expansion Bus Clock 515 | 16 MHZ |
| --- | --- |
| CLK32 505 | 32 MHZ system clock |

Each clock output is filtered appropriately for electromagnetic coupling considerations.

The Hydrogen IC can include up to 16 Mbits of DRAM.
256K×32 bits
512K×32 bits

The DRAM multiplexed address and CAS/RAS signals are provided by the Hydrogen IC. DRAM resides in address space starting at 10000(h). Each DRAM-device is provided with a 0.1 uF decoupling capacitor, and DRAM chips share a single 10 uF decoupling capacitor.

Up to 8 Kbits of serial EEPROM 422 is interfaced via the I²C bus of the Hydrogen chip.

A serial PROM 412 is used to store the PCI configuration parameters and is provided and connected to the GPIO pins.

Utopia Interface

The UTOPIA level 1 interface of the Hydrogen IC is connected to the ADSL Modem chip 450, the ASIC 410, which includes a level shifter therein. Connections are as follows:

| | |
|---|---|
| RXD[0:7] | Connected directly to ADSL Modem chip |
| RXCellAV | Connected directly to ADSL Modem chip |
| RXClk | Connected to ASIC to provide data xfer clock |
| RXSOC | Connected directly to ADSL Modem chip |
| TXCellAV | Connected directly to ADSL Modem chip |
| TXClk | Connected to ASIC to provide data xfer clock |
| TXD[0:7] | Connected to ADSL Modem through level shifter |
| nRXEN | Connected to ADSL Modem through level shifter |
| NTXEN | Connected to ADSL Modem through level shifter |
| TXSOC | Connected to ADSL Modem through level shifter [drawing] |

Utopia outputs from the Hydrogen IC are TTL outputs. These signals are level shifted by ASIC 410 and routed to the SACHEM IC 460. No tristate of these signals is used.

Inputs to the Hydrogen IC from the SACHEM IC are equipped with 10 kohm pull up resistors to prevent floating on these lines when the SACHEM outputs are tristated.

Complete I/O specifications for the Hydrogen IC are included in the Hydrogen CLPS7900 data book. Some specific I/O characteristics are:

| Parameter | Min | Max |
|---|---|---|
| Input Low Voltage | −0.5 V | 0.8 V |
| Input High Voltage | 2.0 V | VCC |
| Output Low Voltage | | 0.4 V |
| Output High Voltage | 2.4 V | VCC |
| I/O capacitance | | 10 pF |

Output signals from the Hydrogen IC 420 are 5 Volt TTL outputs. Corresponding inputs to the Sachem IC 460 are 3.3 Volt inputs that are not 5 Volt tolerant. A level shift is performed to interface them. Level shifting is performed using a 74LPT244 non inverting buffer or equivalent with propagation delay of less than 5.0 nsec worst case.

Data is transmitted on one edge of the clock and latched on the opposite edge of the clock by the receiver. Skew introduced between the clock and data is a critical parameter to be controlled. The Txclk signal is also routed through the level shifter to minimize skew between the data and clock signals. This results in worst case skew of 3.2 nsec which is negligible at the 16 MHZ (62.5 nsec period).

An 8 KHz clock supplied by the SACHEM modem 460 is routed to GP103. This pin is an 5 volt I/O pin, and has required protection against over voltage conditions being applied to this pin by inadvertent programming of the Hydrogen I/O pin on the PC-NIC.

An optional, debugging, ATM25 interface 423 is used to facilitate firmware and software development. The Utopia go interface to the ADSL modem chip is disconnected so that only one of the UTOPIA or ATM25 interface can be used at a time on the Hydrogen chip.

One pin of the Hydrogen GPIO is used to drive the bi-color LED 399. The LED is given to indicate more information about the modem. Red is used to indicate power on, but no ADSL line sync having been established, or that line sync has been lost. Green is used to indicate power on and ADSL line sync established.

The Hydrogen IC DUART I/O pins are connected to a three pin header 424 to assist in software debug and development for run time software.

The power supply layout is shown in FIG. 10. The Hydrogen Chip draws its operating power from the PCI bus supplied 5 VDC using less than 400 ma of current. Decoupling associated with this device includes a 10 uF cap, and 8 0.1 uF cap.

+5 Volt Power is isolated from the PCB +5 Volt distribution using an inductive element 1002. This creates a +5 Volt Node specific to this IC to which the-decoupling is referenced. The clock oscillator use this same unique +5V node.

Boundary Scan pins are connected to test points to allow a boundary scan test of the Hydrogen IC.

The FIG. 4 block diagram shows an ASIC 410. The ASIC provides a control interface between Hydrogen, and the SACHEM modem chip 460, a control interface between the Hydrogen 420 and the OBC processor 400, a level shifter for control signals between Hydrogen 420 and SACHEM 460, a level shifter interface between OBC 400 and SACHEM 460, a DRAM refresh circuit for OBC DRAM 402, and an address Decode and control signal generation for the DUART 470.

The ASIC is implemented in 3.3 Volt logic with a combination of 5 Volt and 3.3 Volt I/O. An FPGA, or logic gates defined using hardware definition language can alternately be used for development or final product. These are implemented using a 3.3 Volt device with 5 Volt tolerant I/O.

Hydrogen Interface

The ASIC to Hydrogen interface is implemented to allow 5 Volt TTL compatible signals. The ASIC appears to the Hydrogen IC as memory mapped I/O registers, two blocks of expansion memory (OBC memory and Modem registers) on the Hydrogen Expansion bus and as a set of control/interrupt signals. These signals are defined as:

| | |
|---|---|
| DQ[3 1:0] | Bi-directional address/data bus connected to Hydrogen IC |
| IOWait | Output to Hydrogen IC to insert wait states |
| ALE | Input from Hydrogen IC to indicate valid address present |
| BusClk | Input from Hydrogen providing 16 Mhz bus clock |
| WRS# | Input from Hydrogen indicating write of data to ASIC |
| RDS# | Input from Hydrogen indicating read of data from ASIC |
| RST# | Input from Hydrogen indicating Bus reset |
| IRQ# | Output to Hydrogen for signaling interrupt events from 80960 interface or from the SACHEM interface Register definition |

Registers reside in the Hydrogen expansion memory space starting at base address 20000000(h). The registers and their offset addresses are:

| | |
|---|---|
| 00 | Control/Status |
| 04 | IRQ Enable |
| 08 | IRQ Source |
| 0C | IRQ Status |
| 10 | OBC mailbox |

Control Status

Bit definitions for this register are:

| Bit # | | Name | Comments | Reset |
|---|---|---|---|---|
| 00 | R/W | OBC reset | Indicates state of OBC reset line. When set, OBC is reset and SAR has control of OBC bus. When clear OBC has control of OBC bus. | Set |
| 01 | R/W | Modem reset | Indicates state of Modem reset line. When set Modem is reset. When clear Modem released from reset. | Set |
| 02 | R/W | Modem Bus En | Indicates state of Modem bus control. When set the SAR has control of MODEM I/O bus. When clear OBC has control of Modem I/O bus. | Set |

3.1.1.2 IRQ Enable

Bit definitions for this register are:

| Bit # | | Name | Comments | Reset |
|---|---|---|---|---|
| 00 | R/W | Modem IRQEN | When set enables IRQ generation from the Modem chipset. When clear IRQ generation is disabled. This function is only operational when the Modem Bus enable line (Bit 2 of Control register) is set. | Clear |
| 01 | R/W | Mbox WIRQEN | When set enables IRQ generation when the OBC writes to the mailbox register. When cleared IRQ generation is disabled. | Clear |
| 02 | R/W | Mbox RIRQEN | When set enables IRQ generation when the OBC reads from the mailbox register. When cleared IRQ generation is disabled. | Clear |

IRQ Source

Bits in this register are read only. Only IRQ sources that have been enabled are indicated in this register. Any bits set in this register are cleared upon completion of reading this register. Bit definitions for this register are:

| Bit # | | Name | Comments | Reset |
|---|---|---|---|---|
| 00 | R | Modem IRQ | When set indicates IRQ generation from the Modem chipset. This function is only operational when the Modem Bus enable line (Bit 2 of Control register) is set. | Clear |
| 01 | R | Mbox WIRQ | When set indicates IRQ generation from an OBC write to the mailbox register. | Clear |
| 02 | R | Mbox RIRQ | When set indicates IRQ generation from an OBC read from the mailbox register. | Clear |

IRQ Status

Bits in this register are read only. These bits reflect the status of IRQ sources regardless of enabled/disabled status. This register can be used for polled operation. Bit definitions for this register are:

| Bit # | | Name | Comments | Reset |
|---|---|---|---|---|
| 00 | R | Modem STAT | When set indicates IRQ request from the Modem chipset. This function is only operational when the Modem Bus enable line (Bit 2 of Control register) is set. | Clear |
| 01 | R | MboxWSTAT | When set indicates that the OBC has executed a write to the mailbox register. | Clear |
| 02 | R | MboxRSTAT | When set indicates that the OBC has read the mailbox register. | Clear |

OBC Mailbox

This register is a 16 bit read/write register that transmits data to/from the OBC. Writes to this register generate an interrupt to the OBC 400 (when enabled by the OBC). When this register is read, data sent by the OBC 400 is provided to the SAR 420. Read actions also generate an interrupt to the OBC (when enabled by the OBC).

Commands and responses to service requests are handled through this mailbox.

The resets control access to certain registers. The OBC reset bit is bit 0 of the control/status register. When set, the SAR 420 has direct read/write access to the 256K×32 OBC memory block for code/data download or upload. This memory block resides at address 20100000(h) of the Hydrogen expansion bus. When the Modem reset bit 1 of the control/status register is clear, and the Modem Bus En bit 2 of the control/status register is set, the SAR has direct read/write access to the modem registers. This register block resides at address 20900000(h) of the Hydrogen expansion bus.

The ASIC 410 also provides an interface to the OBC 400 to allow communication with the Hydrogen IC 420 as well as to perform level shifting between the OBC bus and the SACHEM 460 bus interface. In addition, the ASIC provides DRAM support for the OBC DRAM bank.

An input pin 411 to select either normal or 960/modem standalone operation is provided. The ASIC interface signals for the OBC are:

| | |
|---|---|
| AD[31:0] | Time multiplexed Address and Bi-directional Data bus |
| CLK2 | 32 Mhz Clock output to OBC |
| PCLK | Bus Clock input from OBC |
| ALE | Address Latch Enable input from OBC |
| RDY# | Output to OBC to insert wait states for accesses |
| DEN# | Input from OBC indicating data enable |
| W/R# | Input from OBC indicating read or write |
| BE3, 2, 1, 0# | Inputs from OBC for byte addressing |
| RST# | Output to OBC to reset processor |
| BLAST# | Burst last byte indication from OBC |
| INTO# | Output to OBC to indicate ADSL modem or Hydrogen IC interrupt |
| HOLD | Output to OBC to force AD bus to tristate |
| HOLDA | Input from OBC to acknowledge Hold request |

Registers reside in the OBC memory space starting at base address 01000000(h). The-registers and their offset addresses are:

| | | |
|---|---|---|
| 00 | | Control/Status |
| 04 | | IRQ Enable |
| 08 | | IRQ Source |
| 0C | | IRQ Status |
| 10 | | SAR mailbox |
| 14 | | Timer prescaler |
| 18 | | Timer #1 divider |
| 1C | | Timer #2 divider |
| 20 | | Refresh Counter |

Bit definitions for the control status register are:

| Bit # | | Name | Comments | Reset |
|---|---|---|---|---|
| 00 | R | Modem reset | Indicates state of Modem reset line. When set Modem is reset. When clear Modem released from reset. | Set |
| 01 | R | Modem Bus En | Indicates state of Modem bus control. When set the SAR has control of MODEM I/O bus. When clear OBC has control of Modem I/O bus. | Set |
| 02–03 | R/W | WS non burst | These two bits indicate the number of wait states to be inserted for RAM accesses in non burst transactions (These wait states are in addition to any that may be inserted prior to an access due to refresh) | 3 |
| 04–05 | R/W | WS burst | These two bits indicate the number of wait states to be inserted for RAM accesses in burst transactions (These wait states are in addition to any that may be inserted prior to an access due to refresh) | 3 |

Memory speeds supported by each wait state for both burst and non burst accesses are shown below for a bus clock speed of 25 MHZ.

| Wait States | Non Burst Access | Burst Access (2cnd and subsequent accesses) |
|---|---|---|
| 0 | 80 ns | 40 ns |
| 1 | 120 ns | 80 ns |
| 2 | 160 ns | 120 ns |
| 3 | 200 ns | 160 ns |

Bit definitions for the IRQ enable register are:

| Bit # | | Name | Comments | Reset |
|---|---|---|---|---|
| 00 | R/W | Modem IRQEN | When set enables IRQ generation from the chipset. When clear IRQ generation is disabled. This function is only operational when the Modem Bus enable line (Bit 1 of Control register) is clear. | Clear |
| 01 | R/W | Mbox WIRQEN | When set enables IRQ generation when the SAR writes to the mailbox register. When cleared IRQ generation is disabled. | Clear |
| 02 | R/W | MboxRIRQEN | When set enables IRQ generation when the SAR reads from the mailbox register. When cleared IRQ generation is disabled. | Clear |
| 03 | R/W | T1IRQEN | When set enables IRQ generation when Timer #1 expires. When cleared IRQ generation is disabled. | Clear |
| 04 | R/W | T2IRQEN | When set enables IRQ generation when Timer #2 expires. When cleared IRQ | Clear |
| 05 | R/W | GASPIRQEN | When set enables IRQ generation on | Clear |

Bits in the IRQ source register are set to be read only. Only IRQ sources that have been enabled are indicated in this register. Any bits set in this register are cleared upon completion of a register read.

If an interrupt event occurs during read of this register, the IRQ indication is not registered until the current read access is completed. The IRQO# output is raised on the completion of each read access of this register. IRQO# is held high for a minimum of one clock cycle before another interrupt is generated. Bit definitions for this register are:

| Bit # | | Name | Comments | Reset |
|---|---|---|---|---|
| 00 | R | Modem IRQ | When set indicates IRQ generation from the Modem chipset. This function is only operational when the Modem Bus. enable line (Bit 1 of Control register) is clear. | Clear |
| 01 | R | MboxWIRQ | When set indicates IRQ generation from the completion of a SAR write to the mailbox register. | Clear |
| 02 | R | MboxRIRQ | When set indicates IRQ generation from the completion of SAR read from the mailbox register. | Clear |
| 03 | R | T1IRQ | When set indicates IRQ generation from Timer #1 expiration. | Clear |
| 04 | R | T2IRQ | When set indicates IRQ generation from Timer #2 expiration. | Clear |
| 05 | R | GASPIRQ | When set indicates IRQ generation form an assertion of the SAR_RESET pin low. | Clear |

Bits in the IRQ status register are also read only. These bits reflect the status of IRQ sources regardless of enabled/disabled status. This register is used for polled operation. If a change of state occurs during a read of this register, the change of state is not registered until the current read access has been completed. Bit definitions for this register are:

| Bit # | | Name | Comments | Reset |
|---|---|---|---|---|
| 00 | R | Modem STAT | When set indicates IRQ request from the Modem chipset. This function is only operational when the Modem Bus enable line (Bit 1 of Control register) is clear. | Clear |
| 01 | R | MboxWSTAT | When set indicates that the SAR has executed a write to the mailbox register. | Clear |

-continued

| Bit # | | Name | Comments | Reset |
|---|---|---|---|---|
| 02 | R | MboxRSTAT | When set indicates that the SAR has read the mailbox register. | Clear |
| 03 | R | T1IRQ | When set indicates Timer #1 expiration. | Clear |
| 04 | R | T2IRQ | When set indicates Timer #2 expiration. | Clear |
| 05 | R | GASPIRQ | When set,indicates dying gasp request. | Clear |

The SAR mailbox register 1110 is a 16 bit read/write register that acts as a mailbox. When written to, data 1112 is transmitted to/from the SAR 420. Writes to this register generate an interrupt 1114 to the SAR 420 (when enabled by SAR). When this register is read, data sent by the SAR is provided to the OBC. Read actions also generate an interrupt to the SAR (when enabled by SAR).

Responses to commands and service requests are handled through this mailbox.

The timer prescaler register is an 8 bit R/W register that controls prescaling of the OBC clock. The output of this prescaler feeds both timer counters that can be used to generate interrupts. The expiration of the prescale counter causes generation of a clock to both timer counters. It also restarts counting down from the programmed value 1132 in this register.

The timer #1 divider register is a 16 bit R/W register that controls the division of the prescaler output. When the counter controlled by this register expires, it generates an interrupt and restarts counting from the programmed value.

The timer #2 divider register is a 16 bit R/W register that controls the division of the prescaler output. When the counter controlled by this register expires, it generates an interrupt and restarts counting from the programmed value.

The refresh counter register 1160 is a 10 bit R/W register that controls the refresh rate of the DRAM refresh circuit. Refresh cycles are performed at a rate determined by 1/PCLK*Count. Its default value is set to 300, which results in a refresh period of 40 nsec*300=112 μsec at a clock rate of 25 MHZ (40 nsec period).

Modem register access is controlled by the Modem reset bit. r-bit 0 of the control/status register and the Modem Bus En bit 1 of the control/status register. When both are clear, the Modem Registers reside in the OBC memory space starting at base address 02000000(h).

The ASIC also provides support signals for two blocks of 256K×32 DRAM 1170. The signals include:

MA[9:0] Multiplexed Address bus
RAS[1:0] DRAM row address strobe
CAS[3:0] DRAM column address strobe
OE# Output enable
WR# Write strobe Refresh of the DRAM 1170 is controlled by the DRAM refresh 116 in the ASIC, in cycles occurring at a rate controlled by the refresh rate register in the OBC memory map. It has a default value of approx. 83 Khz; or a 12 usec period. This provides refresh at a rate for the entire DRAM bank=512 cycles 12 usec.=6.144 msec.

A refresh cycle has 8 clock cycles organized as follows:
All CAS pulled low
After one clock, All RAS pulled low
After one more clock, All CAS pulled high
After three more clocks, All RAS pulled high
Two cycles are used for recovery If a refresh cycle is requested during a memory access, the refresh cycles are implemented after completion of the memory access. If an access is requested during a refresh cycle, the RDY line is used to force wait states to allow refresh completion.

Who DRAM accesses are supported by generation of RASx and CASx signals in conjunction with the top and bottom halves of the address bus. OE# and WR# are generated to perform read or write access. Programmable wait states (0–3) for non burst and burst accesses are supported to allow use of the most cost effective DRAM that meets performance requirements. All multiplexing of the DRAM address bus is performed by the ASIC. Byte accesses and burst accesses are supported.

The ASIC supports operations in standalone, and normal operation depending on the signal received at 401.

When the standalone input pin 401 is pulled high, the ASIC allows the processor 400 to operate in a standalone mode. In this mode, the IBR is read from addresses 1FFF30 through 1FFF60 of the Flash memory 404, by decoding the external bus address and enabling read from the Flash memory.

When the standalone pin is pulled low, the ASIC forces the processor 400 to operate in normal mode with RESET and RAM load being performed under control of the Hydrogen IC 420. In this mode, the IBR is read from the mailbox 1110 by decoding the external bus address and enabling reads from the 426.

Modem Interface

Connections between the ASIC and the Sachem Modem 460 include:

| | |
|---|---|
| AD[ 15:0] | Bi-directional address/data bus. |
| PCLK | Bus clock |
| ALE | Input to modem address latch enable |
| BE1 | Address bit 1 |
| W/R# | Input to modem write/read indicator |
| CS# | Input to modem chip select |
| RDY# | Output from modem to indicate transfer ready (i.e. wait state insertion) |
| INT# | Output from modem indicating interrupt req. |

All signals between the Modem and ASIC are routed to either the OBC or the SAR based on the state of the Modem Bus Control bit in the SAR status/control register.

DUART Interface

The DUART 470 is supported by connection of the following signals:
 CS# is connected to the ASIC to provide address decode functions
 MR is connected to the ASIC to provide reset to the DUART
 RD# is connected to the ASIC
 WR# is connected to the ASIC ASIC Power Supply The ASIC draws its operating power from the 3.3 Volt on-board supply. 5 Volt I/O is drawn from the PCI-bus-supplied 5 VDC.

+3.3 Volt Power is isolated from the PCB 3.3 Volt distribution using an inductive element 1004. This creates a +3.3 Volt Node specific to this IC to which the decoupling is referenced.

Boundary Scan pins are connected to test points to allow boundary scan test of the ASIC.

The OBC controller 400 is implemented by a 80960JA-25 processor. This processor requires a 5 Volt supply, and a 25 MHZ clock input provided by an external oscillator 525 to provide the operating frequency for the OBC. The clock input may alternately be supplied by an ASIC clock output pin.

ALE is connected to the ASIC to provide address latching for memory and I/O accesses.

AD31 through AD1 and D0 are connected to the ASIC, and the DRAM bank. AD7 through AD1 and D0 are connected to the DUART.

BE0, BE1, BE2, and BE3 are connected to the ASIC and the DRAM bank to allow byte access to memory and I/O. BEO is connected to the DUART.

RESET# is connected to the ASIC. It is driven low by the ASIC on RESET from the PCI bus. It is driven high or low by the Hydrogen IC via an I/O write to the ASIC. When the RESET# line is driven low by the ASIC, the Hydrogen becomes the bus master for the controller DRAM block. This allows the Hydrogen IC to check the DRAM block during POST and download code for/from the DRAM block.

HOLD is connected to the ASIC. It is driven high by the ASIC to force the OBC AD bus into tristate during reset, and to allow the Hydrogen IC to access OBC memory during operation.

HOLDA is connected to the ASIC. It provides a hold-acknowledge signal to inform the ASIC that the ADBUS is in. tristate.

INT0# is connected to the ASIC. INT1# and INT2# are connected to the DUART via pullup resistors.

INT0# is used to indicate a interrupt request from the ADSL Modem.

INT 1# is used to signal IRQ1 DUART interrupt

INT2# is used to signal IRQ2 DUART interrupt W/R#, DT/R# and DEN# are connected to the ASIC to control memory and I/O reads and writes in conjunction with other address and control signals.

CLKIN is connected to the ASIC for I/O timing.

BLAST# is connected to the ASIC for Burst access support.

READY# is connected to the ASIC and is driven by an ASIC provided wait state generator. This signal is used to insert wait states for memory and I/O accesses.

Signals connected to the DUART include:

A0 is connected to BE0 of the OBC

A1 and A2 are connected to A1 and A2 of the OBC

CHSL is connected to A3 of the OBC

Signals pulled up through 10 Kohm resistors:

LOCK# (normal operation)

INT3–7#

NMI#

STEST (option to enable on board self test)

Signals pulled down through 10 Kohm. resistors:

LOCK# (for use with emulator)

STEST (option to disable on board self test)

Signals not connected:

Width/HLTD1:0

D/C#

BSTAT

AS#

FAIL#

ALE#

OBC Memory Map

| Memory Region | Start Address | Length |
|---|---|---|
| Internal RAM & vectors | 0 | 400 |
| RAM | 00000400 | 100000 |
| ASIC Registers | 01000000 | 24 |
| Modem registers | 02000000 | 10000 |
| DUART | 03000000 | 40 |
| FLASH memory | FEF00000 | 100000 |
| IBR (read from Flash or RAM depending on state of ASIC stadalone pin) | FEFFFF30 | 30 |
| 960 reserved | FEFFFF60 | A0 |
| 960 registered space | FF000000 | 1000000 |

*all addresses are in hex notation

OBC Interrupts

The following interrupt sources are supported for the OBC:

| | |
|---|---|
| XINT0# | Interrupt from ASIC used for SACHEM or SAR generated interrupts |
| XINT1# | Interrupt from DUART for channel 1 Async port |
| XINT2# | Interrupt from DUART for Channel 2 Async port |
| XINT3#–XINT7#, NMI# | not used |

DRAM

Up to 8 Mbits of DRAM 402 for the OBC are supplied. The configuration of DRAM supported includes:

256K×32 bits

The DRAM multiplexed address, OE#, WR#, CS#, and CAS/RAS signals are provided by the ASIC.

Each DRAM device is provided decoupling capacitors.

DUART

A 16552 DUART 470 is provided for debug and development. The DUART resides at base address 03000000(h) on the controller bus. Register addresses and programming information are included in the data sheet for the DUART. The following connections are made to the DUART:

A0 and A1 are connected to BE0 and BE1 of the OBC

A2 is connected to A2 of the OBC

CHSL is connected to A3 of the OBC

CS# is connected to the ASIC

D7 through D0 are connected to AD7 through AD1 and D0 of the OBC

INTR1 and INTR2 are connected to the OBC

MR is connected to the ASIC

RD# is connected to the ASIC

WR# is connected to the ASIC.

SIN1, SIN2, SOUT1, and SOUT2 are connected to an RS-232 transmitter receiver IC

XIN and XOUT are connected to a 18.432 MHZ crystal

XOUT is connected through a 1.5 Kohm resister

1 Mohm resistor is connected across the crystal 47 pF cap is connected to the junction of the 1.5K and 1M res. 22 pf cap is connected to XIN Signals pulled up through 10 Kohm resistors:

RI#1,2

DCD# 1,2

DSR#1,2

CTS#1,2

Signals not connected.

TXRDY#1,2

DTR#1,2

RTS#1,2

The DUART is provided with decoupling capacitors as follows.

An RS-232 driver/receiver 475 such as the MAX203 is used to provide RS-232 compatible levels/thresholds for the two DUART ports. Connections will be as follows:

T1IN, T2IN connected to SOUT1 and SOUT2 of the DUART

R1OUT, R2OUT connected to SIN1 and SIN2 of the DUART

T1OUT, T2OUT connected to pin 1 of separate 3 pin headers for RS-232 connection R1IN, R21N connected to pin 3 of separate 3 pin headers for RS-232 connection Ground connected to pin 2 of separate 3 pin headers for RS-232 connection The RS-232 driver/rec. is provided with decoupling capacitors as follows:

1 ea 0.1 u1F cap.

A block of Flash programmable Memory 404 is provided.

OBC Power Supply

The OBC draws its operating power from the PCI bus-supplied 5 VDC. The current drain should be less than 400 ma. Decoupling associated with this device includes a 10 uF cap and 8 of, 0.1 uF caps.

+5 Volt Power is isolated from the PCB +5 Volt distribution using an inductive element(s) to create a +5 Volt Node specific to this IC to which the decoupling will be referenced.

ADSL Modem

The ADSL Modem is implemented using the ADSL-CAFE 450 and the Sachem ADSL modem IC 460. The layout and design of the ADSL modem duplicates the design used by Alcatel in their product utilizing the ADSL-C and Sachem chipset.

The ADSL-C connects to the line interface 452 and the Sachem I.C 460. Connection to the line interface and Sachem is as defined by Alcatel in their current product. Other connections to the ADSL-C include:

PDOWN is connected to the Sachem PDOWN output to implement programmable power down.

Signals pulled down through 10 Kohm resistors:

LTNT (stuffing option to pull up for LT emulation)

Signals not connected:

GPO, 1,2

ADSL Power Supply

The ADSL-C draws its operating power from the 3.3 Volt on-board supply. 3.3 Volt current used is less than 190 ma. Decoupling associated with this device includes 2–0.1 $\mu F$ cap.

+3.3 Volt Power is isolated from the PCB 3.3 Volt distribution using an inductive element 1008 to create a +3.3 Volt Node specific to this IC which the decoupling is referenced.

The ADSL-C also uses the 3.3 Volt analog on-board supply.

Connection to the ADSL-C is as defined by Alcatel in their design using the Sachem and ADSL-C. This is intended to be a "glueless" interface.

Connection to the OBC will be through the on board ASIC to perform level shifting between the 5 Volt OBC and 3.3 Volt Sachem.

AD[15:0] connected to ASIC for level shift and distribution to/from OBC and SAR PCLK Output from ASIC for 1/0 timing ALE connected to ASIC for level shift and distribution to/from OBC and SAR BE1 connected to ASIC for level shift and distribution to/from OBC and SAR W/R# connected to ASIC for level shift and distribution to/from OBC and SAR CSB connected to ASIC for level shift and address decode RESETR connected to ASIC for distribution from CRC and SAR RDYB connected to ASIC for distribution to OBC and SAR INTB connected to ASIC for distribution to OBC and SAR Connection to the Hydrogen SAR includes the following:

RXD[0:7] Connected directly to SAR

RXCellAv Connected directly to SAR

RXClk Connected to ASIC to provide xfer clock

RXSOC Connected directly to SAR

TXCellAv Connected directly to SAR

TXClk Connected to ASIC through level shifter to provide xfer clock (level shifter included to minimize skew between TXD[0:7] and clock)

TXD[0:7] Connected to SAR through level shifter nRXEN Connected to SAR through level shifter NTXEN Connected to SAR through level shifter TXSOC Connected to SAR through level shifter Other connections to the Sachem IC include:

PDOWN output is connected to the PDOWN input pin of the ADSL-C to implement a programmable power down of the AFE in addition to the RESET power down function implemented by reset of the board.

Signals pulled up through 10 kohm resistors:

ISLT_DATA_S0,1

SLT_DATA_F0,1

GP,IN0, 1

Signals pulled down through 10 Kohm resistors:

U_RXADDR0–4

U_TXADDR0–4

TESTE

Signals not connected:

SLR_VAL_S

SLR_VAL_F

SLR_DATA_S0,1

SLR_DATA_F0,1

SLR_REQ_S

SLR_REQ_F

SLAP_CLOCK

SLR_FRAME_I

SLT_FRAME_I

SLR_FRAME_F

SLT_FRAME_F

The Sachem draws its operating power from the 3.3 Volt on-board supply. 3.3 Volt current used is less than 370 ma. Decoupling associated with this device includes 1 ea 10 uF cap and 8 ea 0.1 uF cap.

+3.3 Volt Power is isolated from the PCB 3.3 Volt distribution using an inductive element(s). This creates a +3.3 Volt Node specific to this IC which the decoupling is referenced.

Boundary Scan pins are connected to test points to allow boundary scan test of the Sachem IC.

The layout and design of the line interface duplicates the line interface used by Alcatel in their design using the ADSL-C and Sachem chipset. The line interface 452 has a differential driver, a differential receiver, a hybrid coupling circuit, a line coupling transformer, and a High Pass filter. The line interface is transformer-coupled to an RJ-14 connector 454.

The power supply accepts +5 VDC +/−5% input from either the PCI bus or from an external input connector. 3.3 VDC is derived from this 5 Volt input. Total 5 Volt current will be less than 2 Amps. External connection is supported, e.g., for development purposes.

The power supply 430 generates +3.3 VDC +/−1% from the 5 Volt input using a linear regulator. Connection to the ON/OFF and FLAG pins when a 5 pin regulator is used are provided to the Hydrogen IC GPIO.

A 0.51 ohm pass resistor is provided to share power dissipation with the 3.3 Volt regulator.

An output capacitor of 22 uF is provided to ensure 1.25 Amp operation with output noise of <200 uV. A 0.22 uF capacitor is placed at the input of the regulator.

Analog 3.3 Volts for use by the AFE is derived by an LC filter between the regulated 3.3 Volts and the analog 3.3 Volts.

The power supply accepts, +12 VDC +/−5% input from either the PCI bus or from an external input connector. +12 VDC current is less than 100 ma. An LC filter is provided for the +12 VDC used on the NIC.

The power supply accepts −12 VDC +/−10% input from either the PCI bus or from an external input connector. −12 VDC current is less than 100 ma. An LC filter is provided for the −12 VDC used on the NIC.

External connection is supported as a stuffing option for development purposes only.

As a stuffing option, a DC/DC converter to generate on board +/−12 Volts DC in place of the PCI bus provided voltages is included. The converter is powered by the PCI Bus 5 VDC and will generate 100 ma output for both + and −12 VDC.

ASIC Pin Assignments

The ASIC is in a 160 PQFP. It supports both 5 Volt and 3.3 Volt I/O.

Pin Assignments

| Description | Type | Pin No |
|---|---|---|
| +3.3 V | Power | 1, 41, 61, 81, 121, 141 |
| +5 V | Power | 10, 46, 94, 157 |
| GND | Power | 20, 31, 40, 51, 70, 80, 99, 100, 110, 120, 127, 137, 160 |
| SAR_DA[31:0] | 5VI/O | 2:9, 11:19, 21:30, 32, 34, 36:38 |
| SAR_RD# | 5VI | 39 |
| SAR_WR# | 5VI | 43 |
| SAR_ALE | 5VI | 44 |
| SAR_BUSCLK | 5VI | 33 |

-continued

| Description | Type | Pin No |
|---|---|---|
| SAR_IRQ#/BCLK | 5VI | 35 |
| SAR_RESET# | 5VI | 159 |
| SAR_IOWAIT | 5VO | 45 |
| OBC_DA [0:31] | 5VI/O | 47:50, 52:60, 62:69, 72, 74, 76:79, 82:86 |
| OBC_ALE | 5VI | 87 |
| OBC_BE# [3:0] | 5VI | 88:91 |
| OBC_W/R# | 5VI | 92 |
| OBC_DT/R# | 5VI | 93 |
| OBC_DEN# | 5VI | 95 |
| OBC_RDY# | 5VO | 96 |
| OBC_HOLD | 5VO | 97 |
| OBC_HOLDA | 5VI | 98 |
| OBC_RESET# | 5VO | 101 |
| OBC_CLKIN | 5VI | 42 |
| OBC_INT# | 5VO | 102 |
| OBC_BLAST# | 5VI | 103 |
| OBC_DRAMMA [0:8] | 5VO | 104:109, 111:113 |
| OBC_CAS0# | 5VO | 114 |
| OBC_CAS1# | 5VO | 115 |
| OBC_CAS2# | 5VO | 116 |
| OBC_CAS3# | 5VO | 117 |
| OBC_RAS# | 5VO | 118 |
| OBC_WE# | 5VO | 119 |
| OBC_OE# | 5VO | 122 |
| MODEM_DA [15:0] | 3VI/O | 126, 128:135, 138:140, 142:145 |
| MODEM_PCLK | 3VO | 146 |
| MODEM_ALE | 3VO | 147 |
| MODEM_BE1 | 3VO | 148 |
| MODEM_CS# | 3VO | 149 |
| MODEM_W/R# | 3VO | 150 |
| MODEM_RDY# | 3VI | 151 |
| MODEM_INT# | 3VI | 152 |
| MODEM_RESET# | 3VO | 153 |
| UTOPIA_TXCLK | 3VO | 155 |
| UTOPIA_RXCLK | 3VO | 156 |
| DUART_CS# | 5VO | 123 |
| DUART_RST | 5VO | 124 |
| FLASH_CS# | 5VO | 125 |
| TMS | 5VI | 73 |
| TCLK | 5VI | 75 |
| TDI | 5VI | 71 |
| TDO | 5VO | 136 |
| STNDALONE | 5VI | 154 |
| RESERVED | N/C | 158 |

The ADSL Network Interface Card (NIC) described above operates using at least one of firmware and/or software for operation.

The ATM portion of the NIC is based on chips, firmware, and software developed by ATM Ltd, for their own ATM network components.

Figure 12:
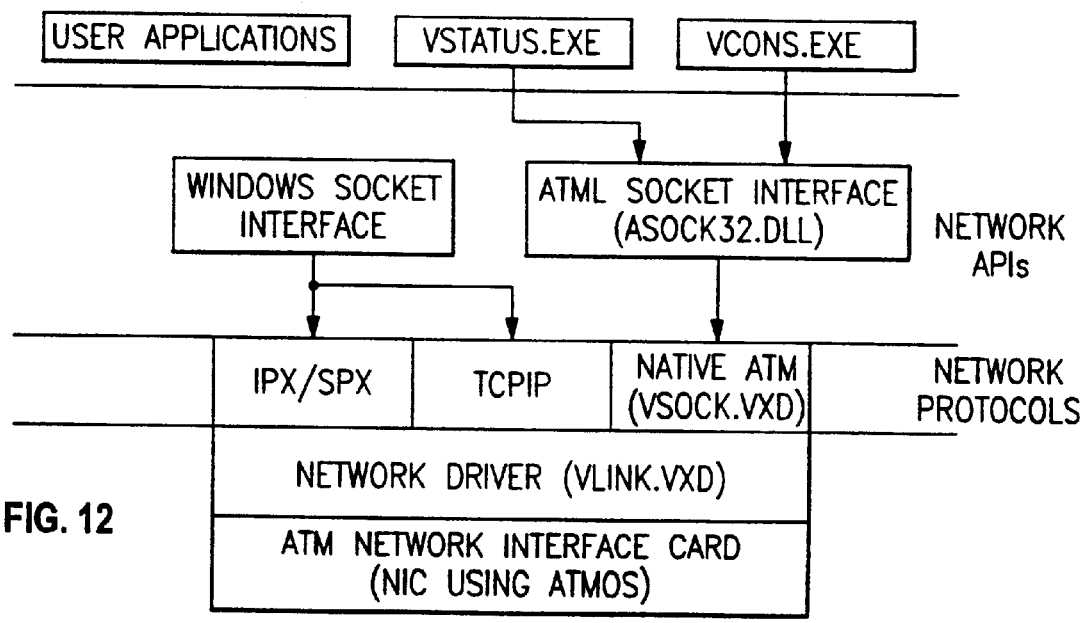
FIG. 12 shows a network interface diagram with components.

The Network Interface is diagrammed in FIG. 12.

Figure 13:
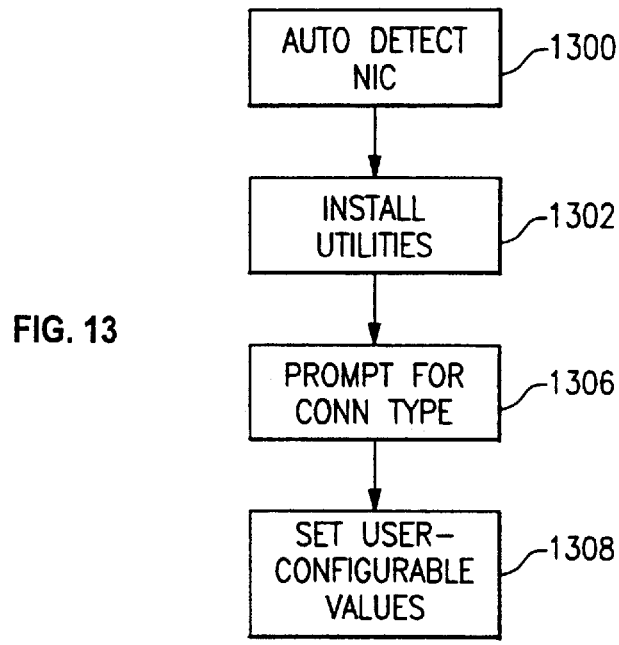
FIG. 13 shows a flowchart showing some aspects of installation.

The installation routines are made up of four main components (oemsetup.inf, netvlink.inf, vlink.def, and atmncdet.dll). The combination of these four components operates as shown in FIG. 13.

Automatical detection of the existence of which ATML NIC card is installed at 1300.

The routine-installs the proper utility applications, drivers, ini files, and firmware to support the NIC card chosen by the user at 1302. It then prompts the user for the connection type (Local LAN or ADSL) for the NIC card and configures some initial values for proper operation at 1306. User configurative valves are set, (for example, those shown in FIG. 7) at 1308.

Since the installation script format is different for Windows 95 and NT, two "inf" installation scripts are required. The atmncdet.dll library is used to provide user dialogs for gathering information that the scripts could not acquire automatically. This library was written for the MSVC 1.5 development environment.

Vstatus and vcons are performance and status monitoring applications used for troubleshooting problems with the NIC card or with the network itself. The main use for vstatus is for status monitoring of uptime, throughput, and system connections as needed. For example, the ARP server, LECS server is used as the Windows environment.

Vcons is a DOS console type application that is used as a terminal type-connection to the NIC card. This application allows a user to send commands manually to the firmware and see the response.

Asock32 or the ATM Sock API is a proprietary API developed by ATML. This interface was designed to conform to Microsoft's guide to extending the Windows Socket API version 1.1. See WinSock documentation by Microsoft for further details. Unfortunately, ATML does not conform to Microsoft's guidelines completely. This library is coded for the MSVC 2.2 development environment using an updated Win32 API.

Vsock is the ATM Sock Interface protocol. This is a proprietary protocol with a .vxd or Virtual Device Driver used by ATML which Hayes has purchased the rights to redistribute. This allows any application developed by third parties that use the ATML atmsock API to operate correctly with the Hayes NIC card. This module was coded to comply with MSVC 2.0.

The-final component to the ATMPC SDK/DDK is the vlink module. This module is the network VXD that vsock and all other protocols communicate to pass data into a network. This module has been developed to work with Windows 95 and NT using NDIS 3.0. The driver's function is limited to only act as a communication interface between the protocol layer and the hardware (NIC) layer. ATML designed all of the encapsulation components for passing other protocols over ATM in the firmware. This driver supports NDIS 3.0 only and was coded to be compiled with MSVC 4.0.

Software Requirements

Figure 14:
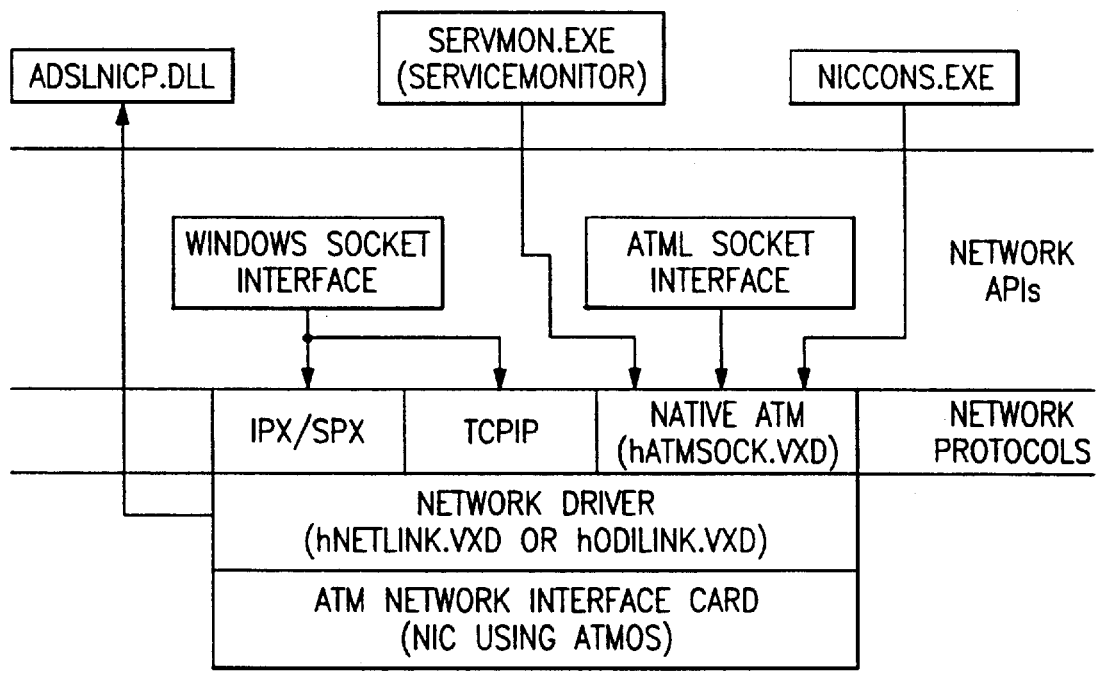
FIG. 14 shows a network interface diagram.

FIG. 14 shows the Network Interface Diagram with the present hardware components described with reference to FIGS. 4 to 11.

Installation Routines include the oemsetup.inf, hnetinst.inf & atmncdet.dll. User Control and Monitoring Applications include the ServiceMonitor, AdslNicP, and NicCons. Protocol Device Driver is the hAtmSock. Network Device Drivers includes hNetLink and hOdiLink. Their corresponding ATML modules are Installation Routines (oemsetup.inf netvlink.inf, vlink.def atmncdet.dll), Status-Applications (vstatus and vcons), Native ATM Protocol (vsock), and Network Device Driver (vlink). respectively.

In Windows 95/98 and other plug-and-play operating systems, the OS identifies the NIC at boot-up as new hardware through the PCI plug-and-play capability at 1300. This brings up the screen of FIG. 15. For Windows NT 3.51/4.0 the user may have to manually select to install a new network adapter and select "Have Disk" to identify the NIC as shown in FIG. 4. Once the card is identified, the user is prompted to install drivers for this new hardware. The present installation routines use oemsetup.inf (Used for NT) and hnetinst.inf that is required according to Microsoft's guidelines for hardware and a support library. ATML's routines including oemsetup.inf, netvlink.inf, and vlink.def are used.

Figure 17:
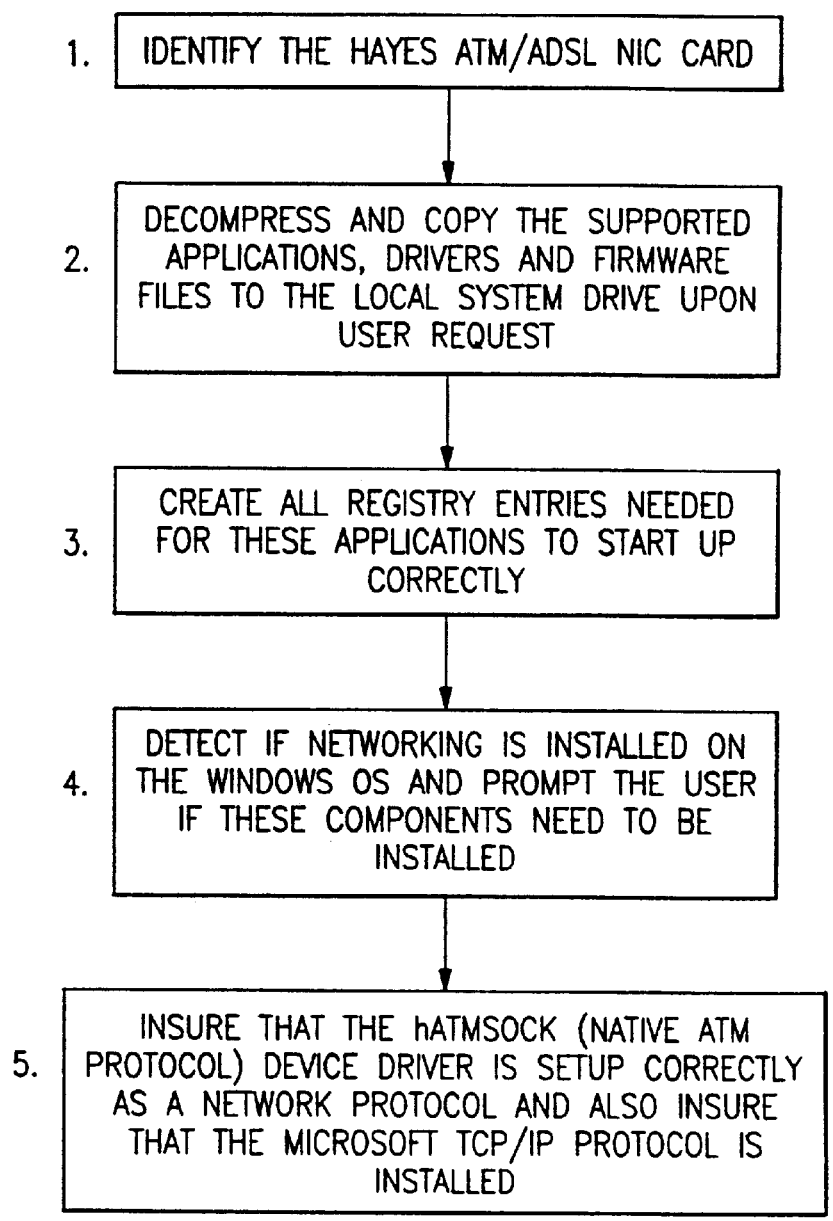
FIG. 17 shows a flowchart of different operations of installation.

ATML's setup files are stripped of unnecessary product support. Together with the support library these routines perform the following shown in FIG. 17:

1. Identify the Hayes ATM/ADSL NIC card at 1700.
2. Decompress and copy the supported applications, drivers and firmware files to the local system drive upon user request at 1702.
3. Create all registry entries needed for these applications to start up correctly at 1704.
4. Detect if networking is installed on the Windows OS and prompt the user if these components need to be installed at 1706.
5. Insure that the hAtmSock (Native ATM Protocol) device driver is setup correctly as a network protocol and also insure that the Microsoft TCP/IP protocol is installed at 1708.

A number of additional User Control and Monitoring Applications are used.

Figure 18:
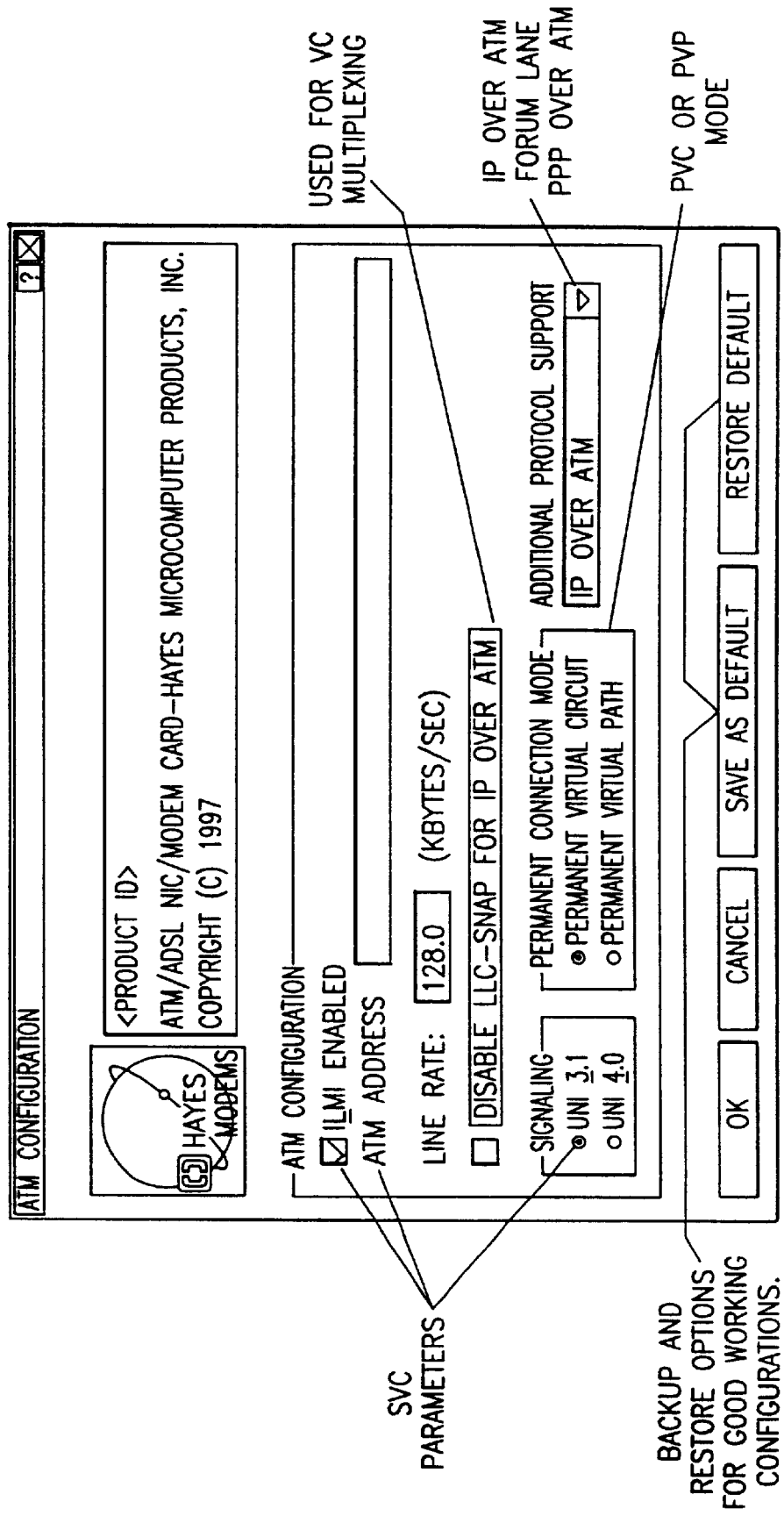
FIG. 18 shows a screen shot of application parameters.

The AdslNicP Network Control Panel Extension Library provides the NIC global properties from the Network Control Panel Applet when a user selects properties for the NIC adapter/FIG. 18 shows a screen shot of AdslNicP.exe.

Changing any of these parameters changes the network. Since these settings are set at startup, they cannot be dynamically changed after the NIC card is in an operational state. This requires the PC System to be rebooted for the changes to take effect. Hence, these changes cause a "BIND" action.

As shown in FIG. 18, this application provides a simple graphical interface for users to change-global ATM parameters.

This interface enables and disables the ILMI. If ILMI is disabled, then the dialog prompts for a proper ATM address.

The interface allows setting global signaling for SVC (Switched Virtual Circuits) connections.

The interface sets the connection mode for permanent connections (PVC or PVP).

It also provides selection for alternate protocol support such as IP over ATM or PPP over ATM.

The box also allows LLC-SNAP to be disabled for VC Multiplexing.

Finally, the system determines when the user has made changes to the global settings so a bindery action can be called for the network components. This action prompts the user to reboot before changes will take affect.

The routine also provides a means of saving and restoring a single working configuration in case the user makes a change that disables the network.

The ServiceMonitor Application has a function to allow the user of a Hayes ATM/ADSL NIC Modem PCI card to manage the network interface and obtain performance information about the network connections. This application must be executed before any network service connections can be established. Software interface provides the functions and applications.

Figure 19:
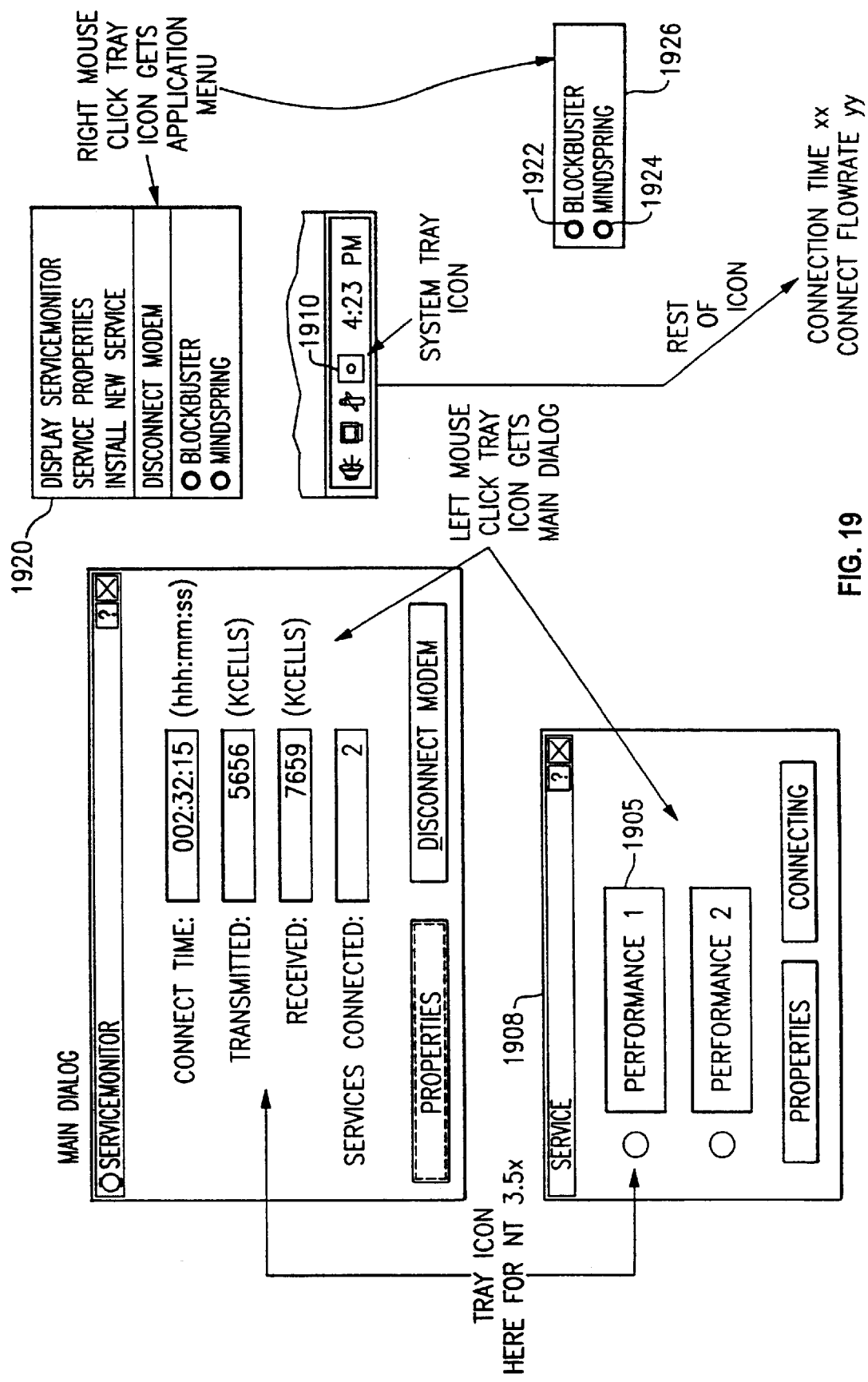
FIG. 19 shows a service monitor screen shot.

The interface uses a Simple Connection Status and Problem Indication. An LED style of status indication similar to the front panel of an analog modem is used. This is accomplished by providing a System Tray Icon in Windows 95 and NT 4.0 system tray as shown in FIG. 19). For Windows 3.5x this is accomplished by centering the Tray Icon on the left side of the main dialog (See FIG. 6).

The Tray Icon is formed of three artificially simulated LED's. The left represents transmissions of data. The right represents data received. These two LED's alternate between dark red and bright green colors for data movement.

Bright red indicate some sort of error in the data flow. The center LED is used to indicate line sync with the ADSL Modem. For this LED, red indicates loss of sync and bright green is the normal condition. This functionality is provided by 9 separate icons which are selected based on the states of variables discussed-above.

The System Tray Icon 1910 responds to various mouse actions. It allows the user to easily acquire global status information about the network interface. A Right Mouse Click brings up a System Menu 1920 displaying optional actions to provide the user with some information about the connection status of some selected services. As FIG. 19 above shows, the two services installed (BlockBuster 1920 and MindSpring 1921) as inactive due to the dark red LEDs 1922, 1924 to their left. If either of them were active, their associated LED turn bright green.

Left Mouse Click on the System Tray Icon brings up the main dialog 1900. The main dialog has global performance information 1905 that can be used to track data flow, connection time, and number of installed services. The connection time and flow rates can also be obtained through a ToolTip feature. When the mouse is positioned on the Tray Icon for approximately one second, connection time and flow rate are displayed.

Figure 20:
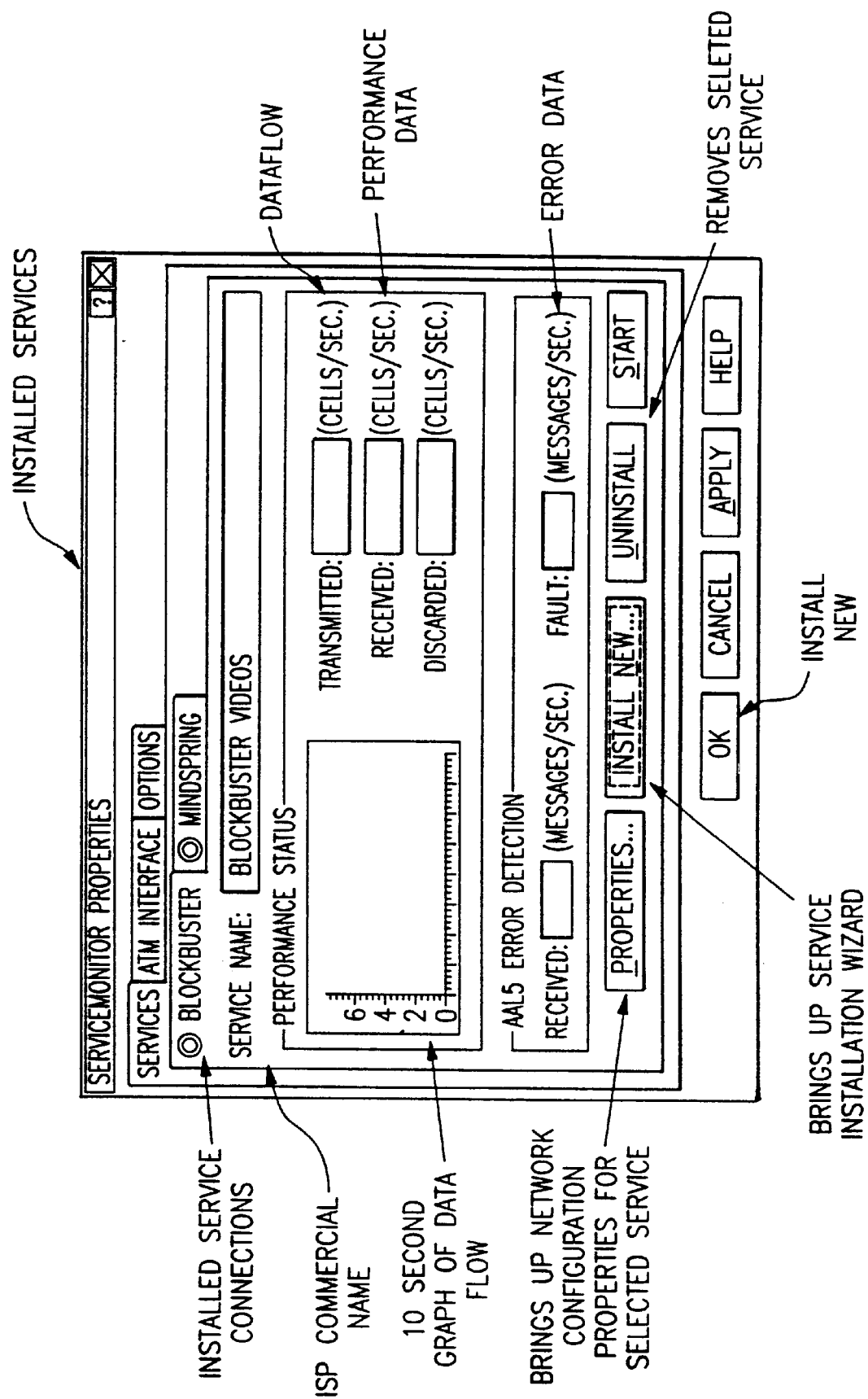
FIG. 20 shows a service connection screen shot.

The Service Connection Performance and Network Configuration is shown in FIG. 20.

Under normal operating conditions, when the user selects "Properties" from the main dialog, the Properties dialog is displayed (as shown in FIG. 20) only three main tabs—Services, ATM Interface, and Options. The two modem tabs are meant to be used for troubleshooting modem problems. These are defaulted to not display from the "Options" tab. The default tab to be displayed is the "Services" tab. This control style is a Property Sheet with Property Page Dialogs for tabs. All of the installed service connections are be displayed from a tab control to allow ease of service selection. The installed service tab names are user-configurative to allow customization. This installed service are placed on the Tray Icon system menu at the users request from the "Options" tab.

The user interface also provides performance data on all individual connections. To accomplish this, all service connections have the same performance data displayed upon selection of the service tab. This minimizes control creation and provides a consistent user interface to all performance data.

Performance data is acquired on 0.5-second intervals. The performance graph is an owner-drawn control created at run time with a ten-second history. User configurative parameters include changing the line colors for data representation.

When the user wants to verify connection parameters for any service, they can select the tab of the service to verify and then select "Properties". This brings up a static view of the connection settings for that service as shown in FIG. 21.

Figure 21:
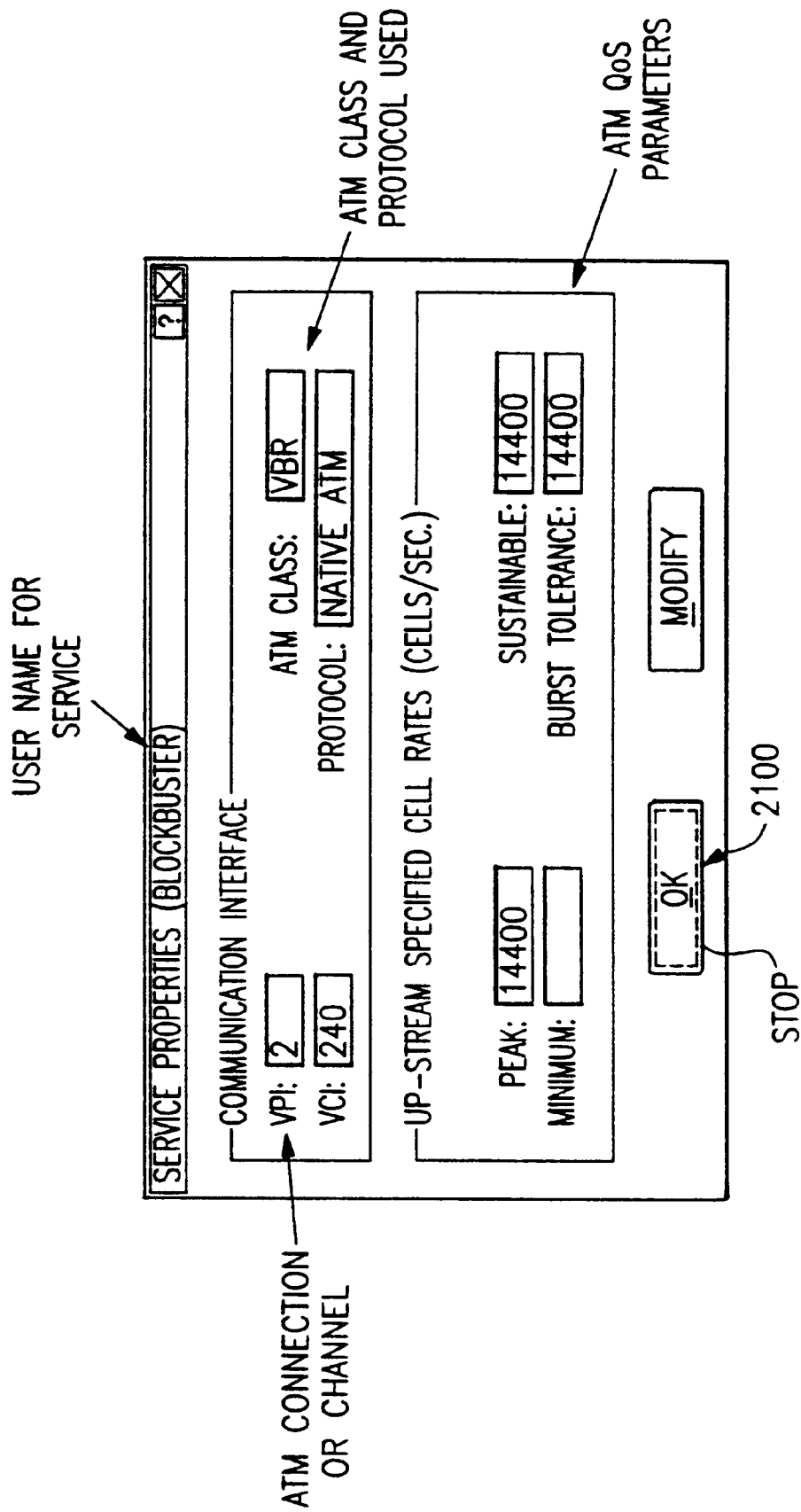
FIG. 21 shows a network connection screen shot.

FIG. 21 shows the network Configuration Properties Dialog (Service Properties). The Service Connection Modification of Network Configuration allows the user to manually adjust the connection parameters. "Modify" (See FIG. 21 above) is selected from the "Service Properties" dialog. This brings up the "Modify Service" dialog and the previous dialog "Service Properties" disappears. If the service being elected to modify were being actively connected, then a warning dialog appears notifying the user that any changes to an active service could cause loss of data. This warning dialog allows the user to cancel the modify action or continue to bring up the Modify dialog. While the user is in the modification dialog, changes can be made to any of the connection parameters including alteration of the tab name.

Figure 22:
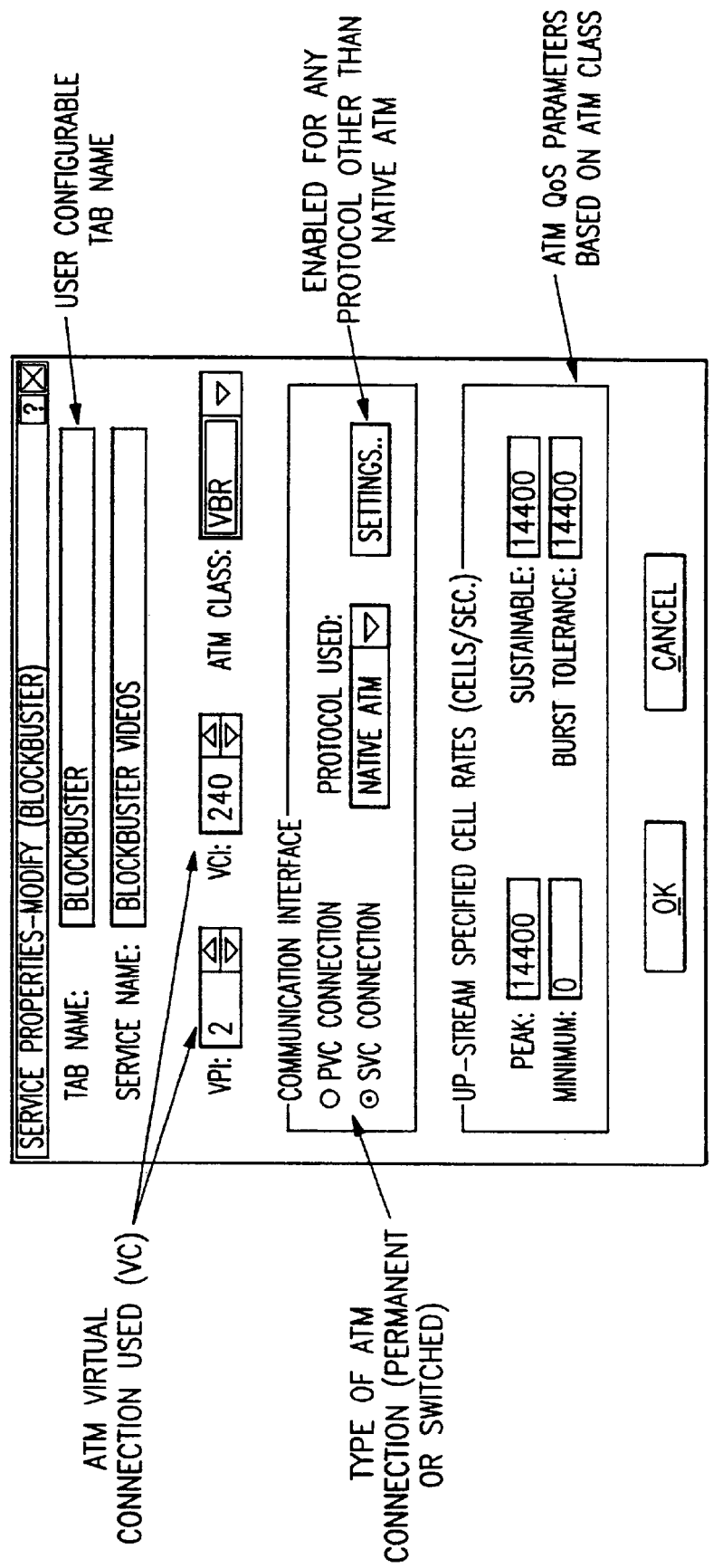
FIG. 22 shows the modified network configuration dialog.

FIG. 22 shows the User Interface Screen to Modify Network Configuration Dialog. This interface allows the user to configure the ATM parameters on a per connection basis as needed. This interface also has enough intelligence to prevent incorrect parameters from being configured (ie. Invalid VPI or VCI values, Policing of Specified Cell Rates to prevent exceeding Max Upstream bandwidth, etc.).

Figure 23:
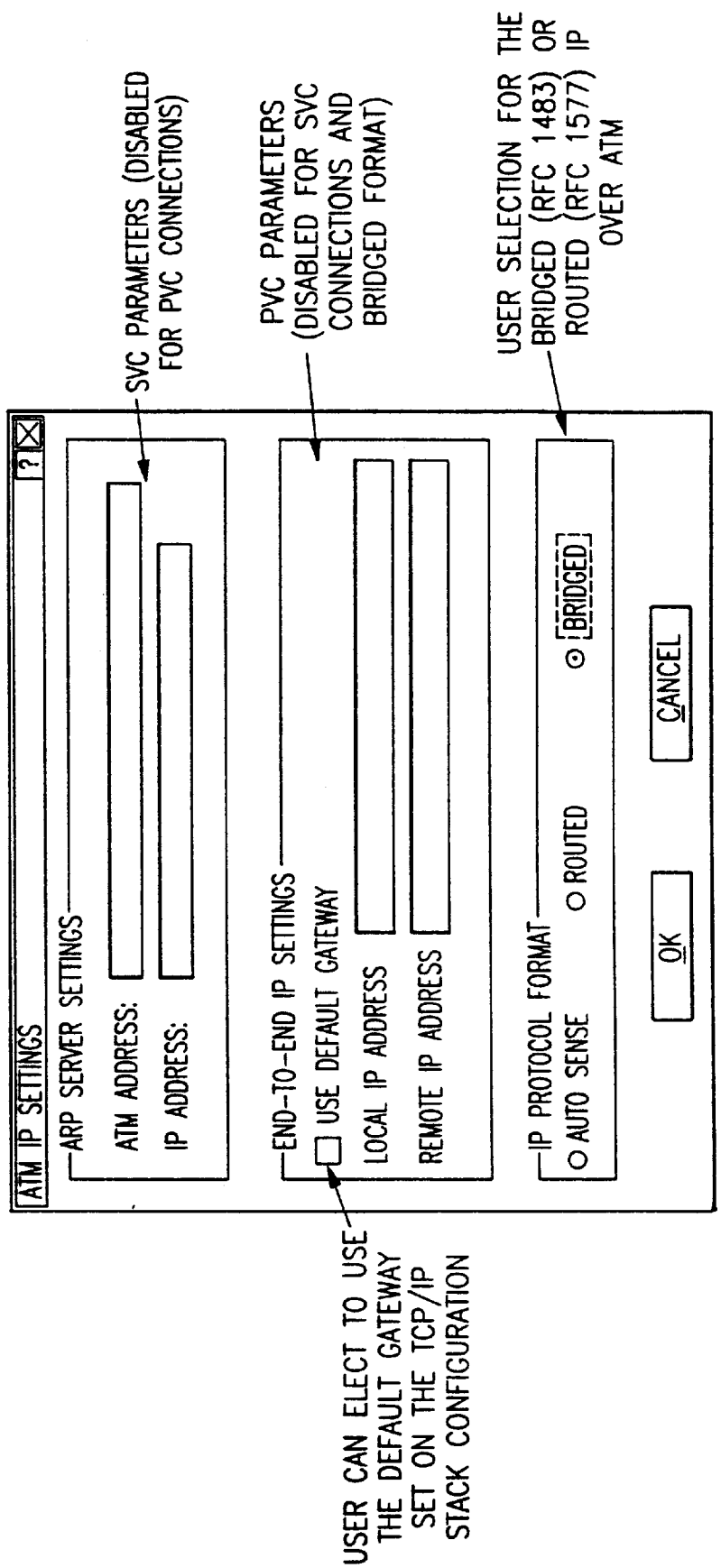
FIG. 23 shows connecting using asynchronous transfer mode over ATM connection dialog.
Figure 24:
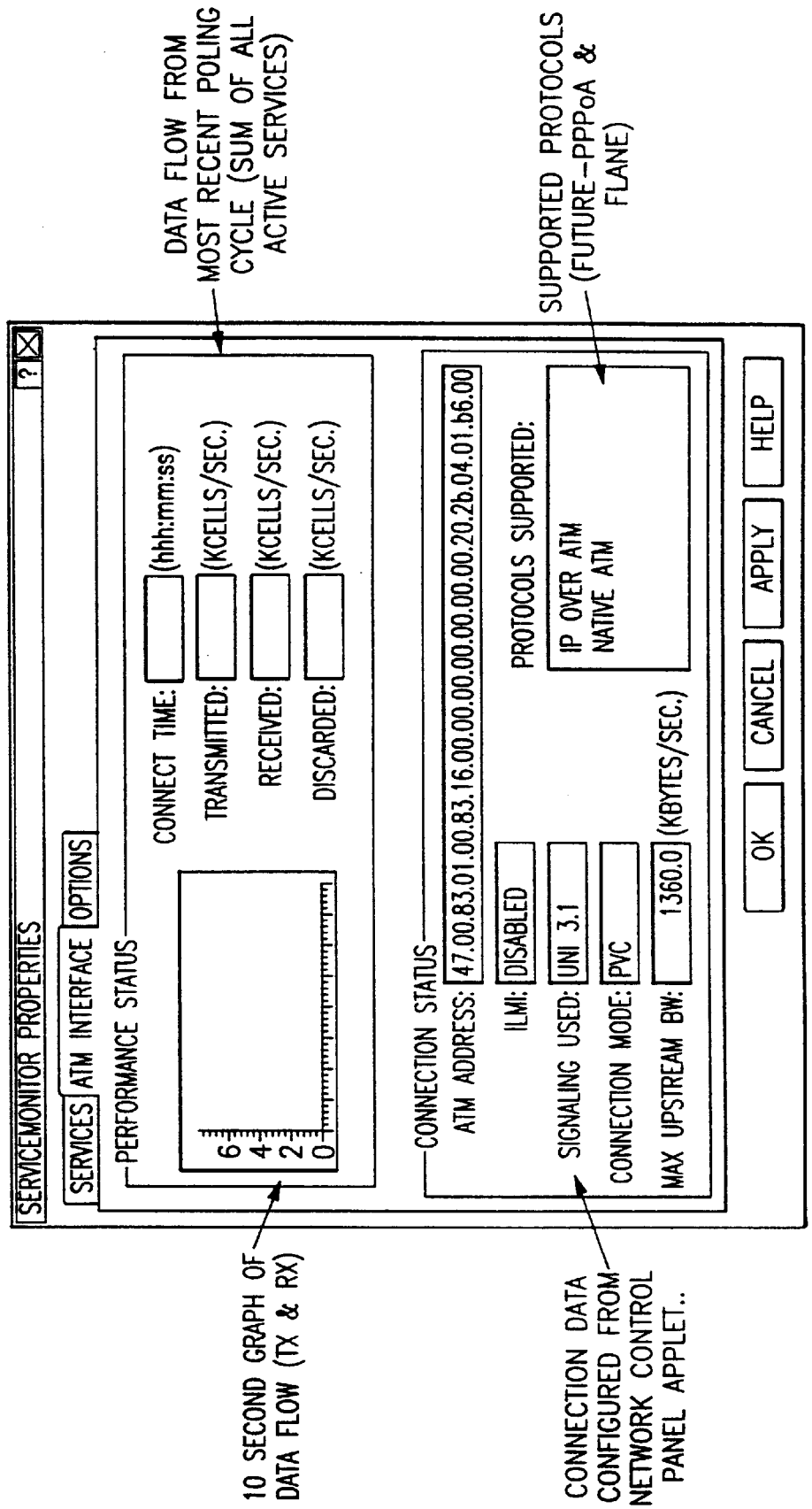
FIG. 24 shows the setup of global ATM.

For any service that is using any IP protocol over ATM, the "Settings" button is enabled and brings up a configuration dialog shown in FIG. 23 for that protocol if selected.

This configuration dialog provides a great amount of flexibility to the user. For a PVC connection using Routed IPOA, the user can elect to use the gateway IP address already configured in the TCP/IP protocol stack as the destination machine to connect to the Ethernet LAN. If the connection is a machine other than the gateway, then the user needs to provide the IP address of that machine to complete the connection. This configuration is simplified by the use of SVC's or Bridged IPoA. This interface satisfies the need for allowing multiple service configurations.

If a service is Active, then-the "Stop" button 2100 in FIG. 21 is enabled to allow the user to disable the service that could potentially be using required bandwidth that another service may need. This allows a user to properly manage connections without having to install and reinstall them when it is necessary to temporarily disable the service. This control disconnects all active connections to that particular service and does not allow any new connections for a 2-minute interval. After 2 minutes, then any new applications started can use the service.

Time delay is used instead of a set/reset type of function to avoid the user forgetting that the service has been disabled, and thinking that another problem exists. With an auto reset functionality the state of the service connection can be returned to normal without any other user interaction.

Figure 26:
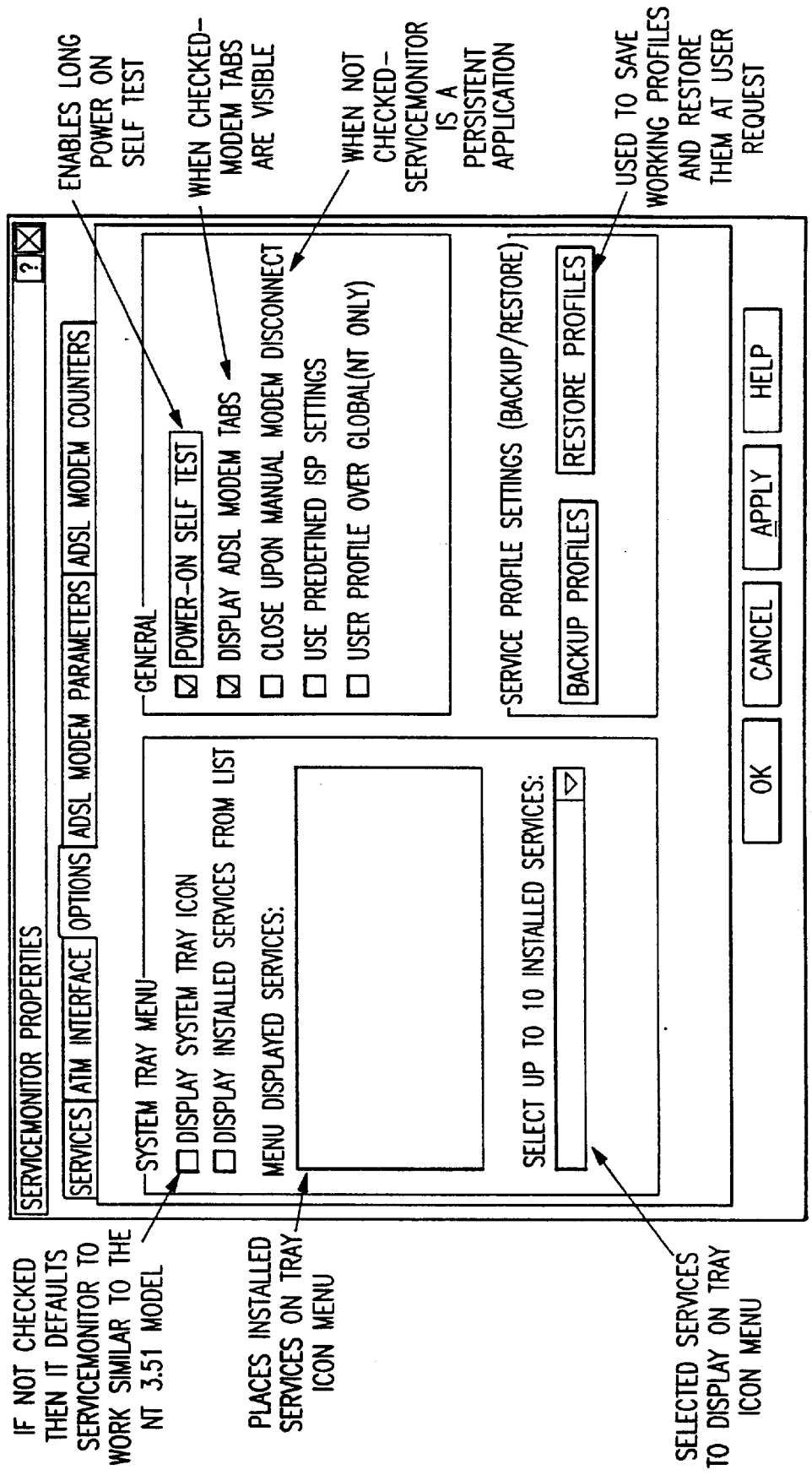
FIG. 26 shows the optionally configuration parameters tab for ATM.

FIG. 26 shows the Service Installation Wizard Dialogs Status of Global ATM Connection Performance and Configuration. The ATM Interface dialog displays global performance data and configuration setting to the user. This dialog is intended to be used for providing ISP's with configuration information in the event that a service installation fails or is working improperly. The connection status information is static and cannot be altered by the user in this application.

FIG. 25 shows Global ATM Network Performance and Configuration. The connection configuration should not be configured at an application level since a Network Bindery action is needed to complete and properly reconfigure. This action is required since this data is initialized for the ATM/ADSL NIC Adapter only at boot-up of the OS.

The ADSL Modem Performance and Operational Status is shown by the status monitoring application which displays ADSL modem performance. The two dialogs shown in FIG. 25 accomplish this task by statistically displaying modem performance. These dialogs were not designed for the novice user since the intent of these dialogs is to be used for troubleshooting problems with the ADSL, modem. The dialogs were designed with the assumption that the user viewing them has some advance degree of knowledge with ADSL technology. These dialogs are normally turned off for viewing through the "Options" tab dialog as shown in FIG. 26 below.

As with almost all applications, flexibility to meet different consumer needs and preferences is usually considered and configured as optional features or selections. These components do not impact the ability of this application to perform the required task of managing the Modem adapter and its varying flavors of interfaces. They provide the user with some ability to tailor that interface to meet varying preferences. This also allows to meet certain needs of the hardware that require configuration options, (ie. POST selection, Restoration of default settings, etc.).

The FIG. 26 dialog includes optional configuration parameters tab dialog. This dialog also provides a means of saving or restoring profile settings. This will be a method of networking for many users. It is expected that the user would need some method of restoration to a known working configuration. These optional functions allow saving and restoring of profiles on a global basis.

The NicCons application's main function is to act as a troubleshooting tool for problems that could potentially occur outside the scope of ServiceMonitor's control or status monitoring. This application allows the user to work from a command line and send single commands to the NIC and obtain the NIC's response to those commands This application carries out the following features:
1. Allows command line communication through a DOS Console to running processes residing on the NIC.
2. Switches between three main control processes:
    a) Hydrogen—This process is the main entry into the ATMos kernel.
    b) SNMP—This process allows a user to send out SNMP calls to the NIC cards MIR
    c) Modem—This process is the interface between the Hydrogen and the processor which controls the ADSL modem backbone.

The vsock protocol device driver from ATML is used as a Protocol Device Driver. This allows supporting any application developed using ATML's API without supporting the API itself. The file name will change to hAtmSock.vxd to simplify recovery of the driver if a user installs an ATML product on the same PC system.

Since ATML implemented the native ATM protocol in firmware, the protocol socket is actually a simple connection for passing data off to the driver and then to the firmware. This allows a user application to communicate to the protocol directly implemented in the firmware OS where all PDU's (Protocol Data Units) are actually assembled and disassembled. This model allows ATML to port the protocol socket easily to any platform and implement all <Protocol stack's> over ATM directly on the Hydrogen chip.

The existing driver that ATML provided is simply a plain communication module for sending and receiving data between the protocol stacks and the NIC (Firmware on Hydrogen chipset) as shown in FIG. 4 above. It only supports NDIS 3.x under Windows 95 and NT. Our requirements for this driver is the same with minor enhancement for asynchronous throughput and support of the processor chip.

Figure 27:
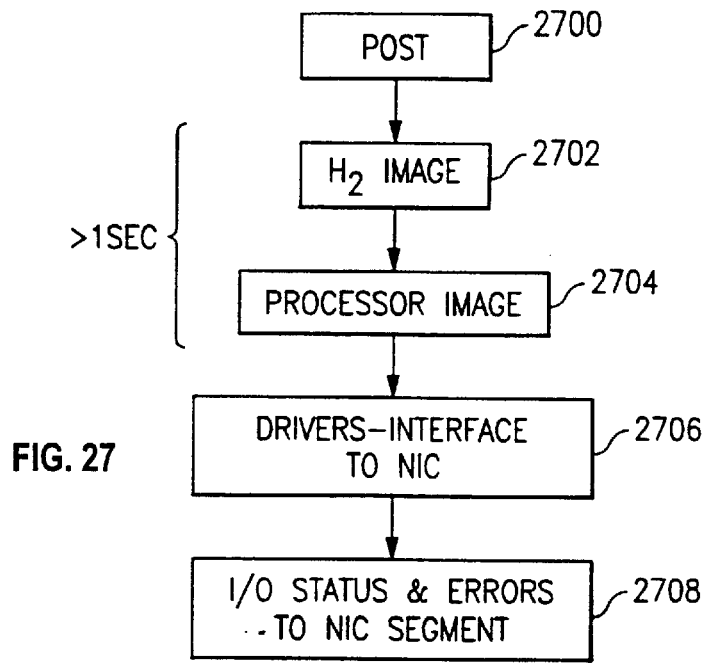
FIG. 27 shows a download flowchart.

This driver operates as follows and as shown in FIG. 27:
1. Initiate POST (Power on Self Test) sequence for both NIC and Modem in full or reduced mode as set by ServiceMonitor. The duration of the POST sequence shall be less than 5 seconds at 2700.
2. Ensure the following sequence of events occurs in less a than 1 second:
    a) Download Hydrogen image at 2702.
    b) Download 1960 image at 2704.
3. Provide communication interface between all supported protocols and the NIC at 2706.
4. Provide I/O status and error conditions to ServiceMonitor NIC management application.

The hNetLink NDIS 3.x Network Virtual Device Driver supports Windows 95 (ver A and OSR2), Windows NT 3.51 (all Service Packs) and Windows NT 4.0 (all Service Packs). The supported protocol stacks for this driver are Microsoft TCP/IP, NeBEUI, and ATML's Native ATM. This driver also supports the Windows 98 OS as well with Microsoft's Native ATM Protocols. hodiLink Netware ODI Virtual Device Driver driver supports the Novell ODI Network Interface under the following versions, Novell Netware 3.12, 4.x, and Novell IntranetWare. The protocol stacks supported are Novell TCP/IP and IPX/SPX. The API for hAtmSock protocol device driver is used for all Native ATM communications and for all management applications (ServiceMonitor, NicCons, etc.). This is a required driver for this product. The method of communication for applications to this driver is through obtaining a handle to the driver using "CreateFile" as shown:

```
For Windows 95:
    hDriver = CreateFile ("\\\\.\\vhadslid" GENERIC-READ I
GENERIC-WRITE, FILE_SHARE_READ I          FILE_SA\HARE_WRITE NULL, OPEN
EXISTING, FILE FLAG                  WRITE THROUGH I FILE FLAG OVERLAPPED I
    FILE_ATTRIBUTE_NORMAL, NULL);
For Windows NT:
    hDriver = CreateFile ("\\\\.\\khadslid" GENERIC-READ I
GENERIC-WRITE, FILE_SHARE_READ I FILE - SHARE     WRITE, NULL, OPEN
EXISTING, FILE_FLAG WRITE THROUGH       I FILE - FLAG - OVERLAPPED I
    FILE_ATTRIBUTE_NORMAL, NULL);
```

Once the handle is acquired then all communication is done using the Win32 function "DeviceIoControl". The dwIoControlCode member is what applications will use to communicate with all devices from this protocol and below. The following control codes are created by using the CTL_CODE macro defined in WINIOCTL.H (macro: CTL_CODE(DeviceType, Function, Method, Access)). For our applications the DeviceType, Method, and Access will always be FILE_DEVICE_NETWORK, METHOD_OUT_DIRECT, and FILE_ANY_ACCESS respectively. The code of interest to the applications is the "Function" member. This member falls within the range of 0x800 to 0xfff. The 0x800 to 0xbff range is used for legacy code from ATML and the 0xc00 to 0xfff range is used for any new codes defined by Hayes for this project. To ensure that this range is maintained, all control codes begin with 0x00 and use the macros below to get the base address.

define SM_FCMIN 0X800
define SM_FC_ATMADSL 0xc00

Table 1 below defines the codes used by this protocol.

TABLE 1

Control Codes for Establishing and Communicating with ATM Socket Connections

| Function | Old ATML Macro | New Macro | Control Code | Description |
|---|---|---|---|---|
| AtmVsSocket | VS_IOCTL_SOCKET | SM_IOCTL_SOCKET | 0x001 | Open Socket |
| AtmVs Close | VS_IOCTL_CLOSE | SM_IOCTL_CLOSE | 0x002 | Close Socket |
| AtmVsConnect | VS_IOCTL_CONNECT | SM_IOCTL_CONNECTION | 0x003 | Connect to Socket |
| AtmVsSend | VS_IOCTL_SEND | SM_IOCTL_SEND | 0x00a | Send Data to Socket |
| AtmVsQueueRecvBuf | VS_IOCTL_QUEUE_RECVBUF | SM_IOCTL_QUEUE_RECVBUF | 0X00c | Set Received Buffer |
| AtmVsRecv | VS_IOCTL_RECV | SM_IOCTL_REVC | 0x00e | Not Used For Now |
| AtmVsDebug | VS_IOCTL_DEBUG | N/A | 0x000 | Not Used For Now |
| AtmVsListen | VS_IOCTL_LISTEN | N/A | 0x004 | Not Used For Now |
| AtmVsAccept | VS_IOCTL_ACCEPT | N/A | 0x005 | Not Used For Now |
| AtmVsReject | VS_IOCTL_REJECT | N/A | 0x006 | Not Used For Now |
| (Not Implemented) | VS_IOCTL_BIND | N/A | 0x007 | Not Used For Now |
| AtmVsGetSockName5 | VS_IOCTL_GETSOCKNAME | N/A | 0x008 | Not Used For Now |
| AtmVsGetPeerName | VS_IOCTL_GETPEERNAME | N/A | 0x009 | Not Used For Now |
| AtmVsCancelSend | VS_IOCTL_CANCELSEND | N/A | 0x00b | Not Used For Now |
| AtmVsCancelRecv | VS_IOCTL_CANCEL_RECV | N/A | 0x00d | Not Used For Now |
| (Not Implemented) | VS_IOCTL_GET_RECVBUFLEN | N/A | 0x00f | Not Used For Now |
| (Not Implemented) | VS_IOCTL_SET_RECVBUFLEN | N/A | 0x010 | Not Used For Now |
| (Not Implemented) | VS_IOCTL_FLUSH_RECVDATA | N/A | 0x011 | Not Used For Now |
| (Not Implemented) | VS_IOCTL_CIRCULARBUFFER | N/A | 0x012 | Not Used For Now |
| (Not Implemented) | VS_IOCTL_GET_CIRCBUFF | N/A | 0x013 | Not Used For Now |
| AtmVsSelect | VS_IOCTL_ASYNCSELECT | N/A | 0x014 | Not Used For Now |
| AtmVsSetQos | VS_IOCTL_SETQOS | N/A | 0x015 | Not Used For Now |
| AtmVsGetQos | VS_IOCTL_SETQOS | N/A | 0x016 | Not Used For Now |
| AtmVsSetLowMark | VS_IOCTL_SETLOWBUF | N/A | 0x017 | Not Used For Now |
| AtmVsSockIoct1 | VS_IOCTL_SOCKIOCTL | N/A | 0x018 | Not Used For Now |
| AtmVsGetVersion | VS_IOCTL_GETVERSION | N/A | 0x019 | Not Used For Now |
| AtmVsAddParty | VS_IOCTL_ADDPARTY | N/A | 0x01a | Not Used For Now |
| AtmVsDropParty | VS_IOCTL_DROPPARTY | N/A | 0x01b | Not Used For Now |

Presently, there are no new control codes needed for this protocol. As shown in Table 1 above, only 6 existing codes are to be used by the management applications. These codes are used to establish a connection to the Hydrogen for SNMP calls.

API for hNetLink was created by ATML to be a MiniPort network driver with minimal functionality for passing data, downloading firmware images and INI files, etc. At present, there are no control codes to be used by this driver. This driver is accessed by the Sock Protocol driver through NDIS and has no direct interaction with this driver.

Communication to the ATM module (Hydrogen Chip) uses the following control mechanism.

Figure 28:
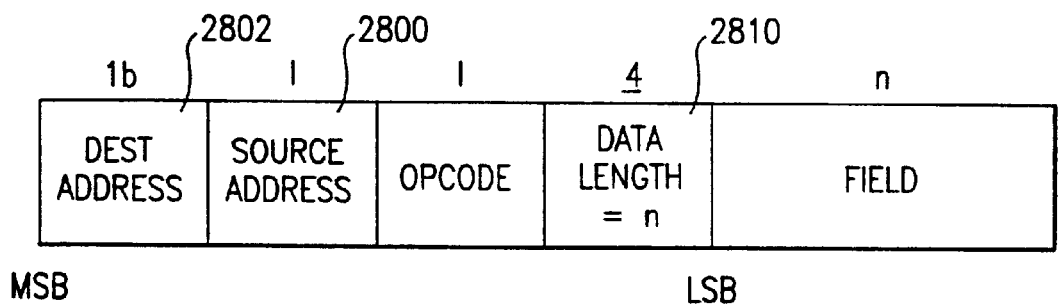
FIG. 28 shows a preferred data structure used for the download flowchart.

```
#define NIC_CTLCM D(Destination, Source, OpCode, DataSz) I
((Destination << 24) 1 (Source << 16) 1 (OpCode << 8) 1 (DataSz)
#define STRIP CTLCODE              255L
#define CTLCMD DEST(NICCtlCmd)     (NicCtlCmd >> 24
#define CTLCMD_                    ((NicCtlCmd >> 16) & STRIP
SOURCE(NicCtlCmd)                  CTLCODE)
#define CTLCMD_                    ((NicCtlCmd >> 8) & STRIP-
OPCODE(NicCtlCmd)                  CTLCODE)
#define CTLCMD_                    (NicCtlCmd &
DATASZ(NicCtlCmd)         STRIP_CTLCODE)
``` using the format shown in FIG. 28.

| one byte | one byte | one byte | one byte | n bytes |
|---|---|---|---|---|
| destination address | source address | opcode | length of data (n = lenx4) | data field with opcode-specific format |
| MSB | | | | LSB |

This is based on Management & Control Entity Addresses shown, in Table 2.

| Entity | Address |
|---|---|
| Host Management Application | 0x01 |
| Host Data Handler | 0x02 |
| Host Debug Port A | 0x03 |
| Host Debug Port B | 0x04 |
| Host Debug Port C | 0x05 |
| Host Debug Port D | 0x06 |
| Host Service & Test Application | 0x07 |
| OBC Management Application | 0x10 |
| OBC Selftest Agent | 0x11 |
| OBC Debug Process 1 | 0x12 |
| OBC Debug Process 2 | 0x13 |
| OBC Debug Process 3 | 0x14 |
| OBC Debug Process 4 | 0x15 |
| Hydrogen Debug Process 1 | 0x20 |
| Hydrogen Debug Process 2 | 0x21 |
| Hydrogen Debug Process 3 | 0x23 |
| Hydrogen Debug Process 4 | 0x24 |
| Hydrogen Management Interface | 0x25 |
| Reserved for SYNC | 0x55 |
| Reserved for SYNC_ACK | 0xAA |
| Reserved for SYNC | 0x33 |
| Reserved for SYNC_ACK | 0xCC |

Table 3 shows Management Commands

| Command | Opcode | Data Field Length | Data Field Contents |
|---|---|---|---|
| NIC_INIT_CONN_TABLE | 0x01 | (n) | Installed Services (VC's) |
| NIC_REINIT_CONN_TABLE | 0x02 | (n) | New Connection Table |
| NIC_CREATE_CONN_ENTRY | 0x03 | (?) | New VC Entry |
| NIC_REMOVE_CONN_ENTRY | 0x04 | 4 | VC Entry Value |
| NIC_UPDATE_CONN_ENTRY | 0x05 | (?) | VC Entry Data |
| NIC_REMOVE_CONNECTION | 0x05 | 4 | VC Connection Value |
| NIC_SUSPEND_CONNECTION | 0x06 | 4 | VC Connection Value |
| NIC_VC_PERF_DATA | 0x07 | 4 | VC Connection Value |
| NIC_ALL_VC_PERF_DATA | 0x08 | 0 | N/A |
| NIC_PROCESS_INI_SETTINGS | 0xAO | 0 | N/A |
| NIC_MULTIPLE_COMMANDS | 0xDO | 8 or > | Mult. Commands |

Detailed Component Design

Common code headers and guidelines for code development for all software components simplify moving across multiple projects with greater efficiency.

Development Language (Compilers, Linkers, etc.)

All components of this product are preferably compiled with Microsoft Visual C++ Version 5.0. The only exception is the Device Drivers that may need MASM as well. Since this card is targeted for a PCI bus, assumptions are made that the target systems will be Intel Pentium based. The following compiler options are used for release builds except where noted:
1. General
   a) Warning level set to "3".
   b) Optimizations set to "Minimize Size".
   c) Preprocessor definitions:
NDEBUG,WIN32,_WINDOWS,_CPLUSPLUS
2. C++ Language
   a) Pointer-tomember representation method set to "Best-Case Always"
   b) Enable exception handling.
3. Code Generation
   a) Processor set to "Pentium".
   b) _cdecl Calling convention.
   c) Run-time Libraries linked statically using Multi-threads.
   d) Struct member alignment should be set to 8 Bytes.
4. Do not use precompiled headers.
5. All defined preprocessor definitions should be in Upper Case and they should begin and end with ' ' characters.

The linker options for release builds should not be set for incremental linking. If a project has settings other than these listed, it is noted inside the project Readme.txt file. Project Source File Names and Required Files Guidelines include the following:
1. Do not restrict file names to an 8.3 format unless there is cause to do so.
2. Files containing C++ code should have a cpp extension and files that contain ONLY C code should have a.c extension.
3. All headers will have a.h extension.
4. Class objects that will be used in multiple source files should be contained in separate source files. For these types of objects the filename should be the name of the Class excluding the "C" header if used (ie. CmyClass—filenames are MyClass.cpp and MyClass.h).
5. For source files that contain only "C" code, the file should contain related functions that correspond to a package of features. The feature should some how be related to the filename (ie. NicComm.c—Source file contains functions for sending and receiving data to a NIC card).

All projects should contain the following folders for source code organization:
1. Source Files—Files that have extensions "cpp;c;cxx;rc;def-,r;odl;idl;hpj;bat".
2. Header Files—Files that have extensions "h;hpp;hxx-;hm;inl".
3. Resource Files—Files that have extensions "ico;cur;bmp;dlg;rc2;rct;bin;cnt;rtf;gifjpgjpegjpe"
4. Help Files—Files that have extensions "cnt;rtf".
5. Documents—Files that have extensions "doc;txt;pdf".

On the main project branch there are three files included with every project. These files are described as follows:
1. Readme.txt—This file contains a detailed description of the module developed (this can be taken from this document). It also contains any exceptions to this specification and why they are needed.
2. ScodeS.txt—This file contains the standards used for all source code within that module, if different than these guidelines. The creators standards must at least meet or exceed those mentioned in this document.

3. <Pname>.reg—This file contains all registry entries needed for this module. This file is used by the installation routines to properly install this module.

Example. reg file for ServiceMonitor:

```
REGEDIT
;This REG file may be used by your SETUP program.
;If a SETUP program is not available, the entries below will be
;registered in your InitInstance automatically with a call to
;CWinApp::RegisterShellFileTypes and
OleObjectFactory::UpdateRegistryAll.
HKEY_CLASSES_ROOT\ServiceMonitor.Application - ServiceMonitor
Application
HKEY_CLASSES_ROOT\ServiceMonitor.Application\CLSID=
{497A0BC5-2561-11D1-SAF8-00805FCDE 1138)
HKEY_CLASSES_ROOT\ServiceMonitor.Application\CurVer -
ServiceMonitor.Application. 1.0
HKEY_CLASSES_ROOT\CLSID\{497A0BC5-2561-1
1D1-8AF8-00805FCDE1B8} = ServiceMonitor Application
```

Guidelines for "C" Source Code Development

This project contains a large amount of 3rd party developed source code that is exempt from this standard. Also, if your module contains an ScodeS.txt file that does describe an alternate code standard, then these standards do not apply. If any work is to be done to enhance the third party application in terms of new code then this guideline is followed. If the work to enhance third party code is simple bug fixing or minor alteration then attempt to conform to the standard- present inside the existing code.

1. All macros and enum types are in Upper Case unless noted.

```
Example:    #define MY_MACRO         0xffffffff
            typedef enum {
            MY-FIRST - VALUE,
            MY_SECOND_VALUE
            }MyEnumType;
```

2. All functions used inside multiple source files (.c) start with a lower case letter.

Example: void myExportedFunction (int myData);

3. All user defined data types and structures are configured as shown below:

```
        Example:    typedef struct -myStructData{
        ...
            MyStructData, *MyStructDataLP;
            typedef long MyDataType;
```

4. All function definitions have a comment header as shown below (Note: The Argument section is only needed if the function has arguments):

```
// Function name   :myExportedFunction
// Description     :This function does nothing.
// Return type     :void
//Argument         :int myData - This is used for data    input.
```

Guidelines for "C++" Source Code Development

Same as "C" source code in section 4.1.3 with addition of Class creation as follows:

1. All class declarations begin with "C" (ie. class CMyClass -.).

2. All data is encapsulated (private) unless otherwise noted. If the information is not in its encapsulated state, the reason is in the ReadMe.txt file for your project or within the source code with comments.

3. All member functions begin with a capital letter (ie. void CmyClass::MyFunction The Oemsetup Setup Information File is the Installation Setup script for the ATM/ADSL NIC product.

The Atmncdet Setup Extension Library is used with the setup script for executing routines that the script could not support.

The AdslNicP Network Control Panel Application is an extension DLL is the "Properties" screen for the NIC Adapter Card launched from the Network Control Panel Applet. This DLL provides the interface for modifying the global ATM and ADSL parameters. This interface is dialog-based and signals the OS when a network bindery action takes place. It also allows the user to save the present settings as the default and restores default settings upon request.

Main Dialog Class (AdslNicP.h) object is designed to interface with the user through a dialog based user interface. It is responsible for displaying to the user the current global ATM interface settings and allow him/her to make changes easily. Upon any changes being made and the dialog closing, this object updates the bindery information for all network components through the Network Control Panel Applet. If a change is made that is out of scope with the capability of this NIC then this object notifies this information to the user and provides possible alternative parameters.

The AdslNicP.h header contains the class member functions and data needed to implement the "Properties" dialog referenced in FIG. 5 above. This file requires data referenced in other header files to implement this class object properly (ServiceMonitorData.h, resource.h).

The following controls are defined in resource.h:

| | |
|---|---|
| IDCBM_CORPLOGO | Hayes Microcomputer Products, Inc. Company bitmap logo |
| IDCS_FIRM_VENDVER | Firmware Vender and Version static label |
| IDCG_ATMCONFIG | ATM Configuration group |
| IDCCKB_ILMIENABLED | ILMI Enabled Check Box |
| IDCS_ATMADDRESS | ATM Address Static Label |
| IDCE_ATMADDRESS | ATM Address Edit Control |
| IDCS_LINERATE | Purchased Line Rate Static Label |
| IDCE_LINERATE | Purchased Line Rate Edit Control |
| IDCS_LINERATE_UNITS | Purchased Line Rate Units Static Label |
| IDCCKB_DISLLCSNAP | Disable LLC-SNAP for IP over ATM Check Box |
| IDCG_SIGNALING | Signaling Group Control |
| IDCRB_UN131_SIG | UNI 3.1 Signaling Radio Button Control |
| IDCRB_UN140_SIG | UNI 4.0 Signaling Radio Button Control |
| IDCG_CONNMODE | Permanent Connection Mode for ATM card |
| IDCRB_PVCMODE | Permanent Virtual Circuit Radio Button Control |
| IDCRB_PVPMODE | Permanent Virtual Path Radio Button Control |
| IDCS_SUPPORTECPROTS | Additional Protocol Support Static Label |
| IDCCB_SUPPORTECPROTS | Additional Protocol Support Combo Box |
| IDCB_OK | OK Button Control |
| IDCB_CANCEL | Cancel Button Control |

-continued

| | |
|---|---|
| IDCB_SAVESDEFAULT | Save As Default Button Control |
| IDCB_RESTOREDEFAULT | Restore Default Button Control |

The Class Header is Shown Below:

```
class CAdslNicP: public Cdialog
{DECLARE_DYNAMIC(CAdslNicP);
//Construction public:
        CadslNicP(CWnd* pParent = NULL);
// standard constructor
        virtual -CAdslNicP0;
// Dialog Data
private:
        SMDGlobalATMSettings m - GlobalSettings;
        bool mb_SettingsModified;
//{{AFX - DATA(CAdslNicP)
        enum { IDD = IDD_ADSLNICPROP_DIALOG};
// NOTE: the ClassWizard will add data members here
//}}AFX_DATA
// ClassWizard generated virtual function overrides
//{{AFX_VIRTUAL(CAdslNicP)
        virtual BOOL OnInitDialog( );
//} }AFX_VIRTUAL
//Implementation
private:
// These functions are used to modify the registry
        bool GetRegGlobalProfile( );
        bool SetRegGlobalProfile( );
        BOOL SetBindaryAction( );
protected:
// Generated message map functions
//{{AFX_MSG(CAdslNicP)
        afx - msg void OnOk ( );
        afx_msg void OnCancelUpdate( );
        afx_msg void OnllmienabIed ( );
        afx_msg void OnUpdateAtmAddress( );
        afx_msg void OnUpdateLinerate( );
        afx - msg void OnDisllcsnap( );
        afx_msg void OnUni3 I Sig( );
        afx_msg void OnUni40Sig( );
        afx_msg void OnPvcMode( );
        afx_msg void OnPvpMode( );
        afx_msg void OnSelchangeSupportedProts( );
//}}AFX_MSG
        DECLARE_MESSAGE_MAP()};
Class Constructor - CadslNicP( )
```

This is used to construct the standard class for making global setting changes to the ATM/ADSL NIC card. The m_GlobalSettings and mb_SettingsModified member data is initialized in this function. The m_GlobalSettings data are initialized with GetRegGlobalProfile( ) and mbSettingsModified ia initialized to false.
Return Type:None.
Function Params: None.
Class Destructor—CAdslNicP( )
Description: Standard destructor. No significant change other than standard return is needed for this class. However, if memory is allocated within other class functions and stored within the class member data then that memory needs to be destroyed here!
Return Type: None.
Function Params: None.
Function Override—BOOL OnInitDialog( )
Description: Initialization of member data is done here for the UT controls prior to display of the dialog itself. This data resides in the m_GlobalSettings member that was initialized in the creation of this class.
Return Type: BOOL. "TRUE" for function success and "FALSE" for failure.
Function Params: None.

Private Function—bool GetRegGlobalProfile( )
Description: Used to scan the registry for all of the global ATM interface parameters to establish valid connections (Key value—HKEY_LOCAL_MACHINE\SOFTWARE\Hayes\ServiceMonitor\Interface).
These parameters are to be stored in m_GlobalSettings member.
Return Type: bool. "True" for function success and "false" for failure.
Function Params: None.
Private-Function—bool SetRegGlobalProfile( )
Description: Used to update the registry for all of the global ATM interface parameters changed by the user in the UI (Key value—HKEY_LOCAL_MACHINE\ SOFTWARE\Hayes\ServiceMonitor\nterface). When changes have been made the member variable "mb—SettingsModified" will be set to true and the changes made by the user will be stored in the m_GlobalSettings member.
Return Type. bool. "True" for function success and "false" for failure.
Function Params: None.
Private Function—BOOL SetBindaryAction( )
Description: When changes are made to the global'settings, this function is called to initiate a bindery action for the Network Control Panel Applet. This in turn notifies the user that he/she should reboot the system before these new settings can take effect.
Return Type. BOOL. "TRUE" for function success and "FALSE" for failure.
Function Params: None.
Message Mapped Functions—afx—msg void OnOk( ) andafx_msg void OnCancel( )
These functions are used to know when to call SetRegGlobalProfile( ) and SetBindaryAction( ). If the user has made changes to the global settings and he selects OK, then a bindery action takes place before exiting the Network Control Panel Applet. If the user selects Cancel, then all changes are trashed and the applet will exit normally. Both of these functions call their corresponding CDialog::OnOK( ) and CDialog::OnCancel( ) functions prior to returning. If either SetRegGlobalProfile( ) or SetBindaryActiono functions fail, then the user is notified with a standard dialog warning message box. Some attempt is made to ascertain the nature of the failure. If the OS is NT, the user might not be the Administrator, etc.

All remaining functions are message mapped functions. These functions are used to make changes to the m—GlobalSettings member and set the mb_SettingsModified member if a change was made that is different from the existing value. These functions should rarely fail so there is no need to handle errors within them. The guidelines for the control interaction is described above.

The ServiceMonitor NIC Status and Management Application is the main management and Status application for the NIC Adapter Card.

The Main Application Class.(ServiceMonitor.h)is the main application class to start the ServiceMonitor Management and control application. Its purpose is to establish all registered messages, create the main dialog for ServiceMonitor, and establish a mechanism for only allowing a single instance of this application to function.

```
//CServiceMonitorApp:
//See ServiceMonitor.cpp for the implementation of this class
class CServiceMonitorApp : public
CWinApp
public: CServiceMonitorApp( ); CDialog *mp_MainDialog;
Overrides
// ClassWizard generated virtual function overrides
//{{AFX - VIRTUAL(CServiceMonitorApp)
public:
    virtual BOOL InitInstance( );
    virtual void WinHelp(DWORD dwData, UINT nCmd
    HELP_CONTEXT);
//} I AFX_VIRTUAL
    Data static const UINT mcui_ExitWindowsRM;
private:
    bool mb_ClassRegistered;
    Implementation public: BOOL AFXAPI IsHelpKey(LPMSG
    lpMsg),
private: bool FirstInstance( );
protected: afx_msg void OnCloseServiceMonitorApp(WPARAM
wParam, LPARAM lparam);
//{{AFX - MSG(CServiceMonitorApp)
afx_msg    void OnContextHelp( );
afx - msg void OnSmHelp( );
//}}AFX MSG
DECLARE_MESSAGE_MAP( )
Class Constructor - CServiceMonitor( )
```

Description: Constructs a WinApp application class to manage the ATM/ADSL NIC Adapter.
This also starts the message pump for this application.
Return Type: None.
Function Params: None.
Class-Destructor—CserviceMonitoro
Description: Shuts down any and all processes started by this application and frees any resources being used.
Return Type. None.
Function Params: None.
Function override—BOOL InitInstance( )
Description: Creates the main class for this application to allow only a single instance of itself.
Also creates the main window class and the main ServiceMonitor dialog.
Return Type: BOOL.
Function Params: None.
Function Override—void WinHelp(DWORD dwData, UINT nCmd)
Description: Directs all help calls to the proper language help files. See WinHelp Windows function description for details on arguments.
Return Type. void.
Function Params: DWORD dwData—Depends on nCmd member.
UINT nCmd—Specifies the type of help requested.
Public Function—BOOL AFXAPI IsHelpKey(LPMSG IpMsg)
Description: Traps <Shift> F1 keyboard commands to call context sensitive help.
Return Type: BOOL AFXAPI.
Function Params: LPMSG IpMsg—Message parameter passed into
PreTranslateMessage functions.
Private Function—bool FirstInstance( )
Description: Check for a previous instance of this application by searching for a window with our specific pre-registered class name. If one is found, then-activate it and-return false.
Return Type: bool.
Function Params: None.
Message Mapped Function—afx_msg void OnCloseServiceMonitorApp(WPARAM wParam,
LPARAM lparam)
Description: Called by a registered massaged "SMWRM—SERVICEMONITOR_EXIT_MSG".
This function allows another control application to force ServiceMonitor to shut down and exit.
Return Type: void.
Function Params: WPARAM wParam—Used to pass information for the requested shutdown.
LPARAM lParam—Normally set to 0.
Message Mapped Function—afx_msg void .OnContextHelp( )
Description: Traps all context sensitive help calls to determine when help should be called instead of context help for dialogs.
Return Type. void.
Function Params: None.
Message Mapped Function—afx_msg void OnSmHelp( )
Description: Used for external calls tb Se rviceMonitor help.
Return Type: void.
Function Params: None.
Main    Dialog    Class—CServiceMonitorDlg (ServiceMonitorDlg.h)
The main ServiceMonitor dialog is created with this class.
All threads and application data are initialized in this class to control and manage the ATM/ADSL NIC Adapter. This class or members of this class initiate global performance data and control functions.

```
// ServiceMonitorDlg.h: header file
Copyright (c) 1997 Hayes Microcomputer Products, Inc.
class CserviceMonitorDlgAutoProxy;
// CServiceMonitorDlg dialog
class CserviceMonitorDlg: public CDialog
DECLARE        -
DYNAMIC(CServiceMonitorDlg);
friend class    CServiceMonitorDlgAutoProxy;
Construction public: CServiceMonitorDlg(CWnd* pParent - NULL); standard constructor virtual
-CServiceMonitorDlgo;
Data public:
enum
SMD STATUS INIT - 0,
SMD_STATUS_IDLE,
SMD STATUS TR
SMD STATUS_ENDTR,
SMD STATUS_ERRTR,
SMD STATUS_RX,
```

-continued

```
SMD STATUS_ENDRX,
SMD_STATUS_ERRRX,
SMD STATUS MODDISCONNECT,
SMD_STATUS_ERROR
enum SMWM SHELLNOTIFYICON -(WM_APP+100), SMWM GETGLOBALPROTOCOL, SMWM
CHANGEGLOBALPROTOCOL, SMWM SCM DISPLAYDLG, SMWM SCM MONITORPROPS. SMWM
SCM INSTNEWSERV, SMWM SCM CONNDISCONN // Used for internal updates CServiceMonitorProfile
mp_SMSessionProfIle; CBitmap mbc - ServConnStatActive; CBitmap mbc_ServConnStatInactive;
CBitmap mbc_ServConnStatError;
Private:
        NOTIFYICONDATA m_SMD_NotifyIconId;    // This is the System Tray Icon
Information
        CString msc_SMD - NotifyIconStatus;// Tip string data for STI.
        CWinApp *mp_ServiceMonitorApp;
        HACCEL mhac_Global;
        HICON mhi - Main;
        double md_ConnectionTime;
// Total modem connection time.
        double md - TransmittedAmount;
Total modem transmitted quantity.
        double md ReceivedAmount;
Total modem received quantity.
        boot mb ADSLModemIsConnected;
        boot mb ShellRMDbIClick;
        boot mb IsAccelHelp;
        boot mb_DialogShel I Icon;
Dialog Data
        //{{AFX I DATA(CServiceMonitorDlg)
        enum IDD - IDD_SERVICEMONITOR_DIALOG
NOTE: the ClassWizard will add data members here //}}AFX_DATA
// ClassWizard generated virtual function overrides //{{AFX_VIRTUAL(CServiceMonitorDlg) public: virtual
BOOL PreTranslateMessage(MSG* pMsg); protected: virtual void DoDataExchange(CDataExchange*
pDX);// DDX/DDV support virtual void PostNcDestroy();//}}AFX_VIRTUAL
Implementation public: boo] ShowServiceProperties(UINT startPage); void OnDisplayServiceMonitorDIg();
// ADSL Modem Functions void ModemconnDisconn(); boot Modemconnect(); boot ModemDisconnect();
// System Tray Related Functions
void ModifyTrayIcon(UINT SMD - Status, UINT connectTime, UINT
TXAmount,    UINT RXAmount);
// Service Related Functions
        bool IsATMConnActive(DWORD atmVC);
private:
// This class knows when to create and destoy the shell icon!
        void DeleteTrayIcon();
        void CreateTrayIcon();
protected:
        CserviceMonitorDlgAutoProxy* m_pAutoProxy;
        BOOL CanExit();
// Generated message map functions
//{{AFX - MSG(CServiceMonitorDlg)
        virtual BOOL OnInitDialog();
        afx_msg void OnSysCommand(UINT nID, LPARAM IParam);
        afx_msg void OnDestroy();
        afx_msg void OnPaint();
        afx_msg HCURSOR onQueryDragIcon();
        afx_msg void OnClose();
        virtual void OnOK();
        virtual void OnCancel();
        afx_msg void OnDisconnectModem();
        afx_msg void OnServiceProperties();
        afx_msg BOOL OnHelpInfo(HELPINFO* pHelpInfo);
//}}AFX - MSG
// User Defined Message Functions - These have to be manually updated!
        afx_msg LRESULT OnTrayCommNotification(WPARAM wParam, LPARAM
            IParam);
        afx_msg LRESULT OnTrayShellNotification(WPARAM wParam, LPARAM
            IParam);
        DECLARE_MESSAGE_MAP()
};
ServiceMonitor Properties Class - CServiceMonitorPS (ServiceMonitorPS.h)
<Insert Description here!!!!>
/////////////////////////////////////////////////////////
//
ServiceMonitorPS.h : header file
//
Copyright (c) 1997 Hayes Microcomputer Products, Inc.
//
/////////////////////////////////////////////////////////
/////////////////////////////////////////////////////////
//CserviceMonitorPS
```

-continued

```
class CServiceMonitorPS: public CpropertySheet
{
        DECLARE_DYNAMIC(CServiceMonitorPS)
//Construction
public:
        CserviceMonitorPS(UINT nIDCaption, CWnd* pParentWnd NULL, UINT iSelectPage
        0);
        CserviceMonitorPS(LPCTSTR pszCaption, CWnd* pParentWnd = NULL, UINT
iSelectPae = 0);
        virtual -CScrviceMonitorPS0;
// Attributes
public:
        // These are the tabs for the property sheet.
        CservicesPage           m_PSTI -Services;
        CATMInterfacePage       m_PST2ATMInterface;
        CoptionsPage            m_PST3_Options;
        CmodemParamPage         m_PST5_Modemparam;
        CmodemCountersPage      m_PST6_ModemCounters;
private:
// Our parent window and some data on it.
        Cwnd *mwcp_Parent;
        long ml_XCoordinate;
        long ml_YCoordinate;
// Our main App class and any accelerator tables needed.
        HACCEL mhac_Global;
        CwinApp *mp_ServiceMonitorApp;
        bool mb_IsAccelHelp;
//Operations
private:
        void InitializePSTabs();
//Overrides
// ClassWizard generated virtual function overrides   //{{AFX_VIRTUAL(CServiceMonitorPS)
        public:
        virtual BOOL OnInitDialog();
        virtual BOOL PreTranslateMessage(MSG* pMsg);
//}}AFX_VIRTUAL
//Implementation
protected:
// Generated message map functions
//{{AFX I MSG(CServiceMonitorPS)
        afx_msg BOOL OnHelpInfo(HELPINFO* pHelpInfo);
//}}AFX - MSG
// User Defined Message Functions - These have to be manually updated!
        afx_msg LRESULT OnGetGlobalProtocol(WPARAM m_wParam,LPARAM       m_IParam);
        afx_msg LRESULT onChangeGlobalProtocol(WPARAM m_wParam,LPARAM
        m_IParam);
        DECLARE_MESSAGE_MAP()
};
Data Profile Class - CServiceMonitorProfile (ServiceMonitor.Profile.h)
<Insert Description here!!!>
///////////////////////////////////////////////////////////////
//
//ServiceMonitorProfile.h : header file
//
//Copyright (c) 1997 Hayes Microcomputer Products, Inc.
//
///////////////////////////////////////////////////////////////
ReNew(c,p,t): c = New size you want; p = pointer to memory loc.; t = type of storage you want; #define
ReNew(p,c,t) (t *)SMPReNew( (p), ((c)*sizeof(t)) )
// Registry String values for Global settings (Main & Interface keys)
#define SMGS_MK_POST                    "Post"
#define SMGS_MK_USEGBLPROF              "UseGlobalProfile"
#define SMGS_MK_DISPADSLSTATS           "DisplayADSLStats"
#define SMGS_IK_ILMIATMADD              "ILMIATMAddress"
#define SMGS_IK_ILMIENABLED             "ILMIEnabIed"
#define SMGS_IK_OAMF4ENABLED            "OAMF4"
#define SMGS_IK_OAMF5ENABLED            "OAMF5"
#define SMGS_IK_PROTSSUPPORTED          "ProtSupport"
#define SMGS_IK_SIGNALING             "Signaling"
#define SMGS_IK_USERATMADD              "UserATMAddress"
#define SMGS_IK_PVPMODE                 "PVPMode"
#define SMGS_IK_GUARLINERATE            "GuarLineRate"
#define SMGS_IK_LLCSNAPENABLED          "LLCSNAPEnabIe"
// Registry String values for Service Profile data
#define SMPS_ISK_SERVCOUNT              "Count"
#define SMPS_VCIVPI                     "Connection"
#define SMPS_CLASS_PROT                 "ConnectionC&I"
#define SMPS_REGNAME                    "RegServiceName"
#define SMPS_CLS_SCRPEAK                "SCRPeak"
```

-continued

```
#define SMPS_CLS_SCRMINIMUM            "SCRMinimum"
#define SMPS_CLS_SCRBURSTTOL           "SCRBurstTol"
#define SMPS_CLS_SCRSUSTAINABLE        "SCKSustainable"
#define SMPS_IPOA_SVCPVCCONN           "ConnectionType"
#define SMPS_IPOA_ARPSRVADD            "ARPSrvAddress"
#define SMPS_IPOA_ARPSRVIPADD          "ARPSrvIPAddress*"
#define SMPS_IPOA_IPSUBNET             "Subnet"
#define SMPS_IPOA_IPSUBNETMASK      "SubnetMask"
#define SMPS_IPOA_IPREMOTE             "Remote"
#define SMPS_IPOA_IPLOCAL           "Local"
#define SMPS_IPOA_USEDEFGATEWAY        "UseDefGateway"
#define SMPS_FLANE_USEWKLECSADD        "UWKLECSAddEnabled"
#define SMPS_FLANE_LECSADD             "LECSAddress"
#define SMPS_FLANE_LESADD              "LESAddress"
// Function Return ERROR codes
#define INVALID_SERVLIST_NUMBER 0xffffffff
#define INVALID_ATMVC_NUMBER           0xffffffff
#define INVALID_POINTER                0xfffffffe
#define FUNC_SUCCESS                   0x00000001
#define CLASS_UNINITIALIZED            0xffffffff
// Update Global Settings Mask Values
#define SMGS_MKMSK_UDATMINTERFACE      0x0001
#define SMGS_MKMSK_UDOPTIONS           0x0002
#define SMGS_MKMSK_UDALL                   (SMGS_MKMSK_UDATMINTERFACE
                                        SMGS_MKMSK_UDOPTIONS)
// Max and Min values for various ATM/ADSL data
#define MAX_VCI_VALUE                  4096
#define MIN_VCI_VALUE                  32
#define MAX_VPI_VALUE                  255
#define MIN_VPI_VALUE                  0
// ATM Class Stings
#define STR_ATMCLASS_CBR               "CBR"
#define STR_ATMCLASS_UBR               "UBR"
#define STR_ATMCLASS_UBRP              "UBR+"
#define STR_ATMCLASS_VBR               "VBR"
// Protocol Strings
#define STR_PROT_NATM               Native ATM"
#define STR_PROT_IPOA               "IP over ATM"
#define STR_PROT_FLANE              "Forum LANE"
#define STR_PROT_PPPOA              "PPP over ATM"
#define STR_PROT_IPXOA              "IPX over ATM"
#define STR_PROT_NETBOA             "NetBEUI over ATM"
// Signaling Types and Strings
#define SMGS_IK_SIGVALUN131             0x00000000
#define SMGS_IK_SIGVALLN140             0x00000001
#define STR_UN131                       "UNI 3.1"
#define STR_UN140                       "UNI 4.0"
// Misc. Strings
#define STR_NOATMADDR               "(*Not Used with ILMI Enabled*)"
#define STR_ENABLED                     "Enabled"
#define STR_DISABLED                "Disabled"
#define STR_PVPMODE                     "PVP"
#define STR_PVCMODE                 "PVC"
// Exported Misc. Functions
extern unsigned long convertStringToULong(LPSTR pString);
extern void removeTLWSpace(LPSTR pString),
extern DWORD GetWinOSVersion(UINT *majorVer, UINT *minorVer);
// Exported Inline Functions
extern inline void removeAllWSpace(LPSTR pString);
////////////////////////////////////////////////////////////
CServiceMonitorProfile object
class CServiceMonitorProfile: public CObject
{
      DECLARE_DYNCREATE(CServiceMonitorProfile)
//Construction
public:
      CserviceMonitorProfile();
      virtual -CServiceMonitorProfile();
//Attributes
public:
      enum{
            SMP_ATMCLS_CBR - 0,
            SMR_ATMCLS_UBRP,
            SMP_ATMCLS_UBR,
            SMP_ATMCLS_VBR
      }SMP_ATMClassTypes;
enum {
      SNMP_STRING = 0,   //Standard SNMP style Response
      SNMP_INTEGER,  //The rest is my custome ones
```

-continued

```
        SNMP_UNI_STATUS,
        SNMP_GET_MACADDRESS,
        SNMP_GET_UPTIME,
        SNMP_GET_IPADDRESS,
        SNMP_GET_ATMADDRESS,
        SNMP_GET_LECSTATUS
        }SNMP_NIC_Calls;
protected:
        SMDChannelStatusLstLP       mp_ChnlStatusList;
        SMDvirtualConnStatLstLP     mp_VCStatusList;
        SMDServiceDataListLP        nip_InstServList;
        SMDGlobalATMSettingsLP          mp_GblATMSettings;
        LPVOID                              mvp_NicManager;
private:
        char mcs_HRegKey[50];
        char mcs_HISRegKey[20];
        char mcs_HGblSetRegKey[10];
        char mcs_HGlbATMRegKey[15];
        boo] mb_UseGlobal Profile;
        bool mb_IsUserProfileAdmin;
        DWORD mdw_TotalNoInstServs;
//Operations
public:
// Global ATM/ADSL Functions that interact with m_GblATMSettingsPtr data member!
        bool IsADSLStatRequested();
        bool GetGblRegProfile(SMDGlobalATMSettingsLP pGblProfile -NULL);
        bool updateGblRegProfile(SMDGlobalATMSettingsLP pGblProfile -NULL, UINT
                udMask = SMGS_MKMSK_UDALL);
        UINT    GetGblProtSetting();
        UINT    GetSignalingType();
        DWORD       GetMaxUpStreamBW();
        UINT    GetATMAddress(char *bufAtmAddr, int szBuffer);
        bool IsILMIEnabled();
        bool IsLLC - SNAPEnabled();
        bool IsModePVP();
// VC Functions that interact with m_VCStatusListPtr data member!
        BOOL  Is ATMVCActive(DWORD atmVC);
        BOOL  Is ATMVCActive(int IstNo);
        Service Functions that interact with m_InstServListPtr data member!
        DWORD GetAtmVCFromList(int list = 0); // One based List
        bool GetServUserName(DWORD atmVC = 0, LPSTR pStrBuffer = NULL, DWORD bufSz = 0);
        bool GetServUserName(int listNo = 1, LPSTR pStrBuffer = NULL, DWORD bufSz = 0);
        bool GetServRegName(DWORD atmVC = 0, LPSTR pStrBuffer = NULL, DWORD bufSz = 0);
        bool GetServRegName(int listNo = 1, LPSTR pStrBuffer = NULL, DWORD bufSz = 0);
        DWORD GetInstSrvCount();
        DWORD GetSrvDataProfile(DWORD atmVC = -0, SMDServiceDataLP pSrvProfile = NULL);
        bool AddNewRegService(SMDServiceDataLP pSrvProfile = NULL);
        bool RemoveRegService(LPSTR pUserSrvName = NULL);
        bool UpdateRegService(LPSTR pCurSrvName = NULL, SMDServiceDataLP pSrvProfile = NULL);
        bool UpdateRegService(int lstNo = 0, SMDServiceDataLP pSrvProfile = NULL);
        bool UpdateRegService(DWORD atmVC = 0. SMDServiceDataLP pSrvProfile = NULL);
        void DestroySrvRegList(SMDServiceDataListLP *pSrvRegLst);
        // Protocol Related Functions
        bool GetNewProtDataStruct(void **dpProtData, UINT protType);
        //Misc. Functions
private:
        bool InitializeNew(); //Standard true succeds and false fails
        // General Functions
        // Memory Related functions
        void *SMPReNew(void *memHandle, DWORD newSize);
        void SMPFreeReNew(void *memHandle);
// Global ATM/ADSL functions
        bool InitGblRegProfile();
// Service related functions
        bool InitSrvRegValues(char *serviceKeyName, SMDServiceDataLP pService);
        int     InitSrvRegList();
        bool    UpdateSrvRegList();
        void    DestroyIntSrvRegList();
        SMDServiceDataLP GetServDataFromLstNo(int lstNo);
        // Service functions for connection performance & status
        bool CreateConnLstFromSrvLst();
//Overrides
// ClassWizard generated virtual function overrides
//{{AFX_VIRTUAL(CServiceMonitorProfile)
//}}AFX_VIRTUAL
// Implementation
        protected:
};
Install Services Class - CServicesPage (ServicesPage.h)
```

-continued

```
<Insert Description here!!!!>
//////////////////////////////////////////////////////
      //
      ServicesPage.h : header file
//
Copyright (c) 1997 Hayes Microcomputer Products, Inc.
//
//////////////////////////////////////////////////////
//////////////////////////////////////////////////////
//CservicesPage dialog
class CServicesPage : public CPropertyPage
```

Performance Graph Class—CGraphBar (GraphBar.h)

This class object is an owner drawn graph control that subclasses a static window passed in. This control object creates a bitmap graph and displays a ten second history of performance data for three ATM parameters (Transmit, Received, and Discarded cells). A single object instance can maintain data for multiple connections and display a graph for any single connection upon request.

```
//////////////////////////////////////////////////////
      //
      //GraphBar.h : header file
      //
      // Copyright (c) 1997 Hayes Microcomputer Products, Inc.
      //
      //////////////////////////////////////////////////////
      #define MAX_IN_LIST     14
      #define MAX_VERTICAL    26
      #define MAX_HORIZONTAL MAX_IN_LIST
      //////////////////////////////////////////////////////
      //CgraphBar window
      class CGraphBar: public CWnd
      {
      // Construction
      public:
              CgraphBar( );
      //Attributes
      public:
      private:
              unsigned long mui_TotalSoFar;
              Cwnd          *mp_WindowHandle;
              int           mi_List[MAX_IN_LIST];
              int           mi_BarYPos[MAX_VERTICAL];
              int           mi_BarXPos[MAX_HORIZONTAL];
              int           mi_StartMarker;
              RECT          m_FillRect;
              Cbitmap       mbc_Graph;
              Cbitmap       *mbcp_OldGraph;
              CDC           *mdcp_Rastering;
      //Operations
      public:
              bool SetGraphParentWnd(CWnd *pParentWnd);
              bool SetGraphParentWnd(HWND hParentWnd);
              bool SetGraphParentWndToDlgItem(UINT nID, CWnd* pParentWnd);
              void AddNewValue(int value);
      //Overrides
              // ClassWizard generated virtual function overrides
      //{{AFX_VIRTUAL(CGraphBar)
              //}}AFX_VIRTUAL
      // Implementation
      public:
              virtual -CGmphBaro;
      private:
              void DoBarDrawing( );
              // Generated message map functions
      protected:
              //{{AFX I MSG(CGraphBar)
              afx_msg BOOL OnEraseBkgnd(CDC* pDC);
              afx_msg void OnPaint( );
              //1 } AFX_MSG
              DECLARE_MESSAGE_MAP( )
      };
      Common Data for all Class Objects (ServiceMonitorData.h)
      <Insert Description here!!!>
```

```
/****************************************************
**
**ServiceMonitorData.h: Data header file for retrieving status
**     information from the ATM/ADSL Modern card. This header is
**     designed for a C interface and not C++
**
**Copyright (c) 1997 Hayes Microcomputer Products, Inc.
**
****************************************************
#if!defined(SERVICEMONITORDATA_H)
#define SERVICEMONITORDATA_H  1I
/*
**Protocols supported by this ATM/ADSL NIC/Modem card
/*
#define HAYES_ATMADSLPROT_NATM      0x00001
#define HAYES_ATMADSLPROT_IPOA              0x00002
#define HAYES_ATMADSLPROT_FLANE     0x00004
#define HAYES_ATMADSLPROT_PPPOA     0x00008
#define HAYES_ATMADSLPROT_IPXOA     0x00016
#define HAYES_ATMADSLPROT_NETBOA    0x00032
/*
**Max values for data types.
/*
#define HAYES_MAX_SERVUSERNAME      16
#define HAYES_MAX_SERVREGNAME           51
#define HAYES_MAX_IPADDRESS         16
#define HAYES_MAX_ATMADDRESS        60
#define HAYES_MAX_CARRIERLOAD       128
#define HAYES_MAX_NUMBERSERVS           4096
/*
**Event handle names for processing I0 request
*/
#define READIO_THREAD_EVENT_NAME   "SM_READIO_EVENT"
#define READ_THREAD_EVENT_NAME         "SM_READ_EVENT"
#define WRITE_THREAD_EVENT_NAME    "SM WRITE_EVENT"
#if defined(_CPLUSPLUS) 11 defined(C_PLUSPLUS)
extern "C"{
#endif
/*
**Signaling types supported by this ATM/ADSL NIC/Modem card
*/
typedef enum {
      DUSUNI31 = 0,
      DUSUN140
}DialupSignaling;
typedef enum {
      VCSTATUS_ACTIVE =0,
      VCSTATUS_INACTIVE,
      VCSTATUS_DISABLED
} VirtualConnStatus;
typedef struct_dualEndUDS{
      long upstream
      long downStream;
}DualEndUDS;
typedef struct_dualEndMR{
      long adslModem;
      long remoteEnd;
} DualEndMR;
/*
**     ATM/ADSL Modem Current Operational Line Parameters
*/
typedef struct_smdOpParams{
      DualEndMR   attenuation;
      DualEndMR   noiseMargin;
      DualEndMR   outputPower,
      DualEndMR   relCapOcc;
      DualEndMR   maxAttBW;
      DualEndMR   actualBitRate;
      char    carrierLoad[HAYES_MAX_CARRIERLOAD+2]; /* Carrier Load
           String*/
}SMDOpParams, *SMDOpParamsLP;
/*
**     ATM/ADSL Modem Defect Counters
*/
typedef struct_smdLossOfDefects{
      DualEndMR   loCellDeliniation;    /* Loss Of Cell Deliniation*/
      DualEndMR   loSignal;             /* Loss Of Signal*/
      DualEndMR   loPower;              /* Loss Of Power*/
      DualEndMR   loFrame;              /* Loss Of Frame*/
```

-continued

```
}SMDLossOfDefects, *SMDLossOfDefectsLP;
/*
**     ATM/ADSL Modem Channel Performance Counters
*/
typedef struct_smdChannelPerf {
        long HECViolation;
        long FECsCorrected;
        long ErroredSeconds;
        long CodeViolations;
}SMDChannelPerf, *SMDChannelPerfLP;
/*
**ATM/ADSL Modem Channel Status Data (This combines all of the above!)
*/
typedef struct_smdChannelStatus
        unsigned int            modemChannel;
        SMDopParams             opParameters;
        SMDLossOfDefects        lossOfCounters;
        SMDChannelPerf          performance;
        long                    pollingOps;
        unsigned int            opMode;      /* 0 for Interleaved and I for Fast
        unsigned int            opStatus;    /* Check enum values above for status
                                                values. */
}SM DChannel Status, *SMDChannelStatusLP;
typedef struct_smdChannelStatusLst{
        struct -smdChannelStatusLst *previous;
        struct smdChannelStatusLst *next;
        SMDChannel Status chnlStatus;
}SMDChannelStatusLst, *SMDChannelStatusLstLP;
/*
**     ATM Channel Performance Data.
*/
typedef struct - smdVirtualConnStatus{
        DWORD       atmChannel;
        UINT        vpiValue;
        UINT        vciValue;
        long        cellsTrans;
        long        cellsRec;
        long        cellsDisc;
        long        aal5Msgs;    /* Error detection Info */
        long        aal5Faults;
        long        elapsedTime; /* Time since last polled for info */
        BOOL        oamF4Enabled; /* Op. & Maint. Flow Control (F4) enabled*/
        BOOL        oamF5 Enabled; /* Op. & Maint. Flow Control (F4) enabled */
        BOOL   isActive;
}SMDVirtualConnStatus, *SMDVirtualConnStatusLP;
typedef struct_smdVirtualConnStatLst{
        struct_smdVirtualConnStatLst *previous;
        struct_smdVirtualConnStatLst *next;
        SMDVirtualConnStatus vcStatus;
}SMDVirtualConnStatLst, *SMDVirtualConnStatLstLP;
/*
**Service Data list structure for service information.
*/
typedef struct_smdServiceData{
        DWORD atmChannel;    /* High word (VPI); Low word (VCI)*/
        char       userName[HAYES_MAX_SERVUSERNAME*2]; /*User defined tab
                   name */
        char       regName[HAYES_MAX_SERVREGNAME+10]; /* Registered service
                   */name
        BOOL       svcConnType; /* TRUE for SVC and FALSE for PVC*/
        UINT       vpiValue;
        UINT       vciValue;
        UINT       atmClass;
        UINT       protocolUsed;   /* ATM, IPOA, FLANE, etc.*/
        void       *protocolSet;   /* Pointer to protocol data structure */
        DWORD            peakValue;       /* High Word - Up Stream; Low Word -
                             Down Stream*/
        DWORD    minValue;
        DWORD    sustainValue;
        DWORD    burstTolValue;
}SMDServiceData, *SMDServiceDataLP;
typedef struct_smdServiceDataList {
        struct_smdServiceDataList *previous;
        struct_smdServiceDstaList *next;
        SMDServiceData servData;
}SMDServiceDataList, *SMDServiceDataListLP;
/*
**     Protocol Data Structure for TCP/IP over ATM or (IPOA)
*/
```

-continued

```
typedef struct - smdIPOASettings{
        char    ipSubnet[HAYES_MAX_IPADDRESS+2];
        char    ipSubnetMask[HAYES_MAX_IPADDRESS+2];
        char    arpServATMAddr[HAYES_MAX_ATMADDRESS+10];
        char    arpServIPAddr[HAYES_MAX_IPADDRESS+2];
        char    remoteIPAddr[HAYES_MAX_IPADDRESS+2];
        char    localIPAddr[HAYES_MAX_IPADDRESS+2];
        BOOL    useDefGateway;
}SMDIPOASettings, *SMDIPOASettingsLP;
/*
**      Protocol Data Structure for Forum LAN Emulation
*/
typedef struct - smdFLANESettings{
        BOOL    useLECSAddress;    /* TRUE for Using well know LECS Address*/
        char    lecsATMAddress[HAYES_MAX_ATMADDRESS+10];
        char    lesATMAddress[HAYES_MAX_ATMADDRESS+10];
}SMDFLANESettings, *SMDFLANESettingsLP;
/*
**      Global ATM Information
*/
typedefstruct_smdGlobalATMSettings{
        /* Interface Information */
        char        atmAddress[HAYES_MAX_ATMADDRESS+10];
        BOOL        ilmiEnabled;
        UINT        signalingType;
        UINT        protSupport;
        BOOL        oamF4Enabled;
        BOOL        oamF5Enabled;
        BOOL        llcSnapEnabled;
        DWORD       GuaranteedLn Rate;
        BOOL        PVPMode;
        char        userAtmAddress[HAYES_MAX_ATMADDRESS+10];
        /* Options Information */
        BOOL        postEnabled; /* Power On Self Test Enabled (extended test) 0/
        BOOL        useGlobal Profile;
        BOOL     modemStatus Enabled.
} SMDGlobalATMSettings, *SMDGlobalATMSettingsLP;
#if defined(_CPLUSPLUS) 11 defined(C_PLUSPLUS)
}
#endif
#endif
```

Communication Interface for ServiceMonitor
(ServiceMonitorComm.h)

Future releases of ServiceMonitor allows other applications to communicate with it for simple management functions. Such as browser notifying that new service connections need to be established from configuration files located. on various Telco Web Sites. This header is used to simply place various registered messages for internal communication of classes to the main application dialog.

```
//////////////////////////////////////////////////
//
//ServiceMonitorComm.h : Main header file for all applications to
       interface with ServiceMonitor.
//
//Copyright (c) 1997 Hayes Microcomputer Products Inc.
//
//////////////////////////////////////////////////
#if!defined(SERVICEMONITORCOMM_H)
#define SERVICEMONITORCOMM_H   1
//Main Data types for all source code used to interface with
//Service Monitor
//This is the registered msg for ServiceMonitor to be able to update
//the system tray icon.
#define SMWRM_NOTIFYTRAYICON_MSG
"SMWRM_SYSTEMNOTIFYICON"
#define SMWRM_SERVICEMONITOR_EXIT_MSG
```

-continued

```
"SMWRM_SERVICEMONITOR_EXIT"
   #define SMWRM_SERVICEMONITOR_SHOW_MSG
"SMWRM_SERVICEMONITOR_SHOW"
   #endif
```

The ADSL PC NIC on-board controller also includes a Management Application resident thereon. The ADSL includes an interface to interact with the application running on the host PC. The Management Application controls various scenarios of operation of the ADSL NIC.

The term "Host" refers to the controlling application or driver running on the PC in which the ADSL NIC is installed. For the PC NIC, the term "near-end" is associated with the signal received locally by the NIC (the ATU-R), and the term "far-end" is associated with the signal received at the central office by the ATUC.

The Management Application performs a number of tasks: It accepts commands from the Host, and provides the necessary responses, as per the Modem Control Interface described below; It controls the Modem Software as required to accomplish the Host's commands, and queries the Modem Software to obtain necessary information, as per the Modem software API; and it monitors performance statistics and provides alarms for fault events.

Software can be downloaded from the host depending on the selected mode. A first mode, for e.g. normal operation, downloads the software. A second, e.g. for standalone, uses software that is resident in an on board non volatile RAM.

If software is downloaded, the on-board controller is kept in reset until the software download is completed. Direct memory accesses from the PC or Hydrogen chip into the on-board controller memory space is used to download the software.

Figure 29:
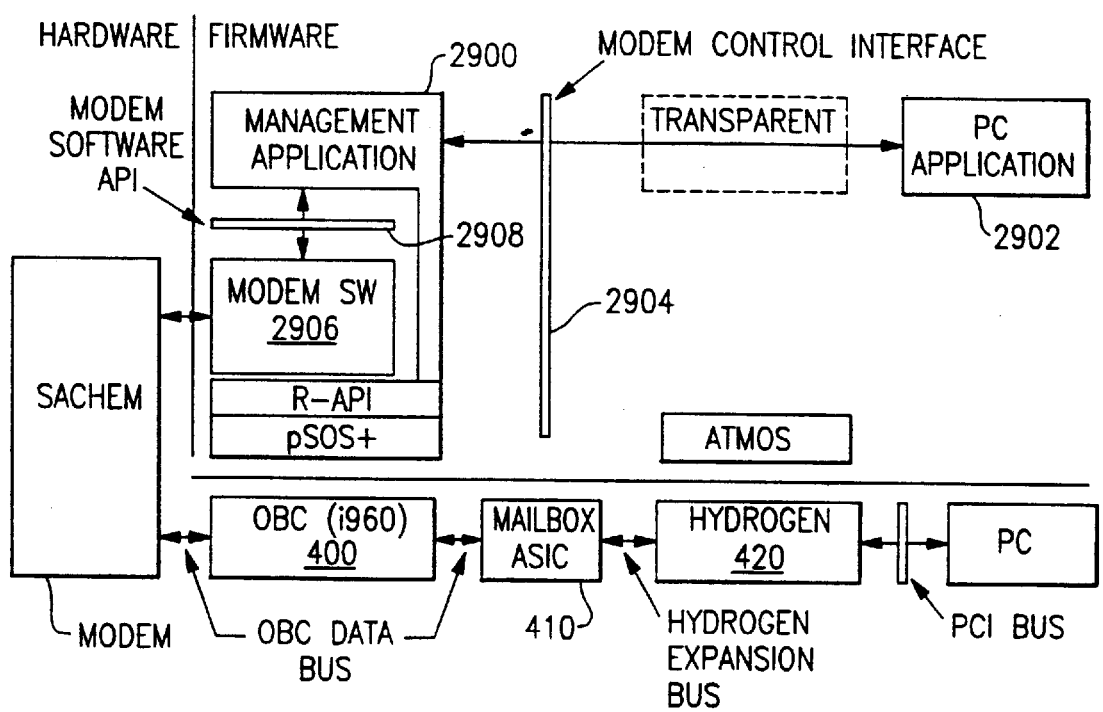
FIG. 29 shows a basic block diagram of the ADSL NIC firmware.

The architecture of the ADSL NIC control firmware is shown in FIG. 29. User data is not handled by the on-board controller. User data passes directly from the Hydrogen chip to the SACHEM over the UTOPIA interface as shown in the bottom portion.

FIG. 29 also shows how the Management Application interacts with the Host 2902 through the Modem Control Interface 2904. The Management Application interacts with the ADSL Modem Software 2906 through the Modem SW API 2908.

The Modem Control Interface is the set of commands, responses and unsolicited responses that pass between the ADSL NIC Management Application and the controlling entity on the Host. The ADSL NIC has this interface between the on-board controller and the Hydrogen chip. Control information is typically exchanged between the Host and the Management Application, with the Hydrogen chip serving as an intermediary.

Figure 30:
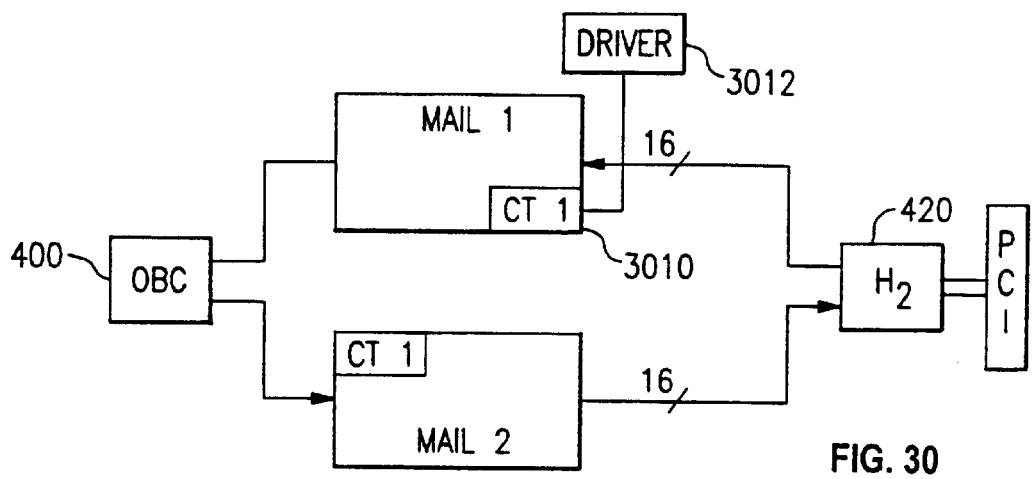
FIG. 30 shows a first diagram of mailboxes used to communicate the PCI bus and the controller.
Figure 31:
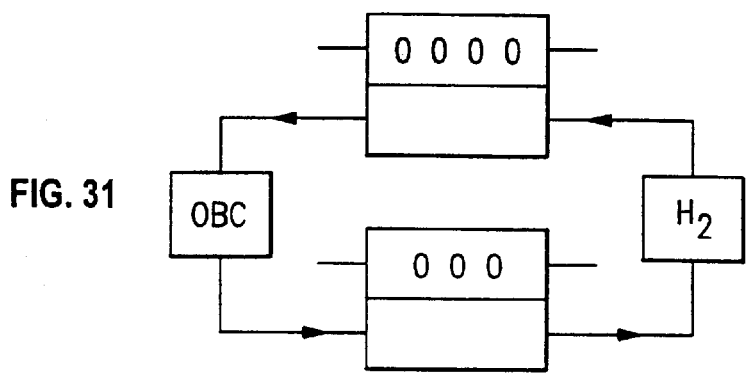
FIG. 31 shows a second block diagram using only part of the mailboxes.

The interface between the on-board controller and the Hydrogen chip includes two 16-bit mailboxes 3000, 3002, shown in FIG. 30, one for each direction. The mailboxes are implemented in hardware within ASIC 410 as described above. One mode provides compatibility with future hardware designs which may provide only an 8-bit path as shown in FIG. 31. In this case, only the lower half of the data bus is used (bits 7–0). The upper eight bits are filled with zeros on write operations, and ignored on read operations.

Figure 32:
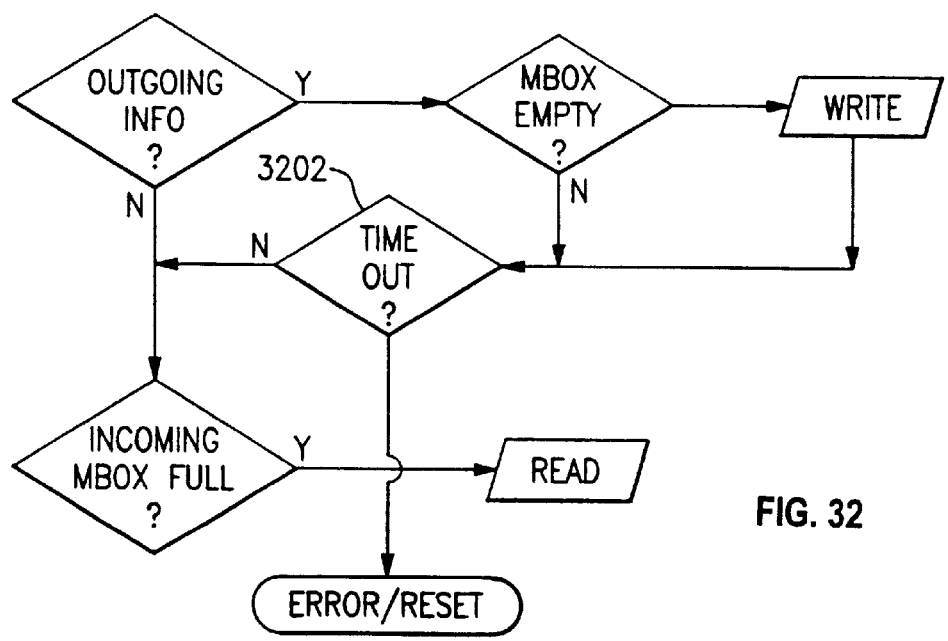
FIG. 32 shows a flowchart of operation of the mailboxes.

Each mailbox has associated control bits e.g. 3010, indicating the fill state of the mailbox, e.g., full or empty. The mailbox drivers 3012 use these bits to control their accesses to the mailbox. The rules for accessing the mailbox are as follows and shown in FIG. 32:

In the outgoing direction, the mailbox driver does not write to the mailbox unless the mailbox is empty. The mailbox is empty when the MboxRSTAT bit in the IRQ Status register is set.

In the incoming direction, the mailbox driver reads the mailbox when it is full. The mailbox is full when the Mbox WSTA T bit in the IRQ Status register is set.

The MboxRSTAT and MboxWSTAT bits is used in either a polled or an interrupt-driven fashion by each driver independently. As part of the normal hardware initialization process, the ASIC IRQ Enable registers on each side must-be-configured properly to either enable or disable interrupts as desired.

If the above rules are followed, no data will be lost or overwritten in the mailbox.

The most likely failure that may occur is when a mailbox driver becomes unstable and ceases to service the mailbox. In this case, the other driver may find that it is unable to write to the mailbox. To handle this situation, a time-out of 1±0.1 seconds is observed on write attempts to the mailbox shown in Step 3202. The expiration of this time-out represents a fatal error condition which calls for a reset. The Management Application responds to this time out by waiting until the Host-side driver responds or until the on-board controller is reset.

Since many commands and responses require more than 8 bits of information to be sent, a protocol is used to allow multiple-byte messages to be passed between the Management Application and the Host. A mailbox message has a consecutive string of bytes with the format shown in FIG. 28.

This message includes address fields to identify the sending entity 2800 and receiving entity 2802. Typically, these entities will be the Management Application on the NIC and the Host Application running on the PC. However, other possible entities include debug ports on the Host debug processes on the NIC, or processes running on the Hydrogen chip. For messages that are responses to commands, the destination address is filled with the address of the entity that originated the command.

The driver on each side of the mailbox routes messages to the appropriate entity. In the interest of simplicity, addresses for all entities are fixed at compile time. Exemplary addresses are given in Table 1.

The SYNC and SYNC_ACK opcodes are used prior to the establishment of the protocol. Opcodes for these commands are not available to serve as entity addresses. Therefore these four addresses are reserved. Further details of the synchronization are described herein.

TABLE 1

Mailbox Entity Addresses

| Entity | Address |
|---|---|
| Host Control Application | 0x01 |
| Host Data Handler | 0x02 |
| Host Debug Port A | 0x03 |
| Host Debug Port B | 0x04 |
| Host Debug Port C | 0x05 |
| Host Debug Port D | 0x06 |
| On Board Controller Management Application | 0x10 |
| On Board Controller Management Selftest Agent | 0x11 |
| On Board Controller Management Debug Process 1 | 0x12 |
| On Board Controller Management Debug Process 2 | 0x13 |
| On Board Controller Management Debug Process 3 | 0x14 |
| On Board Controller Management Debug Process 4 | 0x15 |
| Hydrogen Debug Process 1 | 0x20 |
| Hydrogen Debug Process 2 | 0x21 |
| Hydrogen Debug Process 3 | 0x23 |
| Hydrogen Debug Process 4 | 0x24 |
| Reserved for SYNC | 0x55 |
| Reserved for SYNC_ACK | 0xAA |
| Reserved for SYNC | 0x33 |
| Reserved for SYNC_ACK | 0xCC |

The opcode field identifies the command or response being sent. It also indicates to the recipient how the data field should be interpreted.

The Length of Data Field value 2810 gives the length (in bytes) of the message data field. If there is no data field, this number is zero. In general, the correct length of the data field could be deduced from the opcode. However, providing a length field allows a mailbox driver (or an intermediate entity) to correctly handle a message even if the opcode is not recognized. This allows new opcodes to be added without requiring updates to all of the firmware on the NIC. Different versions of firmware on different CPUs may interwork more easily.

The content of the data field depends on the opcode. For some opcodes, this field might not exist. For data fields with multiple bytes, the field format is given in the command or response definition.

The Synchronization Procedure is used to protect against spurious transmissions through the mailbox after power-up. The synchronization procedure is used by the Management Application and the Host-side mailbox driver on both the Host and the Hydrogen.

Essentially, the procedure requires transmission and acknowledgment of special SYNC opcodes three times in a row, to attain synchronization in each direction. Acknowledgment is through the SYNC_ACK opcode. Note that the SYNC and SYNC_ACK are messages but do not necessarily follow mailbox protocol described herein. These are formed by a one-byte message having only an opcode.

Synchronization is assumed to have been attained in the outgoing direction when three consecutively-sent SYNC opcodes have resulted in three consecutively-received SYNC_ACK opcodes. The SYNC process is then terminated, and the mailbox driver may begin using the mailbox protocol described above to transmit messages.

In the incoming direction, synchronization is assumed when three consecutive SYNC opcodes have been received. Any bytes received after this (other than SYNC) are interpreted as messages complying with the mailbox protocol. Any SYNC opcodes received after this point are simply acknowledged and then discarded, without causing a loss of synchronization.

Received SYNC opcodes are always acknowledged with SYNC_ACK opcodes.

The Host-side driver and the Management Application follow the same sequence. This procedure is typically necessary only after power-up or after reset.

During synchronization, the time-out period for writing to the mailbox and for polling for responses is 250±50 msec. After synchronization is achieved, the time-out for mailbox write attempts changes to 1±0.1 seconds.

There are three different kinds of NIC control messages. A first command can be issued to the Management Application. Responses can originate from the Management Application. Finally, general purpose messages may be sent from any entity to any other.

Table 2 lists commands that the Host may issue to the Management Application.

ADSL_Selftest_Long, ADSL_Selftest_Short commands cause the on-board controller to initiate long or short self tests. The self test results are sent back to the Host using the ADSL_Selftest_Results response.

ADSL_Open and ADSL_Close control the ADSL connection. The ADSL_Open command causes the modem to attempt to connect with the ATU-C. The ADSL_Close command causes the ADSL modem to send a Dying Gasp message to the ATU-C, close the connection, and return to an idle state.

Figure 33:
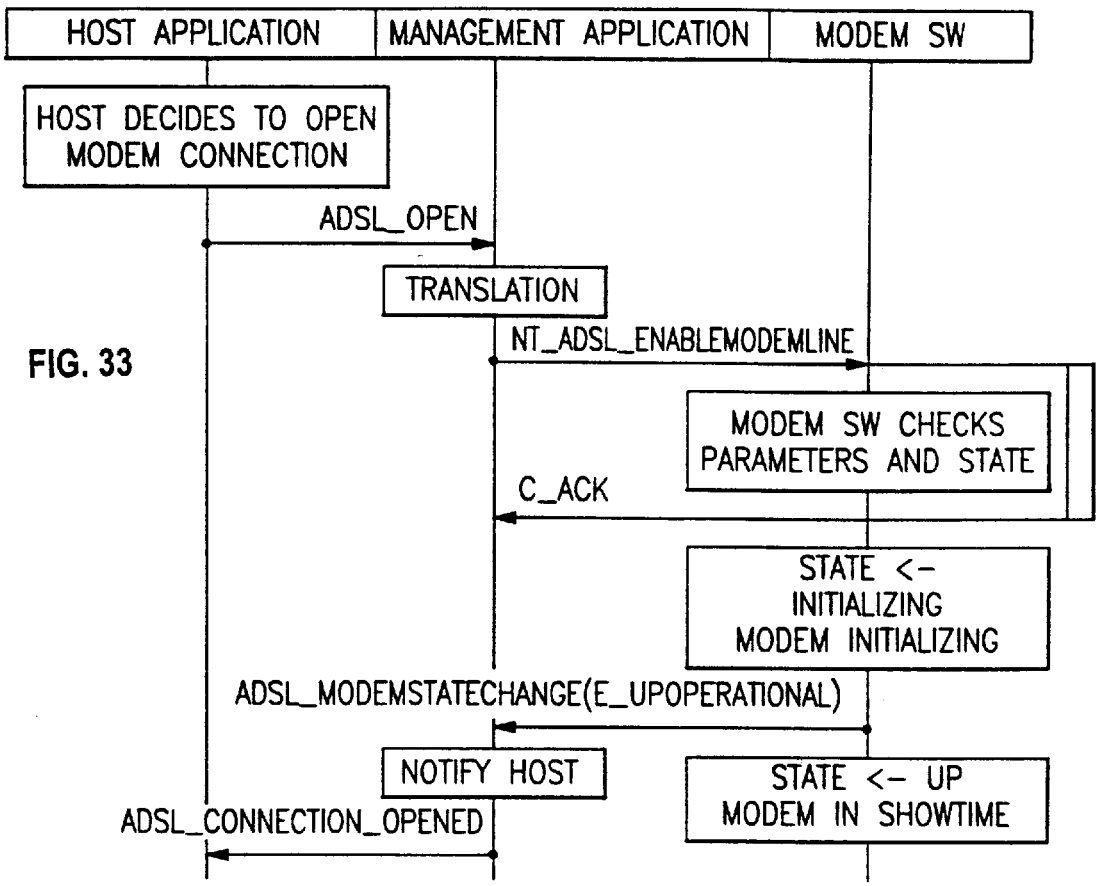
FIGS. 33–46 show ADSL open command flows.
Figure 34:
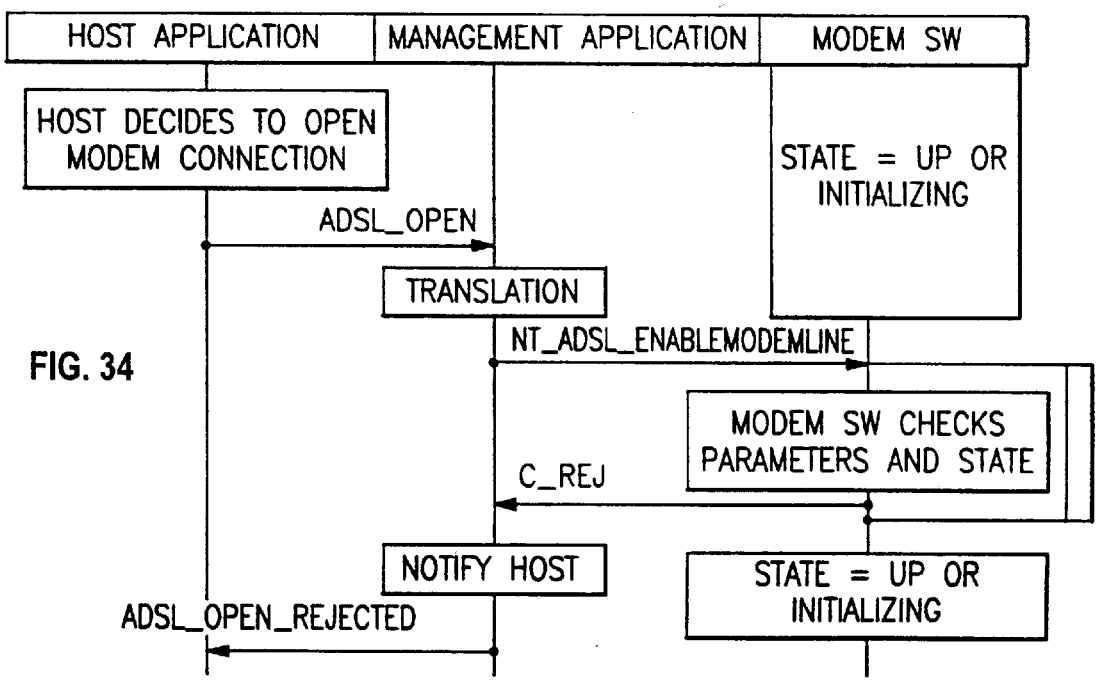
Figure 35:
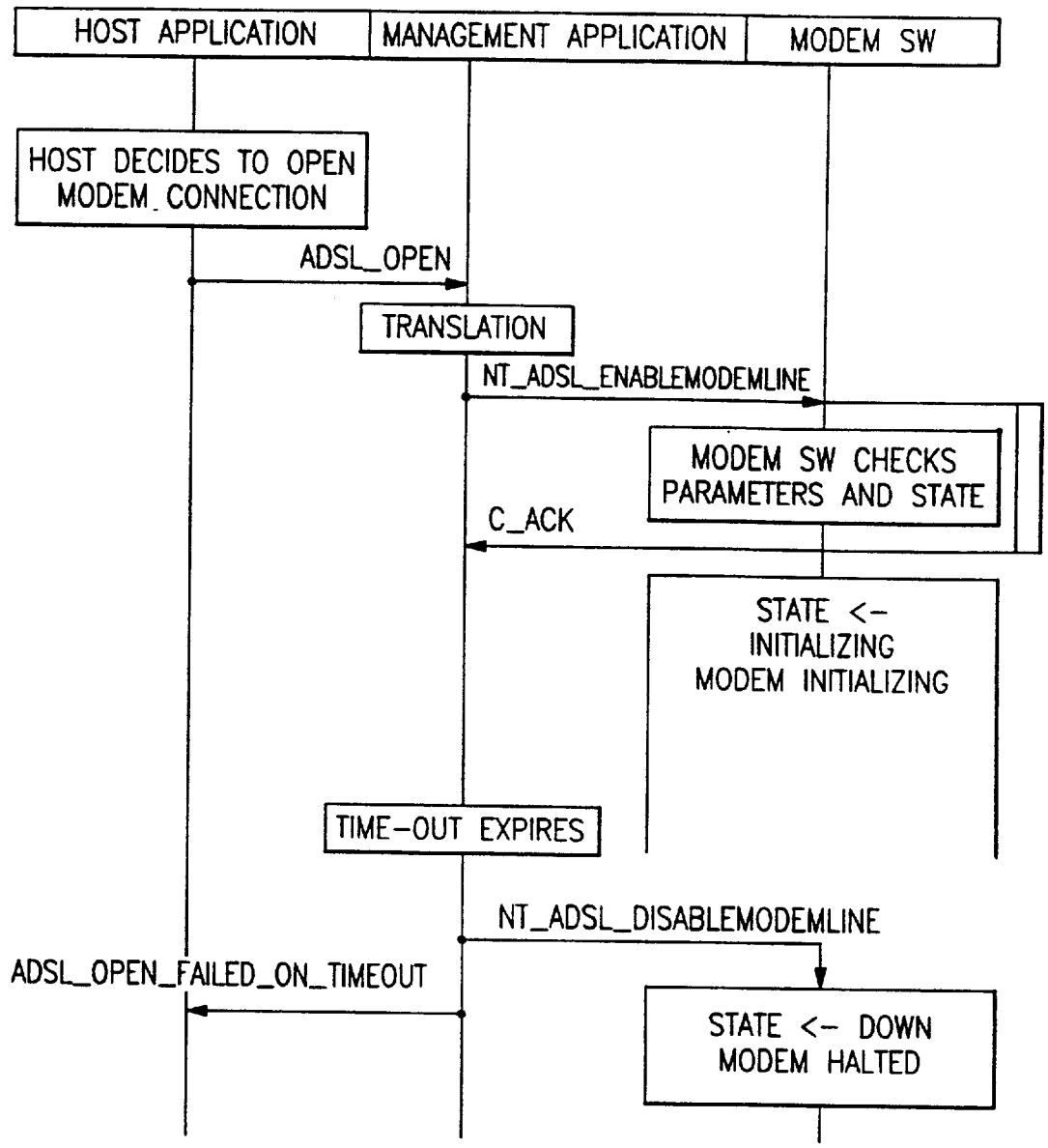
Figure 36:
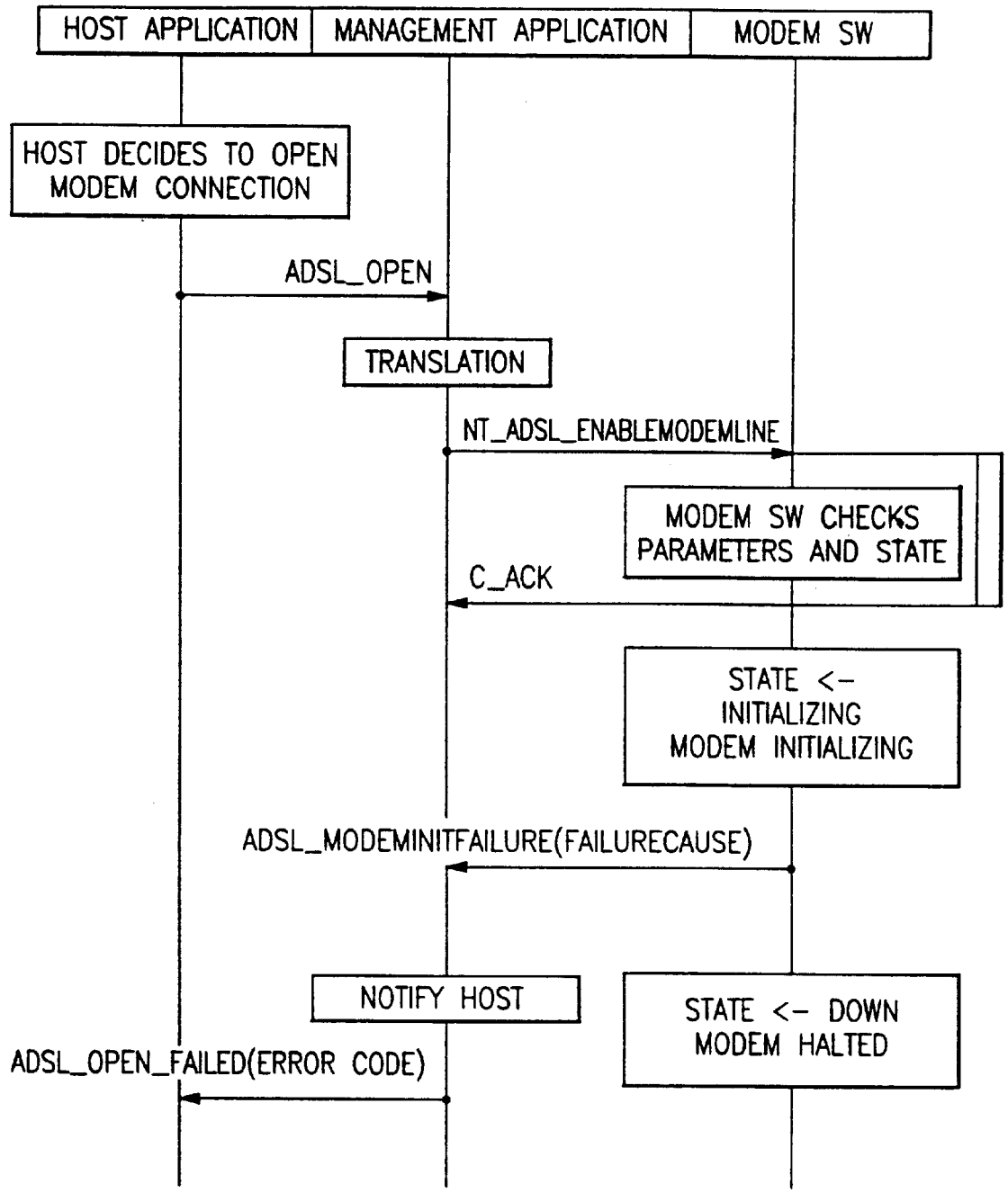
Figure 37:
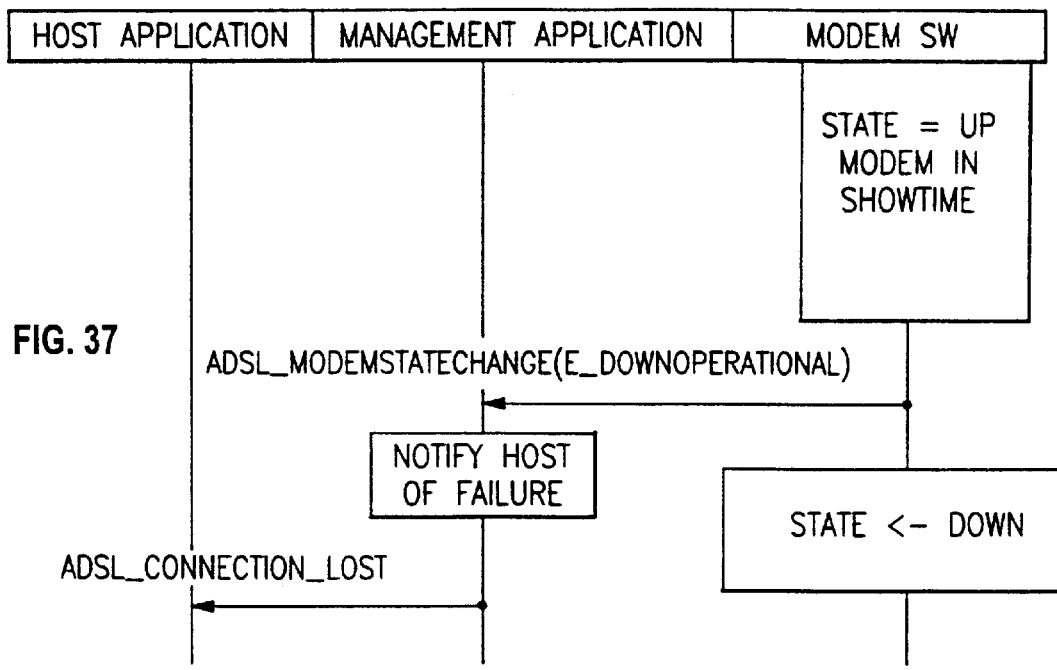

The ADSL_Open can result in a number of different operations. FIG. 33 shows the process flow when the ADSL_Open succeeds. FIG. 34 shows the ADSL_Open failing due to rejection. FIG. 35 shows ADSL_Open failing due to timeout. FIG. 36 shows ADSL_Open-failing due to initialization failure. One related scenario is shown in FIG. 37, which diagram the existing ADSL connection being lost.

Figure 38:
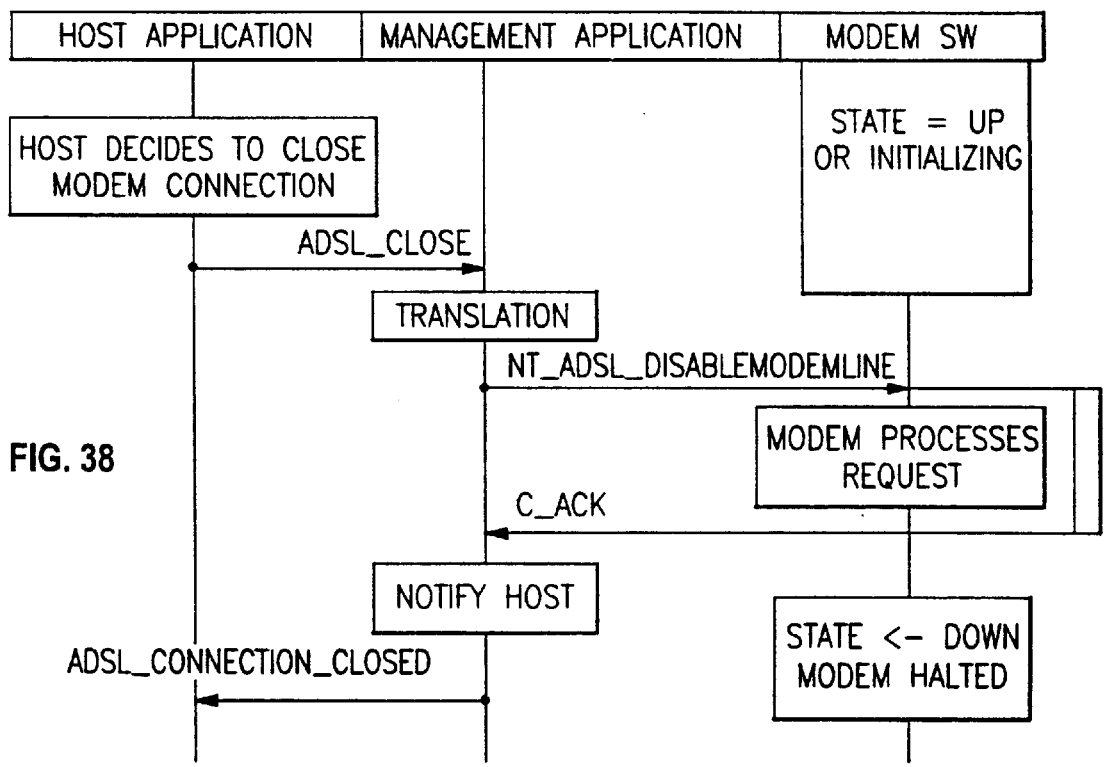
Figure 39:
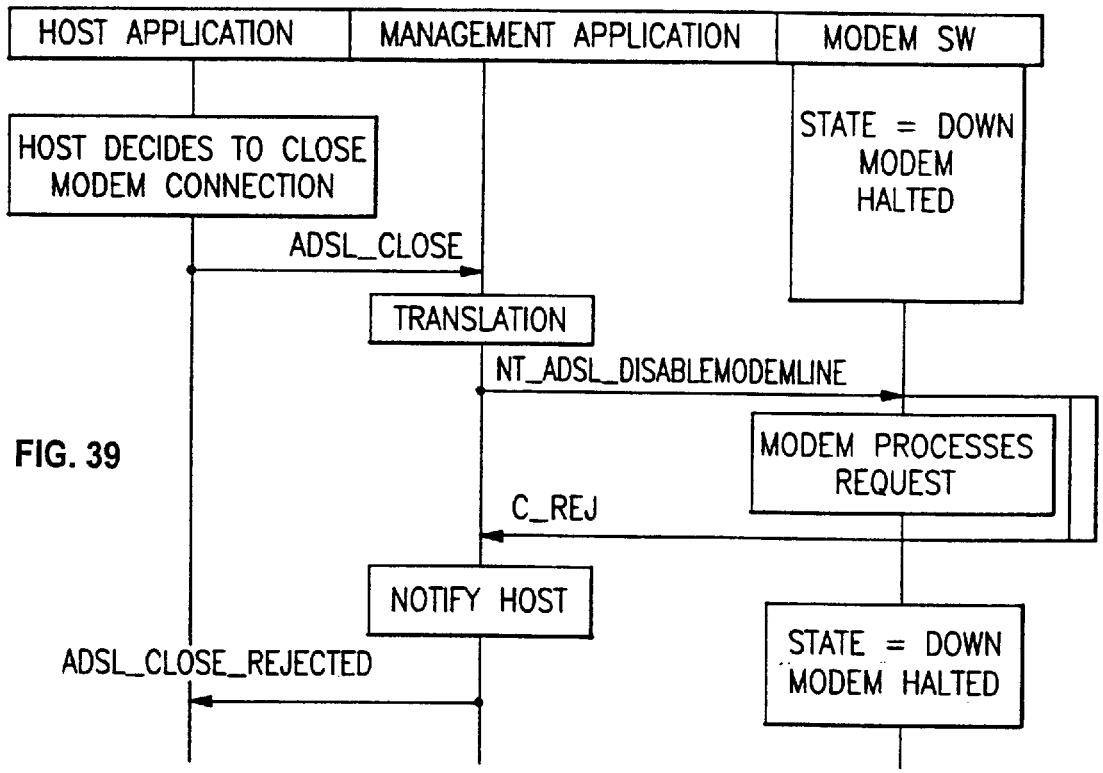

FIG. 38 diagrams the ADSL_Close request succeeding. FIG. 39 shows the ADSL_Close being rejected.

The ADSL_Report . . . commands are used to request information from the Management Application.

The ADSL_Send_Dying_Gasp command instructs the modem to send a Dying Gasp message to the ATU-C. The modem remains connected after sending the message.

Figure 40:
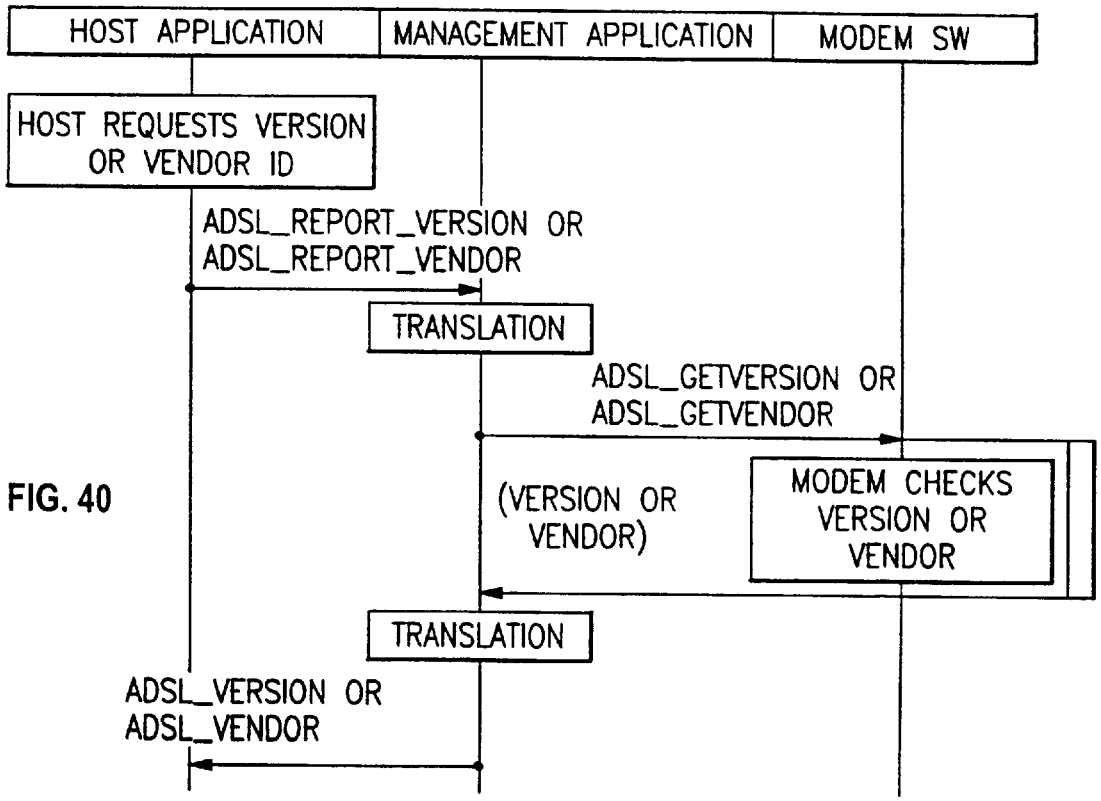
Figure 41:
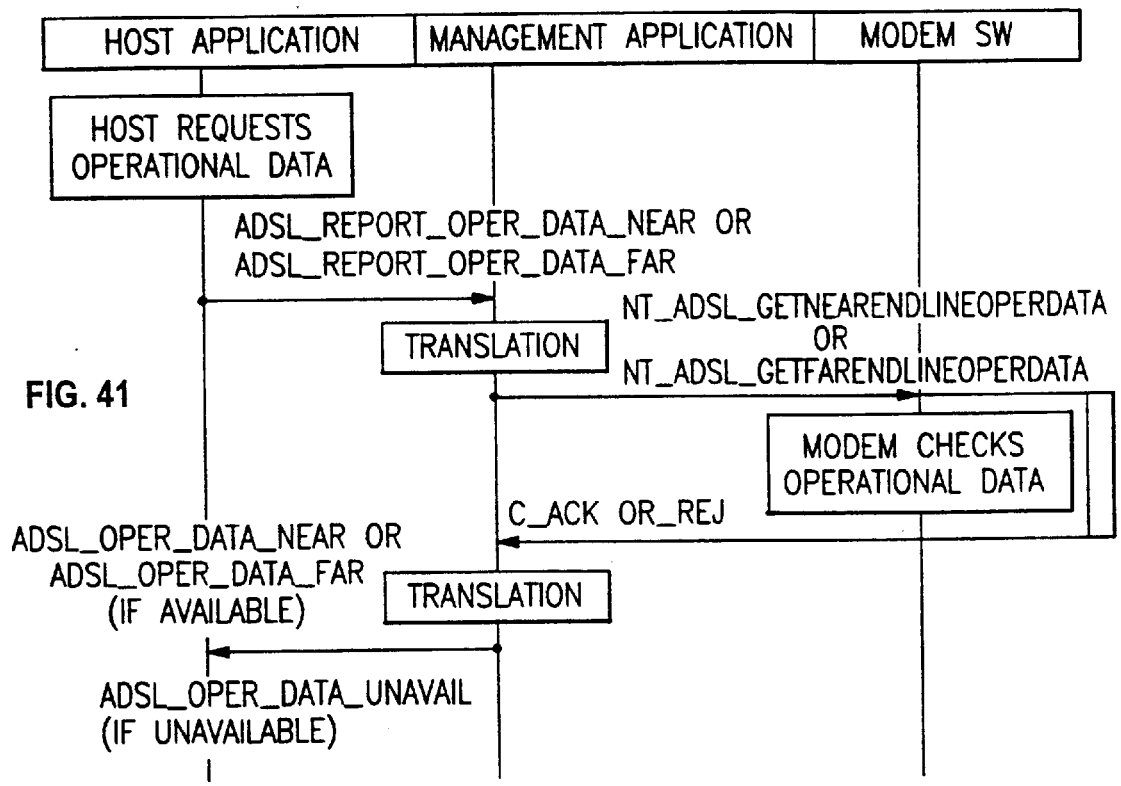
Figure 42:
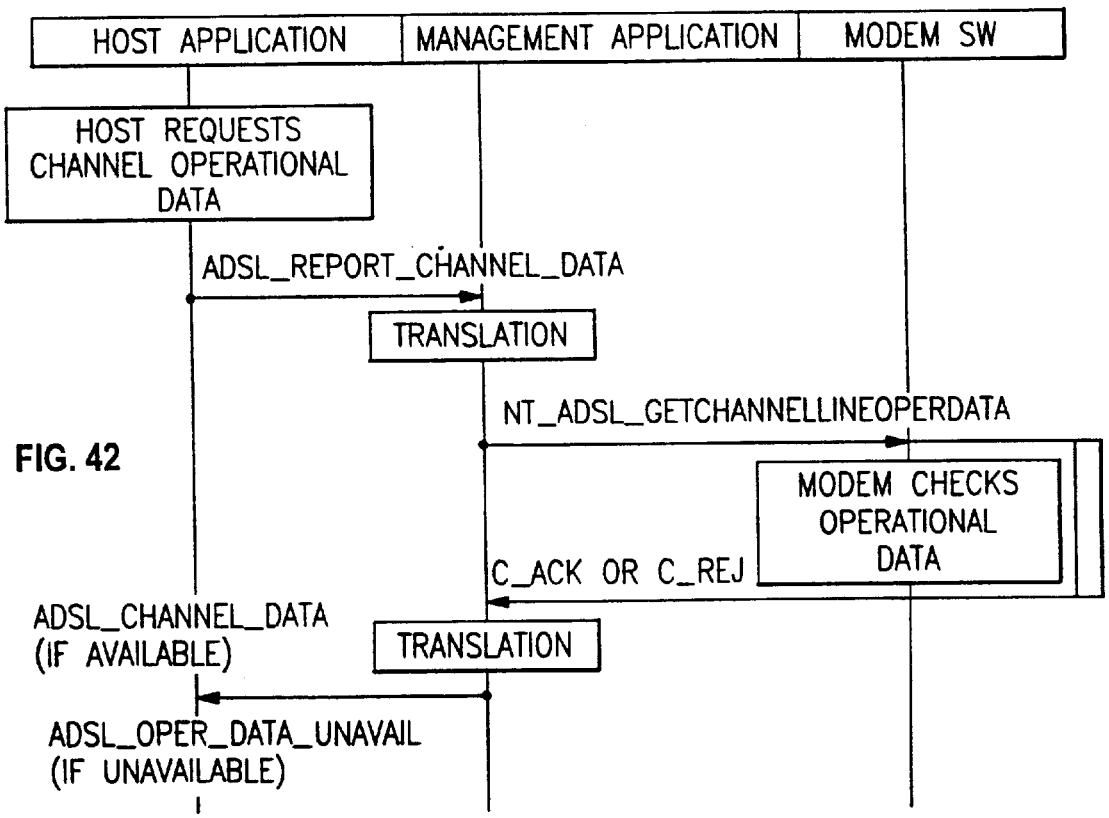
Figure 43:
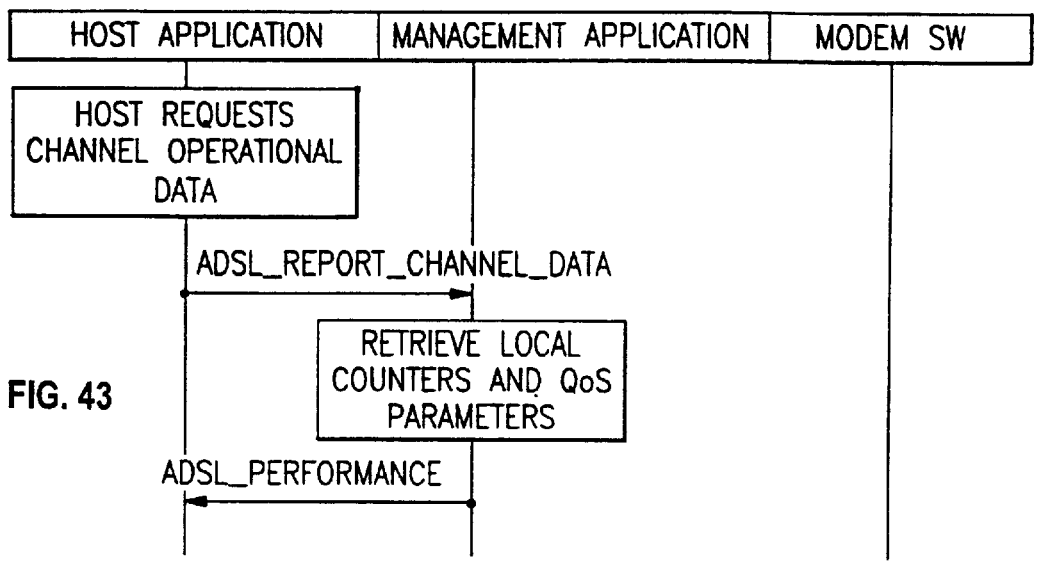
Figure 44:
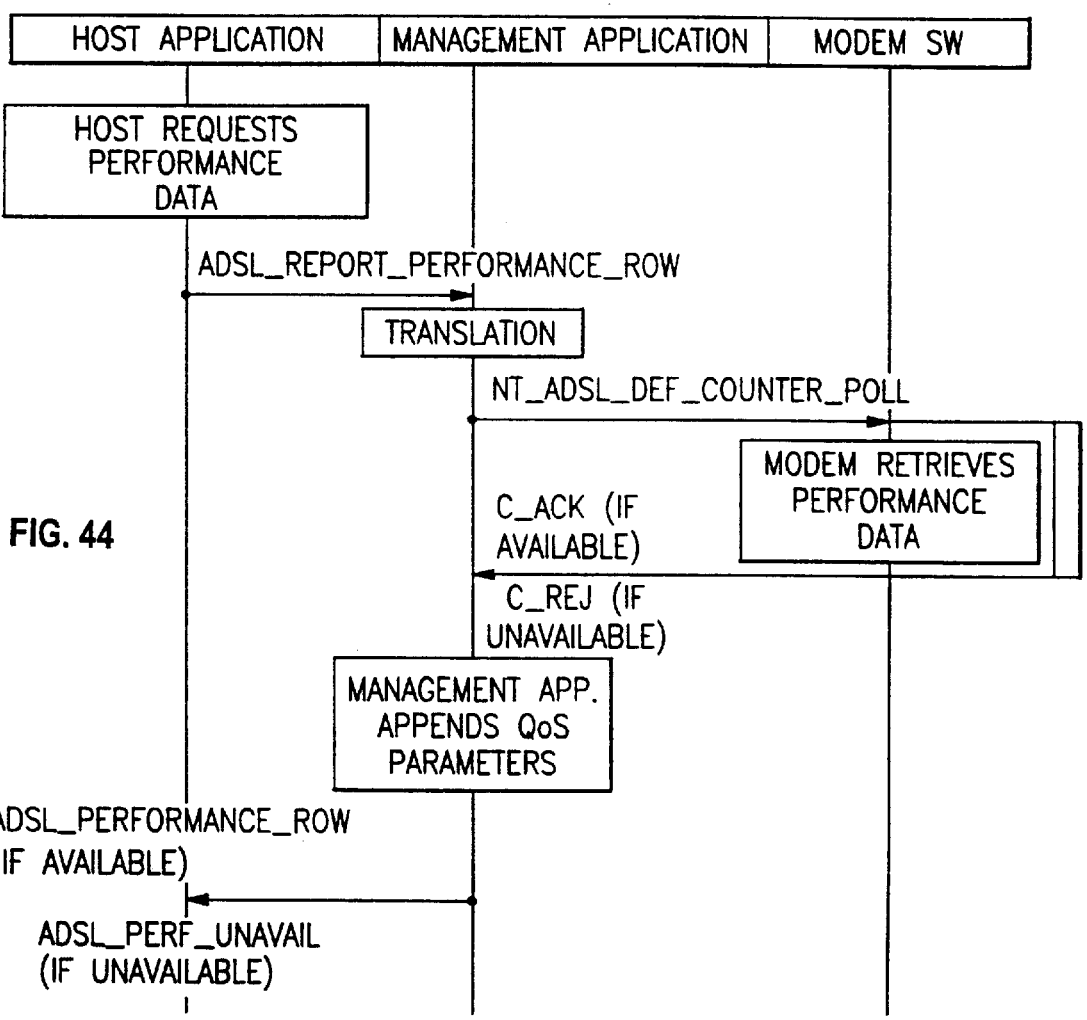
Figure 45:
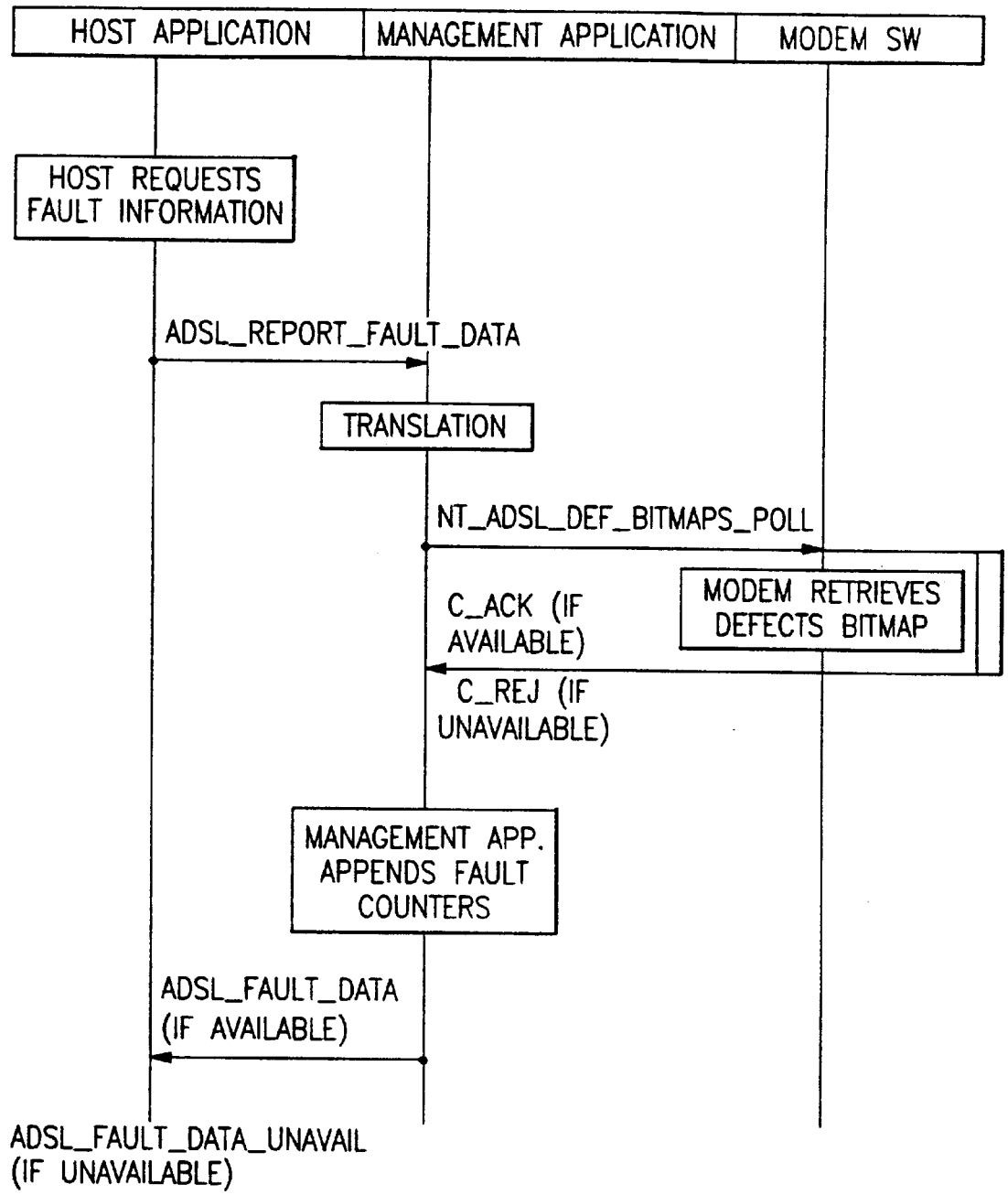
Figure 46:
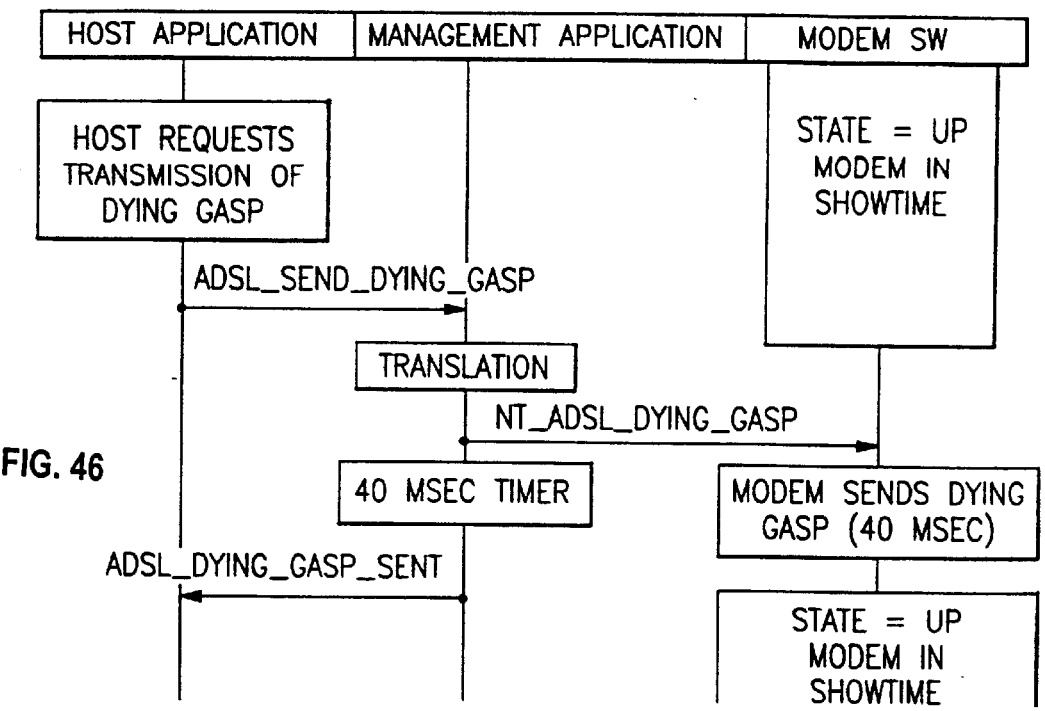

FIG. 40 illustrates the operation of the host requesting version or vendor IDs. FIG. 41 shows the host requesting the near or far end operational data, and FIG. 42 shows the host requesting the channel operational data. The host can also request performance counters, as shown in FIG. 43.

Table 3 lists the Management Application responses. Some two responses are sent only as answers to Host commands. Other responses are sent spontaneously as certain events occur. When the unsolicited responses occur, they are addressed to the host "owner" application—that is, the application which issued the most recent successful ADSL_Open command. On power-up, the owner address defaults to 0x01.

TABLE 2

Host Commands

| Command | Opcode | Data Field Length | Data Field Contents |
|---|---|---|---|
| MBOX_Sync | 0x55 | N/A | N/A |
| MBOX_Sync_Ack | 0xAA | N/A | N/A |
| ADSL_Selftest_Long | 0x01 | 0 | — |
| ADSL_Selftest_Short | 0x02 | 0 | — |
| ADSL_Open | 0x03 | 0 | — |
| ADSL_Close | 0x04 | 0 | — |
| ADSL_Report_Version | 0x05 | 0 | — |
| ADSL_Report_Vendor | 0x06 | 0 | — |
| ADSL_Report_Oper_Data | 0x07 | 0 | — |
| ADSL_Report_Carrier_Load | 0x08 | 0 | — |
| ADSL_Report_Channel_Data | 0x09 | 0 | — |
| ADSL_Report_Performance | 0x0A | 0 | — |
| ADSL_Report_Performance_Raw | 0x0B | 0 | — |
| ADSL_Report_Fault_Data | 0x0C | 0 | — |
| ADSL_Send_Dying_Gasp | 0x0D | 0 | — |
| ADSL_Report_Performance_Data | 0x0E | 0 | — |

MBOX Sync, MBOX_Sync_Ack are responses that are sent by the Host-side mailbox driver after power-up or reset to establish synchronization with the Management Application mailbox driver. These responses do not have address fields or data fields.

TABLE 3

Management Application Responses

| Response | Opcode | Data Field Length | Data Field Contents |
|---|---|---|---|
| MBOX_Sync* | 0x33 | N/A | N/A |
| MBOX_Sync_Ack | 0xCC | N/A | N/A |
| ADSL_Open_Rejected | 0x21 | 3 | reason and duration |
| ADSL_Open_Failed | 0x22 | 1 | error code |
| ADSL_Open_Failed_on_Timeout | 0x23 | 0 | — |
| ADSL_Connection_Opened | 0x24 | 0 | — |
| ADSL_Connection_Lost* | 0x41 | 0 | — |
| ADSL_Connection_Closed | 0x25 | 0 | — |
| ADSL_Close_Rejected | 0x26 | 1 | reason |
| ADSL_Selftest_Resultes | 0x27 | 1 | result code |
| ADSL_Version | 0x28 | 2 | near-and far-end versions |
| ADSL_Vendor | 0x29 | 2 | near-and far-end versions |
| ADSL_Oper_Data | 0x2A | 8 | near-end operational data |
| ADSL_Carrier_Load | 0x2B | 128 | carrier laed data |
| ADSL_Oper_Data_Unavail | 0x2C | 0 | — |
| ADSL_Channel_Data | 0x2D | 8 | channel bit rates |
| ADSL_Performance | 0x2E | 20 | per-sec. performance data |
| ADSL_Performance_Raw | 0x3F | 32 | performance data (raw) |
| ADSL_Perf_Unavail | 0x30 | 0 | — |

TABLE 3-continued

Management Application Responses

| Response | Opcode | Data Field Length | Data Field Contents |
|---|---|---|---|
| ADSL_Fault_Data | 0x31 | 42 | fault counters and defects |
| ADSL_Fault_Data_Unavail | 0x32 | 0 | — |
| ADSL_Dying_Gasp_Sent | 0x34 | 0 | — |
| ADSL_Dying_Gasp_Rej | 0x35 | 0 | — |
| ADSL_Performance_Delta | 0x36 | 32 | delta performance counters |
| FAULT_Declared* | 0x42 | 1 | type of fault |
| FAULT_Ended* | 0x43 | 1 | type of fault |
| FAULT_Deactivate* | 0x44 | 2 | shutdown time (sec) |

*indicates an unsolicited response

MBOX_Sync and MBOX_Sync_Ack responses are sent by the Management Application mailbox driver after power-up or reset to establish synchronization with the Host-side mailbox driver. These responses do not have address fields or data fields.

The ADSL_Open_Rejected response is returned if the modem is already connected or attempting to connect, or if an operator-initiated line test is in progress. The data field has 3 bytes. Byte 0 gives the reason for the rejection—0x00 indicates that the line is not down; 0x01 indicates that a test is in progress. If the reason is that a test is in progress, bytes 1 and 2 give the time remaining in the test (in seconds), with the LSB in byte 1 and the MSB in byte 2. Otherwise, the data field will not have meaningful data.

The ADSL_Open_Failed response indicates a failure has occurred during the initialization process. An error code is returned in the data field, as shown in Table 4.

TABLE 4

Error for ADSL_Open_Failed

| Error Code | Mnemonic | Explanation |
|---|---|---|
| 0x05 | REQ_BITRATE_TOO_HIGH | Bit rate requested by ATU-C cannot be supported |
| 0x0A | NO_LOCK-POSSIBLE | Unable to lock with ATU-C |
| 0x0F | PROTOCOL_ERROR | A failure occurred during the initialization process |
| 0x14 | MESSAGE ERROR | A message received from the ATU-C was invalid (incorrect CRC or wrong format) |

If the modem is unable to connect with the ATU-C, and yet does not report a failure, the Management Application stops the attempt after a time-out period. This scenario could arise, for example, as a result of the ATU-C not functioning or the telephone wire being cut. The time-out period is 1 minute after the ADSL_Open request The ADSL_Connection_Opened indicates that the ADSL_Open request has succeeded and that a connection has been established with the ATU-C. The ADSL_Connection_Lost is sent if the line capacity deteriorates to the point where the requested bit rates can no longer be supported. This is an unsolicited response. The ADSL_Connection_Closed is sent to indicate that an ADSL_Close request has been successful.

An ADSL_Close request will be rejected if the modem is currently down, or if the issuer of the ADSL_Close is not the "owner" application which issued the ADSL_Open. The ADSL_Close_Rejected response indicates this rejection with a one-byte data field which gives the reason for the rejection: 0x00 indicates that the modem is not down; 0x01 indicates that the issuer is not the owner.

The ADSL_Selftest_Results response gives selftest results. The data field has one byte, which contains the self test result code, as given in Table 5.

TABLE 5

Selftest Result Codes

| Result Code | Mnemonic | Meaning |
|---|---|---|
| 0x0000 | Selftest_Short_OK | The short selftest detected no problems |
| 0x0001 | Selftest_Short_Warning | The short selftest detected a non-fatal problem |
| 0x0002 | Selftest_Short_Error | The short selftest detected a failure |
| 0x0003 | Selftest_Long_OK | The long selftest detected no problems |
| 0x0004–0x???? | Selftest_Long_ . . . | Long selftest error codes |

The ADSL Version response returns the versions of the near-end and far-end ADSL modems. The data field contains two bytes. The near-end version is given first in time; the far-end version is given second. The near-end version is always available. The availability of the far-end version is given in Table 6.

TABLE 6

Availability of Far-End Version and Far-End Vendor

| Modem State | Availability of Far-End Version and Vendor |
|---|---|
| Down, after power-up | available as 0xFF |
| Initializing a connection | available as either 0xFF or as actual value |
| Connected | actual value available |
| Down, after connection is closed or fails | value from previous connection is available |

The ADSL_Vendor response reports the vendors of the near-end and far-end ADSL modems. The data field is two bytes long with the near-end vendor being reported first; the far-end vendor is reported second. The vendor number for Alcatel is 0x0022. The near-end-vendor is always available. The availability of the far-end vendor is given in Table 6.

The ADSL Oper_Data_response returns the operational data for the near and far ends of the line. Eight bytes are reported, as shown in Table 7. The availability of this data is given in Table 8. Note: For the PC NIC, the relCapacityOccupationDnstr value will be limited to a maximum of 100.

TABLE 7

Data Field for ADSL_Oper_Data_Near

| Byte | Mnemonic | Meaning |
|---|---|---|
| 0 (first in time) | relCapacityOccupationDnstr | downstream bit rate as a percentage of the maximum attainable (Bmax) |
| 1 | noiseMarginDnstr | amount of increased noise (dB loss in SNR) that can be tolerated while maintaining a downstream BER of 10-7 |

TABLE 7-continued

Data Field for ADSL_Oper_Data Near

| Byte | Mnemonic | Meaning |
|---|---|---|
| 2 | outputPowerUpstr | ATU-R transmit power level (dBm) |
| 3 | attenuationDnstr | difference in dB between the power received by the ATU-R and a reference ATU-C transmit power level |
| 4 | relCapacityOccupationUpstr | upstream bit rate as a percentage of the maximum attainable (Bmax) |
| 5 | noiseMarginUpstr | amount of increased noise (dB loss in SNR) that can be tolerated while maintaining an upstream BER of 10-7 |
| 6 | outputPowerDnstr | ATU-C transmit power level (dBm) |
| 7 | attenuationUpstr | difference in dB between the power received by ATU-C and a reference ATU-R transmit power level |

TABLE 8

Availability of Operational Data and Raw Performance Data

| Modem State | Availability of Operational Data |
|---|---|
| Down, after power-up | available as 0xFF |
| Initializing a connection | not available |
| Connected | valid data available |
| Down, after connection is closed or fails | data from previous connection is available |

The ADSL_Carrier_Load response returns the bit-per-symbol loading for each carrier bin across the ADSL frequency band. The values for the 256 bins are packed two per byte with a total data length of 128 bytes. The values are given in order of increasing frequency. For each byte, the lower-frequency value is in the upper nibble as shown in Table 10.

TABLE 10

Data field for ADSL_Carrier_Load

| Nibble | Data |
|---|---|
| byte 0, upper nibble | load for carrier 0 |
| byte 0, lower nibble | load for carrier 1 |
| . | . |
| . | . |
| . | . |
| byte 127, upper nibble | load for carrier 254 |
| byte 127, lower nibble | load for carrier 255 |

ADSL_Oper_Data_Unavail means that operational data is not available. This happens while the modem is initializing a connection.

The ADSL_Channel_Data response returns the 16-bit quantities indicating bit rates for the fast and interleaved channels for the near and far ends. Table 11 shows the data field. The availability of this data is given in Table 8.

TABLE 11

Data Field for ADSL_Channel_Data Response

| Byte | Mnemonic | Bits | Meaning |
|---|---|---|---|
| 0 (first in time) | ChanDataIntNear | 7-0 | near-end interleaved channel bit rate (kbits/sec) |
| 1 | | 15-8 | |
| 2 | ChanDataFastNear | 7-0 | near-end fast channel bit rate (kbits/sec) |
| 3 | | 15-8 | |
| 4 | ChanDataIntFar | 7-0 | far-end interleaved channel bit rate (kbits/sec) |
| 5 | | 15-8 | |
| 6 | ChanDataFastFar | 7-0 | far-end fast channel bit rate (kbits/sec) |
| 7 | | 15-8 | |

The ADSL_Performance reports 8-bits representing ADSL modem performance counters maintained by the Management Application. These counters are polled from the Modem SW once per second, and hence can be interpreted as per-second quantities. These counters are frozen while defects are being experienced on their respective end. The ADSL_Performance response also reports the two 32-bit Quality of Service parameters maintained by the Management Application, Near-End Errored Seconds and Far-End Errored Seconds.

The data field format for the ADSL_Performance response is given in Table 12. Note that byte 0 is first in time.

The ADSL_Performance counters are always available.

TABLE 12

Data Field for ADSL_Performance

| Byte | Mnemonic | Description |
|---|---|---|
| 0 | near-end fec-ni | Number of near-end received superframes with one or more Reed-Solomon corrections in a dat frame (non-interleaved) |
| 1 | near-end fec-I | Number of near-end received superframes with one or more Reed-Solomon corrections in a data frame (interleaved) |
| 2 | near-end crc-ni | Number of near-end received superframes with an incorrect CRC in the non-interleaved path |
| 3 | near-end crc-I | Number of near-end received superframes with an incorrect CRC in the interleaved path |
| 4 | near-end hec-ni | Number of near-end received superframes with at least one cell with an errored HEC (non-interleaved) |
| 5 | near-end hec-I | Number of near-end received superframes with at least one cell with an errored HEC (interleaved) |
| 6 | far-end tec-ni | Number of far-end received superframes with one or more Reed-Solomon corrections in a data frame (non-interleaved) |
| 7 | far-end fec-I | Number of far-end received superframes with one or more Reed-Solomon corrections in a data frame (interleaved) |
| 8 | far-end crc-ni | Number of far-end received superframes with an incorrect CRC in the non-interleaved path |
| 9 | far-end crc-I | Number of far-end received superframes with an incorrect CRC in the interleaved path |
| 10 | far-end hec-ni | Number of far-end received superframes with at least one cell with an errored HEC (non-interleaved) |
| 11 | far-end hec-I | Number of far-end received superframes with at least one cell with an errored HEC (interleaved) |
| | near-end ES: | Near-end Errored Seconds: number of seconds which contain near-end |
| 12 | bits 7-0 | CRC anomalies (ni or I, or LOS or LOF defects |
| 13 | bits 15-8 | |
| 14 | bits 23-16 | |

TABLE 12-continued

Data Field for ADSL_Performance

| Byte | Mnemonic | Description |
|---|---|---|
| 15 | bits 31-24 far-end ES: | Far-end Errored Seconds: number of seconds which contain far-end CRC anomalies (ni or I) or LOS or LOF detects |
| 16 | bits 7-0 | |
| 17 | bits 15-8 | |
| 18 | bits 23-16 | |
| 19 | bits 31-24 | |

The ADSL_Performance Raw response reports the raw 16-bit ADSL modem performance counter values as polled at the time of the Host request. Two 32-bit Quality of Service parameters maintained by the Management Application, Near-End Errored Seconds and Far-End Errored Seconds are also reported.

The data field format is given in Table 13. Byte 0 is first in time. The availability of the raw performance counters is given in Table 8.

TABLE 13

Data Field for ADSL_Performance_Raw and ADSL_Performance_Delta

| Byte | Mnemonic | Bits | Description |
|---|---|---|---|
| 0 | near-end fec-ni | 7-0 | Number of near-end received superframes with one or more Reed-Solomon corrections in a data frame (non-interleaved) |
| 1 | | 15-8 | |
| 2 | near-end fec-I | 7-0 | Number of near-end received superframes with one or more Reed-Solomon corrections in a data frame (interleaved) |
| 3 | | 15-8 | |
| 4 | near-end crc-ni | 7-0 | Number of near-end received superframes with an incorrect CRC in the non-interleaved path |
| 5 | | 15-8 | |
| 6 | near-end crc-I | 7-0 | Number of near-end received superframes with an incorrect CRC in the interleaved path |
| 7 | | 15-8 | |
| 8 | near-end hec-ni | 7-0 | Number of near-end received superframes with at least one cell with an errored HEC (non-interleaved) |
| 9 | | 15-8 | |
| 10 | near-end hec-I | 7-0 | Number of near-end received superframes with at least one cell with an errored HEC (interleaved) |
| 11 | | 15-8 | |
| 12 | far-end fec-ni | 7-0 | Number of far-end received superframes with one or more Reed-Solomon corrections in a data frame (non-interleaved) |
| 13 | | 15-8 | |
| 14 | far-end fec-I | 7-0 | Number of far-end received superframes with one or more Reed-Solomon corrections in a data frame (interleaved) |
| 15 | | 15-8 | |
| 16 | far-end crc-ni | 7-0 | Number of far-end received superframes with an incorrect CRC in the non-interleaved path |
| 17 | | 15-8 | |
| 18 | far-end crc-I | 7-0 | Number of far-end received superframes with an incorrect CRC in the interleaved path |
| 19 | | 15-8 | |
| 20 | far-end hec-ni | 7-0 | Number of far-end received superframes with at least one cell with an errored HEC (non-interleaved) |
| 21 | | 15-8 | |
| 22 | far-end hec-I | 7-0 | Number of far-end received superframes with at least one cell with an errored HEC (interleaved) |
| 23 | | 15-8 | |
| 24 | near-end ES | 7-0 | Near-end Errored Seconds: number of seconds which contain near-end CRC anomalies (ni or I), or LOS or LOF defects |
| 25 | | 15-8 | |
| 26 | | 23-16 | |
| 27 | | 31-24 | |
| 28 | far-end ES | 7-0 | Far-end Errored Seconds: number of seconds which contain far-end CRC anomalies (ni or I), or LOS or LOF defects |
| 29 | | 15-8 | |
| 30 | | 23-16 | |
| 31 | | 31-24 | |

The ADSL_Perf_Unavail response indicates that performance data is not available. Raw performance data is not available, for example, while a connection is being initialized.

The ADSL_Fault_Data response reports the various fault counters maintained by the Management Application, as well as the current state of the defects bitmap. The counters are all 32 bits in length. Table 14 gives the data field format for this response. Fault data availability is given in Table 15.

TABLE 14

Data Field for ADSL_Fault_Data Response

| Byte | Fault Counter | Bits |
|---|---|---|
| 0 | Near-End Loss of Signal | 7-0 |
| 1 | | 15-8 |
| 2 | | 23-16 |
| 3 | | 31-24 |
| 4 | Near-End Loss of Signal | 7-0 |
| 5 | | 15-8 |
| 6 | | 23-16 |
| 7 | | 31-24 |
| 8 | Near-End Loss of Cell Delineation, ni | 7-0 |
| 9 | | 15-8 |
| 10 | | 23-16 |
| 11 | | 31-24 |
| 12 | Near-End Loss of Cell Delineation, i | 7-0 |
| 13 | | 15-8 |
| 14 | | 23-16 |
| 15 | | 31-24 |
| 16 | Far-End Loss of Cell Delineation, ni | 7-0 |
| 17 | | 15-8 |
| 18 | | 23-16 |
| 19 | | 31-24 |
| 20 | Far-End Loss of Cell Delineation, I | 7-0 |
| 21 | | 15-8 |
| 22 | | 23-16 |
| 23 | | 31-24 |
| 24 | Near-End Loss of Frame | 7-0 |
| 25 | | 15-8 |
| 26 | | 23-16 |
| 27 | | 31-24 |
| 28 | Far-End Loss of Frame | 7-0 |
| 29 | | 15-8 |
| 30 | | 23-16 |
| 31 | | 31-24 |
| 32 | Near-End Loss of Frame | 7-0 |
| 33 | | 15-8 |

TABLE 14-continued

Data Field for ADSL_Fault_Data Response

| Byte | Fault Counter | Bits |
|---|---|---|
| 34 | | 23-16 |
| 35 | | 31-24 |
| 36 | Far-End Loss of Margin | 7-0 |
| 37 | | 15-8 |
| 38 | | 23-16 |
| 39 | | 31-24 |
| 40 | Near-End Defects recent status | |
| 41 | Far-End Defects recent status | |

TABLE 15

Availability of Fault Data

| Modem State | Fault Data Availability |
|---|---|
| Down, after power-up | available as 0x0000 |
| Initializing a connection | not available |
| Connected | valid data available |
| Down, after connection is closed of fails | data from previous connection available |

The ADSL_Fault_Data_Unavail response indicates that the requested fault data is not available. Fault data is not available while the modem is initializing a connection. The ADSL_Dying_Gasp_Sent indicates that a Dying Gasp has been sent as a result of an ADSL_Send_Dying_Gasp command. This response is not generated as a result of an ADSL_Close command. The ADSL_Dying_Gasp_Rej indicates that the Dying Gasp request has been rejected. This occurs if the modem is not connected.

The ADSL_Performance_Delta response is similar to the ADSL_Performance response. This response reports changes or "deltas" from the previous host read, rather than per-second quantities. With the exception of the Errored Second counters, these counters represent totals accumulated since the last read from the host. As such, there is a possibility that these counters may overflow or "wrap" if the host does not read them frequently enough. The counters are 16 bits each—and the maximum rate of increase of any count is 58 per second. Therefore, in the worst case, the counters will wrap after about 18 minutes. It is preferable, therefore, to read them more often than this. [CLAIM]

The Errored Second counters do not reset upon being read. These counters give totals of errored seconds accumulated since one second after the beginning of Showtime.

The data field format (which is the same as the ADSL_Performance Raw format) is given in Table 13.

The FAULT_Declared response is used to indicate the occurrence of a fault. It is spontaneously sent to the Host whenever a fault condition is declared. This one-byte data field has a code indicating the type of fault that has occurred. Table 16 shows the different kinds of faults.

The System_Error fault indicates that a serious error has occurred which calls for a hard reset and software reload. One example is the time out of the mailbox, as described above.

TABLE 16

Fault Codes for FAULT_Declared and FAULT_Ended

| Fault Code | Fault Meaning | Meaning |
|---|---|---|
| 0x01 | Loss_of_Signal_Near | Near-End Loss of Signal |
| 0x02 | Loss_of_Signal_Far | Far-End Loss of Signal |
| 0x03 | Loss_of_CD_Near_ni | Near-End Loss of Cell Delineation, non-Interleaved |
| 0x04 | Loss_of_CD_Near_i | Near-End Loss of Cell Delineation, Interleaved |
| 0x05 | Loss_of_CD_Far_ni | Far-End Loss of Cell Delineation, non-Interleaved |
| 0x06 | Loss_of_CD_Far_i | Far-End Loss of Cell Delineation, Interleaved |
| 0x07 | Loss_of_Frame_Near | Near-End Loss of Frame |
| 0x08 | Loss_of_Frame_Far | Far-End Loss of Frame |
| 0x09 | System_Error | Fatal System Error which calls for a reset |
| 0x0A | Loss_of_Margin_Near | Near-End Loss of Margin |
| 0x0B | Loss_of_Margin_Far | Far-End Loss of Margin |

FAULT_Ended is a response that indicates the termination of a fault condition. It is spontaneously sent to the Host whenever a fault-condition is terminated. The one-byte data field contains a code indicating the type of fault that has ended (see Table 16). [FLOWCHART]

The ADSL_Deactivate response indicates that the ADSL modem has been shut down. This allows, for example, the operator to perform line tests.

When this request is received by the on board controller Management Application, the modem is automatically shut down, and the host receives an ADSL_Deactivate response. The on-board controller Management Application then enforces a lock-out period for the duration of the test. During this time, any ADSL_Open requests received from the host are rejected using, e.g., the ADSL_Open_Rejected.

The two-byte data field gives the duration of the test in seconds (up to 300). The first data byte has bits 7–0 of the test duration with the second data byte having bits 15–8.

In addition to the above, general purpose messages may be sent from any entity to any other. These are listed in Table 17.

TABLE 17

General Purpose Messages

| Command | Opcode | Data Field Length | Data Field Contents |
|---|---|---|---|
| GENERIC_Character | 0x81 | 1 | ASCII character |
| GENERIC_Integer | 0x82 | 1 | 8 bit number |
| GENERIC_Byte | 0x83 | 1 | unspecified |

The GENERIC_Character message can be used to send ASCII characters from one entity to another. The data field has the ASCII character code. The GENERIC_Integer may similarly be used to send integers from one entity to another. The data field has an 8-bit unsigned integer. The GENERIC_Byte message may be used to carry any 8 bit data value. The meaning of the value is left up to the sending and receiving entities.

The Management Application and the Modem Software can interact in ways which do not involve the Host. These are given in the Interface Specification "SWB-Modem SW Architecture" (Alcatel Document 3EC 15576 AAAA PBZZA). Other Combined Scenarios describe the interaction between the Host, the Management Application, and the Modem Software.

The Management Application monitors the modem performance counters and the defects bitmap to maintain performance data and to detect fault conditions. Definitions of the modem defects and performance primitives are found in [TRANSPORT].

Performance data is provided to the host in three forms.

The ADSL_Performance response provides performance data in the form of per-second quantities. These values can be taken as error-per-second data. As such, these counters will never have values greater than 58 (the number of superframes per second). These values are correlated with defects by the on-board controller Management Application as recommended in [TRS]. The polling period for these counters is one second.

The ADSL_Performance_Delta response provides performance data in the form of reset-on-read counters. These counters are correlated with line defects. In order to prevent overflow, these counters should be read at least once every 18 minutes. These counters are updated once per second.

The ADSL_Performance_Raw response provides the values of the raw 16-bit free-running counters given by the modem software. silo These counters are not correlated with line defects. In addition, the values reported are accurate only at the time of polling; therefore, latency issues may make it difficult for the host to interpret this data correctly. [CLAIM 3 DIFFERENT WAYS]

In addition, all three of the above mentioned responses provide Errored Second counters that represent the accumulated total of errored seconds since the beginning of Showtime. They are 32 bits in length and do-not reset when read.

When near-end defects are being experienced, the near-end and far-end performance counters are frozen. Near-End Errored Seconds, however, are not frozen. When far-end defects are being experienced, far-end counters (except Far-End Errored Seconds) will be frozen. This correlation applies to the ADSL_Performance and ADSL_Performance_Delta responses only.

The Near-End Errored Seconds parameter is a 32-bit count of one-second intervals which contain one or more near-end cyclic redundancy code (CRC) (interleaved or non-interleaved) anomalies, or one or more near-end LOS or near-end LOF defects. The count begins 1 second after the modem enters Showtime, enabling any initial errors from reset or SYNC problems to be ignored.

The Far-End Errored Seconds parameter is a 32-bit count of one-second intervals which contain one or more far-end CRC (interleaved or non-interleaved)-anomalies, or one or more far-end LOS or far-end LOF defects. The count begins 1 second after the modem enters Showtime.

The Management Application polls the defects bitmap every 0.5 seconds in order to detect the fault conditions listed below. Each fault type is associated with a 32-bit counter, which contains the number of faults that have occurred since 1 second after the beginning of Showtime.

Far-end (ATU-C) defects are ignored while the ATU-R is experiencing near-end defects.

Near-and Far-End Loss of Signal (LOS)

A Near-End Loss of Signal fault is declared when either:

the near-end LOS defect has been observed to be continuously active for 2.5±0.5 seconds; or the near-end LOS defect is present and the criteria for a Near-End Loss of Frame fault have been met.

Analogously, a Far-End Loss of Signal fault is declared when either:

the far-end LOS defect has been observed to be continuously active for 2.5±0.5 seconds; or the far-end LOS defect is present and the criteria for a Far-End Loss of Frame fault has been met.

The Host is notified of these faults through the FAULT_Declared(Loss_of_Signal_Near) and FAULT_Declared (Loss_of_Signal_Far) responses, respectively.

A Near-End Loss of Signal fault condition is terminated when the near-end LOS defect has been absent for 10±0.5 seconds. The Host shall be notified through the FAULT_Ended(Loss_of_Signal_Near) response.

A Far-End Loss of Signal fault condition is terminated when the far-end LOS defect has been absent for 10±0.5 seconds. The Host is notified through the FAULT_Ended (Loss_of_Signal_Far) response.

Starting 1 second after the beginning of Showtime, the number of Near-End and Far-End Loss of Signal faults are-maintained in 32-bit counters, which can be, for example, values from software counters. The Host may obtain these counters using the ADSL Report Fault Data command. The values are reported in the ADSL_Fault_Data response.

Near-and Far—End Loss of Cell Delineation (LCD) [DICTATE]

A Near-End Loss of Cell Delineation fault is declared when either of the near-end LCD defects (interleaved or non-interleaved) is-continuously active for 2.5±0.5 seconds, except if one of the following conditions exist:

the near-end LOS defect is present;

the near-end LOF defect is present;

tha Near-End Loss of Signal fault is declared; or a Near-End Loss of frame fault is declared.

If any of these conditions holds, a fault is not declared.

A Far-End Loss of Cell Delineation fault is declared when either of the far-end LCD defects (interleaved or non-interleaved) has been observed-to be continuously active for 2.5±0.5 seconds, except if one of the following conditions exist:

the far-end LOS defect is present;

the far-end LOF defect is present;

a Far-End Loss of Signal fault is declared; or a Far-End Loss of Frame fault is declared.

If any of these conditions holds, a fault is not declared.

The four types of LCD errors and the corresponding Host notifications are shown in Table 18.

TABLE 18

Loss of Cell Delineation Faults

| Defect | Explanation | Response sent to Host |
| --- | --- | --- |
| near-end LCD-ni | Loss of Cell Delineation, Near-End, Non-Interleaved | FAULT_Declared (Loss_of_CD_Near_ni) |
| near-end LCD-I | Loss of Cell Delineation, Near-End, Interleaved | FAULT_Declared (Loss_of_CD_Near_i) |
| far-end LCD-ni | Loss of Cell Delineation, Far-end, Non-Interleaved | FAULT_Declared (Loss_of_CD_Far_ni) |
| far-end LCD-I | Loss of Cell Delineation, Far-end, Interleaved | FAULT_Declared (Loss_of_CD_Far_i) |

A Near-End Loss of Cell Delineation fault condition is terminated when any of the following conditions becomes true:

a Near-End Loss of Frame failure is declared;

a Near-End Loss of Signal failure is declared; or the near-end LCD defect is absent for 10±0.5 seconds.

The Host shall be notified through the FAULT_Ended (Loss_of_CD_Near_ni) or the FAULT_Ended(Loss_of_CD_Near_i) response, as appropriate.

A Far-End Loss of Cell Delineation fault condition is terminated when any of the following conditions becomes true:

a Far-End Loss of Frame failure is declared;

a Far-End Loss of Signal failure is declared; or the far-end LCD defect has been absent for 10±0.5 seconds.

The Host is notified through the FAULT_Ended(Loss_of_Cd_Far_ni) or the FAULT Ended(Loss_of_CD_Far_i) response, as appropriate.

Starting 1 second after the beginning of Showtime, the number of Near-End Loss of Cell Delineation faults and the number of Far-End Loss of Cell Delineation faults are maintained in 32-bit counters. The Host may obtain these counters using the ADSL_Report_Fault_Data command, reported in the ADSL_Fault_Data response.

A Near-End Loss of Frame fault is declared when the near-end LOF defect has been observed to be continuously active for 2.5±0.5 seconds, except when either of the following conditions are true:

the-near-end LOS defect is active; or a Near-End Loss of Signal fault has been declared.

If either of these conditions is true, no fault is declared.

If a fault is declared, the Host is notified through the FAULT_Declared(Loss_of_Frame_Near) response.

A Far-End Loss of Frame fault is declared when the far-end LOF defect has been observed to be continuously active for 2.5±0.5 seconds, except when either of the following conditions are true:

the far-end LOS defect is active; or a Far-End Loss of Signal fault has been declared.

If either of these conditions is true, no fault is declared.

If a fault is declared, the Host is notified through the FAULT_Declared(Loss_of_Frame) response.

A Near-End Loss of Frame fault is terminated if either of the following conditions becomes true:

a Near-End Loss of Signal fault is declared; or the near-end LOF defect is absent for 10±0.5 seconds.

The Host is notified of the termination of the fault through the FAULT_Ended(Loss_of_Frame_Near) response.

A Far-End Loss of Frame fault is terminated if either of the following conditions becomes true:

a Far-End Loss of Signal fault is declared; or the far-end LOF defect has been absent for 10±0.5 seconds.

The Host is notified of the termination of the fault through the FAULT_Ended(Loss_of_Frame_Far) response.

Starting 1 second after the beginning of Showtime, the number of Near-End Loss of Frame faults and Far-End Loss of Frame faults are maintained in 32-bit counters. The Host may request these counters using the ADSL_Report_Fault_Data command. The values are reported in the ADSL_Fault_Data response.

A Near-End Loss of Margin fault is declared when the near-end LOM defect is observed to be continuously active for 2.5±0.5 seconds. The host shall be notified through the FAULT_Declared(Loss_of_Margin_Near) response.

A Far-End Loss of Margin fault is declared when the far-end LOM defect has been observed to be continuously active for 2.5±0.5 seconds. The host is notified through the FAULT_Declared(Loss_of_Margin_Far) response.

The Near-End Loss of Margin fault is conversely terminated when the near-end LOM defect has been observed to be continuously absent for 10±0.5 seconds. The host is notified through the FAULT_Ended(Loss_of_Margin_Near) response.

A Far-End Loss of Margin fault is terminated when the far-end. LOM defect has been observed to be continuously absent for 10±0.5 seconds. The host shall be notified through the FAULT_Ended(Loss_of_Margin_Far) response.

Starting 1 second after the beginning of Showtime, the number of Near-end and Far-End Loss of Margin faults are maintained in 32-bit counters. The host may request these counters using the ADSL_Report_Fault_Data command.

Figure 47:
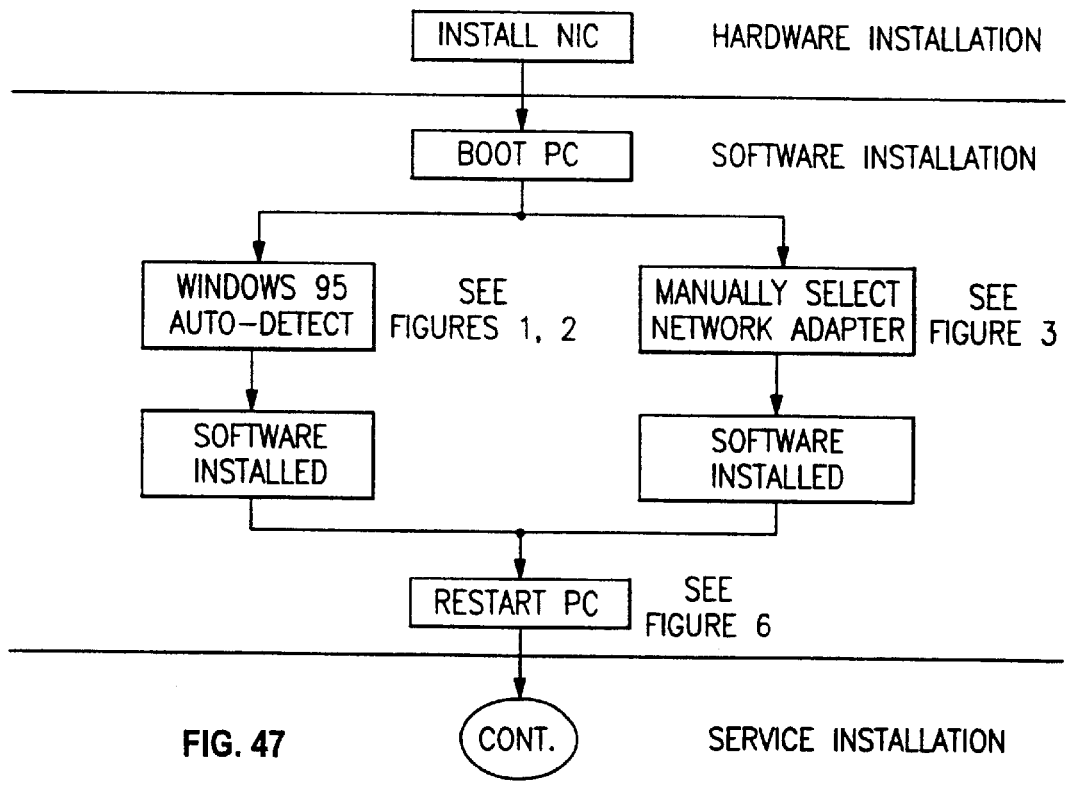
FIG. 47 shows a basic installation process.

The basic installation process is shown in FIG. 47.

When ServiceMonitor is first started the user needs to configure services for the first time. The user is prompted through a message box that no services have been installed and asked if he/she wants to install a new service now. If the user elects to install services later, then that could be done by going to the "ServiceMonitor Properties" dialog off the main dialog and selecting "Install New" (See FIG. 20) or by selecting "Install New Service" off the System Tray Icon (See FIG. 19).

Figure 48:
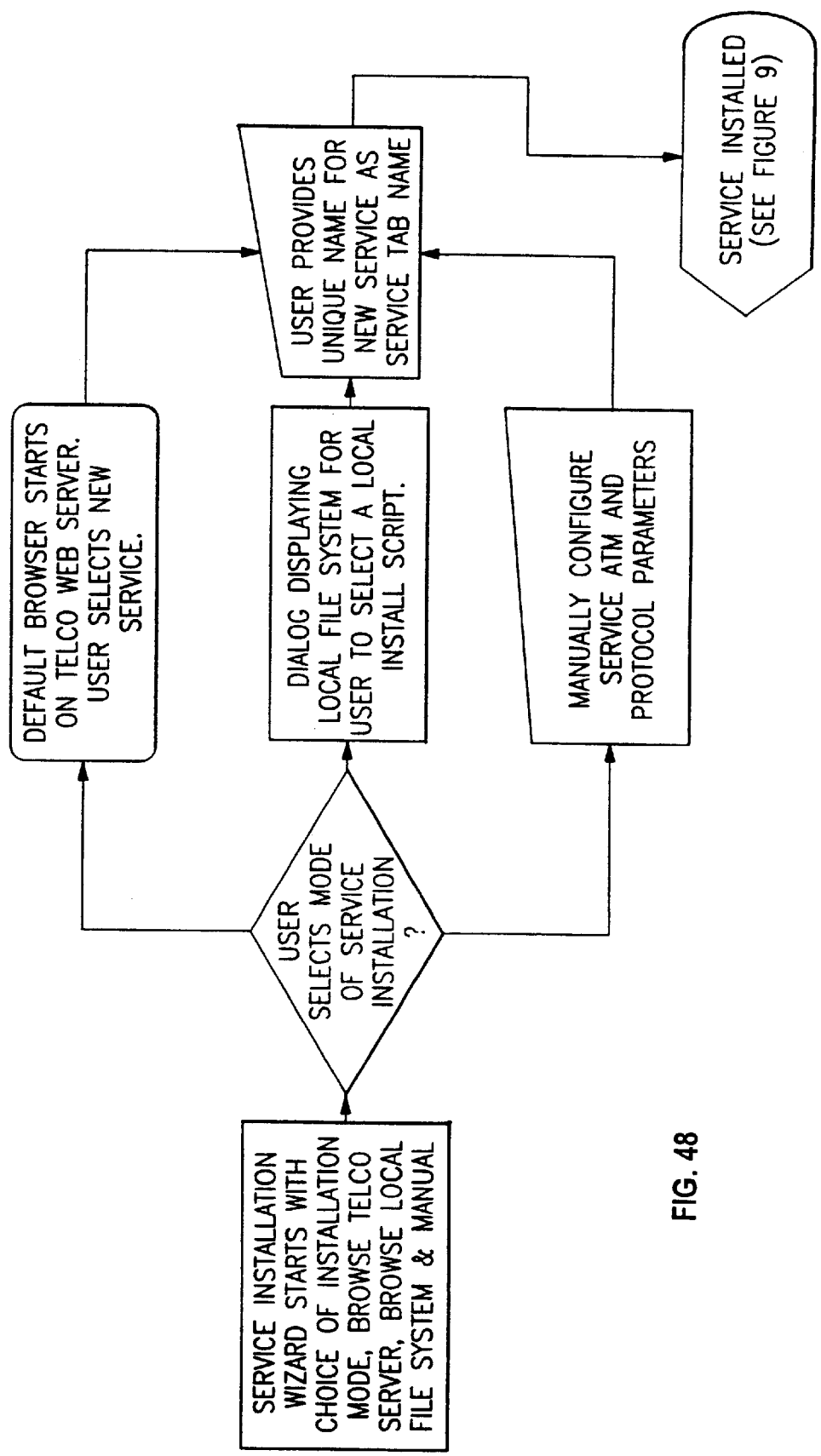
FIG. 48 shows the flow diagram for installing new services.

The installation wizard dialogs follow the basic philosophy of guiding the user through the type of installation. The flow-chart in FIG. 48 demonstrates the pattern of questions for the user to answer for installation of a new service.

The user can choose to remove an installed service via the "ServiceMonitor Properties" dialog as shown in FIG. 19. The service tab to be removed is selected, and-then select "Uninstall". This prompts the user with a dialog, warning them of their actions, and asking for confirmation of the removal action. If the user selects "OK", then the service is removed and the tabs are updated to reflect this removal.

The normal operation of ServiceMonitor after boot-up and logon is to start up in the System Tray. Alternately, ServiceMonitor can start as a minimized application. FIG. 19 shows some of the standard interaction with Service-Monitor as it is in the System Tray.

ServiceMonitor was designed to be minimally intrusive and to provide as much feedback to the user as possible, in an easy manner. The Tray Icon has three artificially-simulated LEDs, of which the left represents transmission of data while the right represents data received. These two LEDs alternate between dark red and bright green colors for data movement. Bright red would indicate some sort of error in the data flow. The center LED is used to indicate line sync with the ADSL Modem. For this LED, red would indicate loss of sync and bright green is the normal condition.

Should the user decide that manual adjustment of the connection parameters is needed, then selecting "Modify" brings up the Modify Service dialog and the previous dialog "Service Properties" disappears. If the service being elected to modify is actively connected, then a warning dialog appears, notifying the user that any changes to an active service could cause loss of data. This warning dialog allows the user to cancel the modify action or continue to bring up the Modify dialog. While the user is in the modification dialog, changes can be made to any of the connection parameters, including alteration of the tab name.

For any service that is using any protocol other than Native ATM, the "Settings" button is enabled and brings up a configuration dialog for that protocol if selected.

For communicating via IP over ATM, the configuration dialog provides flexibility. A PVC connection using Routed IpoA allows using the gateway IP address already configured in the TCP/IP protocol stack as the destination machine to connect to in the Ethernet LAN. If the connection is a machine other than the gateway, then the user needs to provide the IP address of that machine to complete the connection. This configuration is simplified by the use of SVC's or Bridged IpoA. The ATM Interface dialog displays global performance data and configuration setting to the user (See FIG. 13). This dialog was intended to be used for providing ISP's with configuration information in the event that a service installation failed or was working improperly. The connection. status information is static and cannot be altered by the user in this application.

Figure 15:
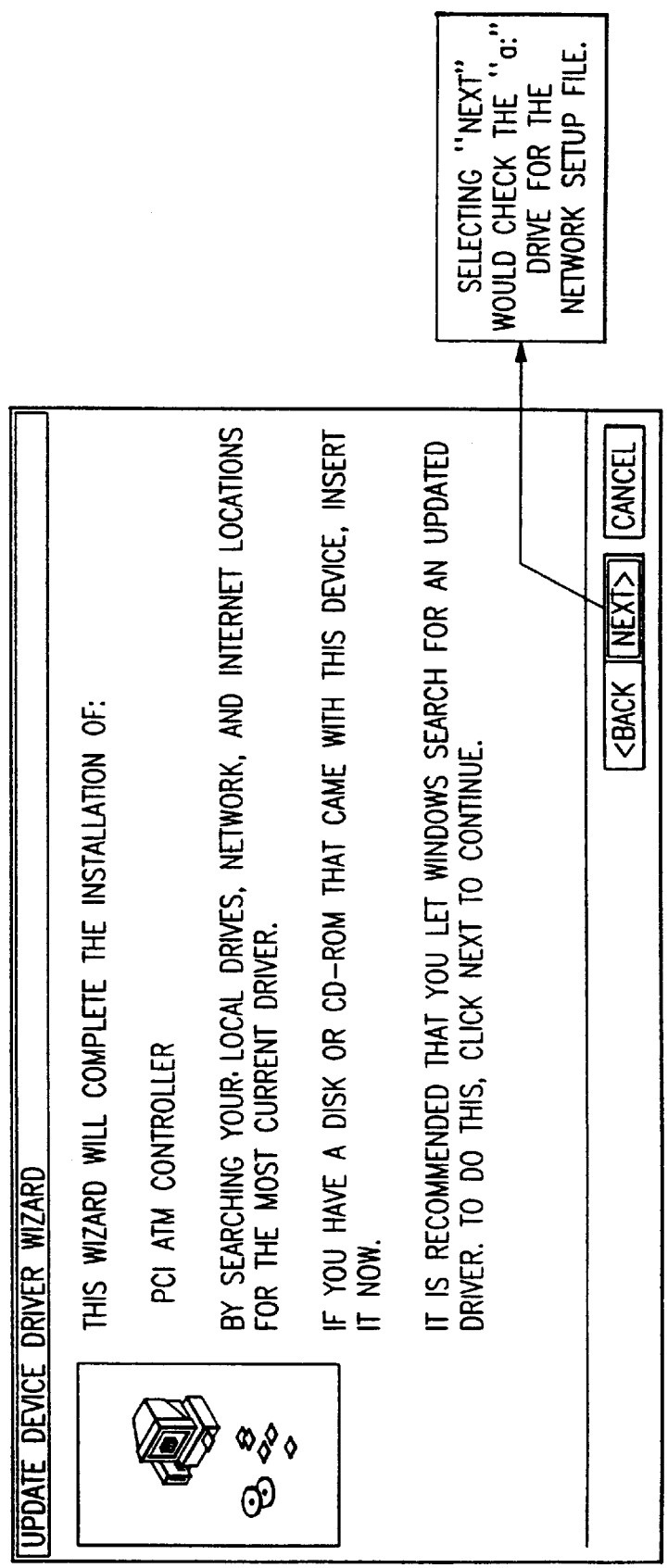
FIG. 15 shows a screen shot of windows autodetection.
Figure 16:
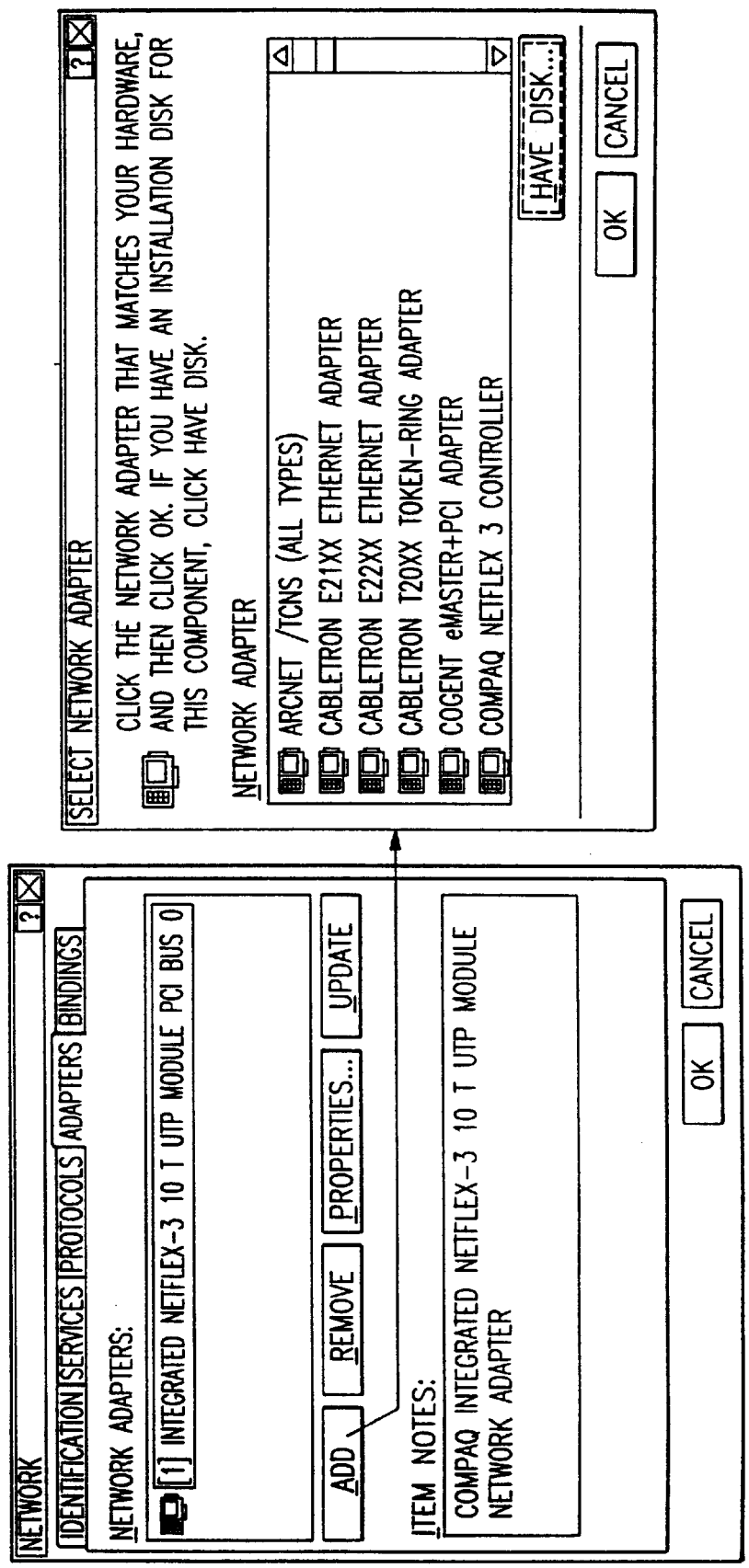
FIG. 16 shows a windows NP installation.

The Tabs that display modem performance are initially set to as blocked—i.e. not being displayed, since they were intended for the advanced user to use for troubleshooting communication problems. The option is checked on the options tab in order to display it. This causes the dialog to appear as shown in FIG. 15.

The data contained on these dialogs is that which is specified to be supplied by the Copperhead Specification. The only added feature is the ability to connect and disconnect the modem manually from this dialog.

5. Help

All dialog windows have both context sensitive help—"?" in upper right corner—and F1 help or "Help" button controls. Context sensitive help allows the user to left mouse click the "?" and then click on the control that help is needed for to get a popup help window. This help is generally very short and concise. If more detailed help is needed the user can select the F1 key on the keyboard or the "Help" button if present.

This embodiment also operates using firmware running on a ARM7TDMI RISC processor, and using the HYDROGEN chipset from ATML. The Hydrogen firmware, as described herein, also includes download software, control information passing, and POST initiation.

Figure 49:
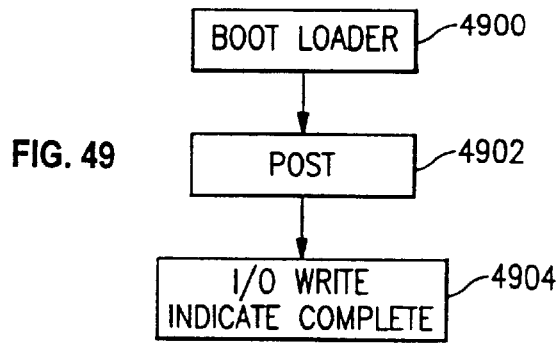
FIG. 49 shows a flow of power-up.
Figure 50:
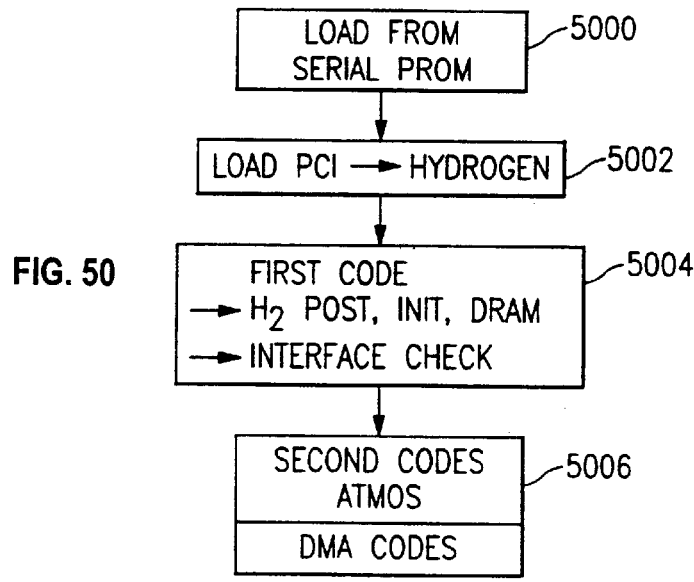
FIG. 50 shows the loading operations occurring on power-up.

The present disclosure uses the ATMos operating system provided by ATML. This operation system runs the functional blocks shown in FIG. 49. FIG. 50 shows the download process.

The Boot loader module 4900 is actuated whenever power is applied to the HYDROGEN chipset, or the reset pin is asserted. The HYDROGEN chipset has minimum boot loader code embedded in the internal boot ROM. Part of this embedded code is an ARM block that has two boot ROM codes.

Is This embodiment selects ROM2 to boot from serial PROM 412 at step 5000. A sub-vendor ID is included in the serial PROM that sets the configuration register. The boot loader waits for a code download complete bit set by the host into the mailbox register. This 12 byte code is factory preprogrammed into the serial boot ROM.

The PC power on selftest ("POST") code then performs configuration at Step 4902 to allow access into the HYDROGEN chip. During the PC operating system load, e.g. Win95 or NT, the NIC driver downloads code at step 5002 to the 8-Kbyte internal SRAM of the HYDROGEN starting at location 0x00004000. The code is downloaded through the I/O window assigned during PCI configuration.

After the NIC driver finishes the code download, a bit in the Mailbox register is set by an I/O write at 4904 to a location assigned during PCI configuration. The HYDROGEN then begins execution starting at 0x000040000.

The downloaded codes are divided in a two-step process.

The first downloaded code or HYDROGEN POST code shown at 5004 includes:

HYDROGEN power-on self test

HYDROGEN self-Initialization

HYDROGEN DRAM sizing and check

ASIC interface check

Other interface checks e.g. SACHEM & UTOPIA

The POST result is stored at a location for further retrieval. The code then resets the download complete bit at the mailbox register and waits for the bit set again by the host.

The second downloaded code 5006 includes at least the following components:

ATMos Operating System

ATM code

Additional codes to the i960 processor DRAM allowing full access into the i960 memory address while the i960 is still in reset. This enables DMA while the processor is reset.

Since the HYDROGEN is a PCI device, it is configured by the POST code during the PCI Device Scan. This assigns resources such as memory, I/O, and interrupt. The POST BIOS dynamically configures and assigns memory, I/O and interrupt resources to the HYDROGEN using Configuration Mechanism One that uses two 32-bit I/O ports located at addresses 0CF8h (CONFIG—ADDRESS) and 0CFCh (CONFIG—DATA). The 0CF8h and 0CFCh registers are used to access into the 64 byte header of the PCI Configuration Registers in the HYDROGEN.

Figure 51:
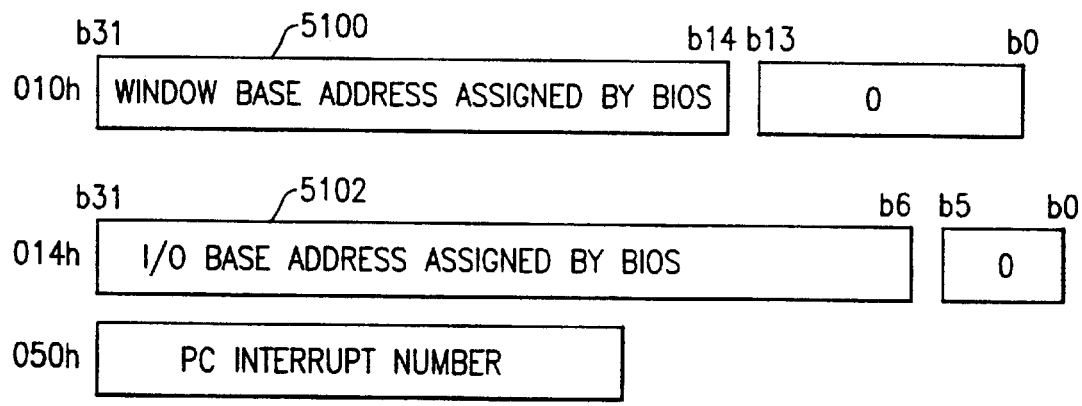
FIG. 51 shows a memory map of the hydrogen chip sets.
Figure 52:
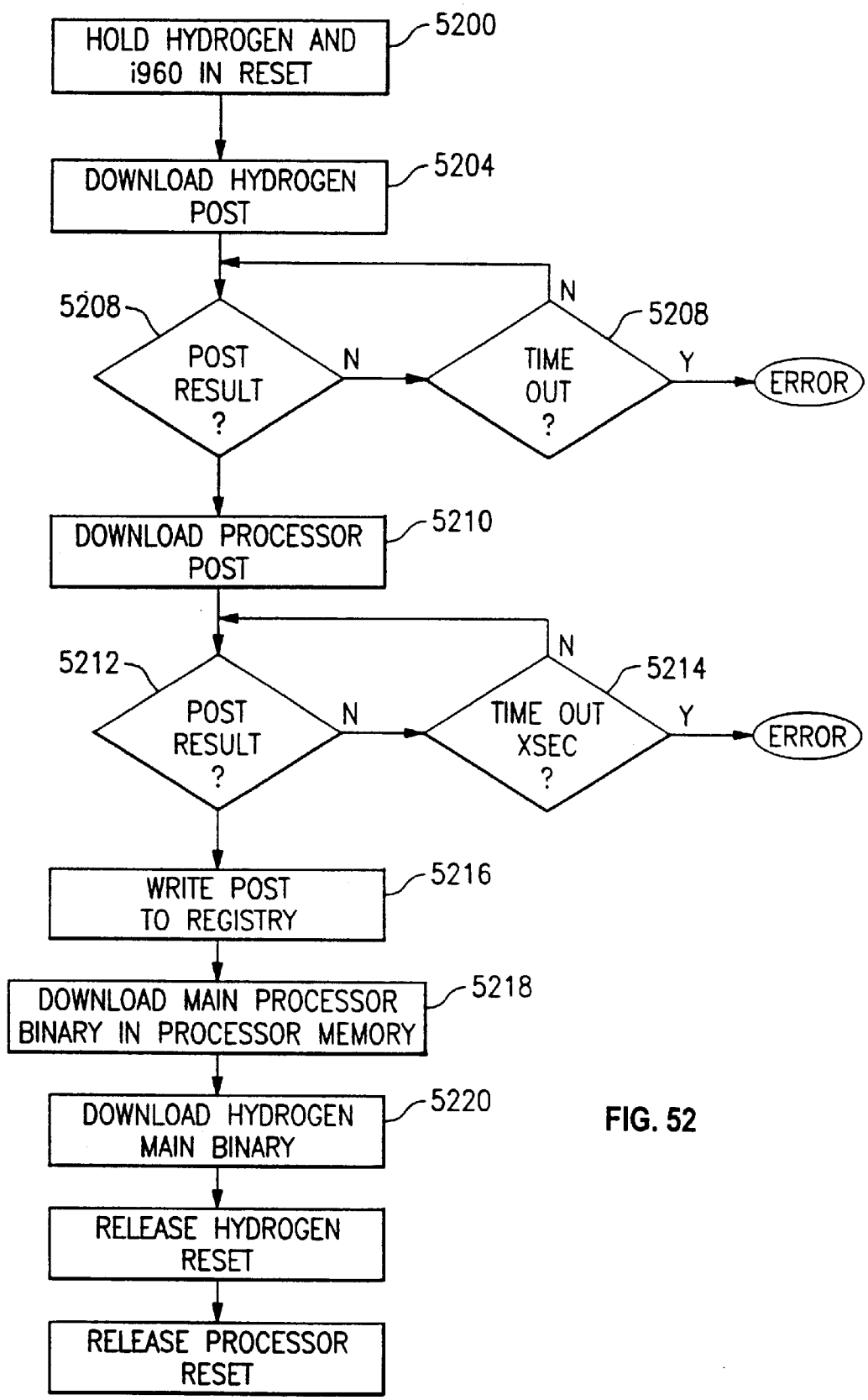
FIG. 52 shows another flowchart of power-up.
Figure 53:
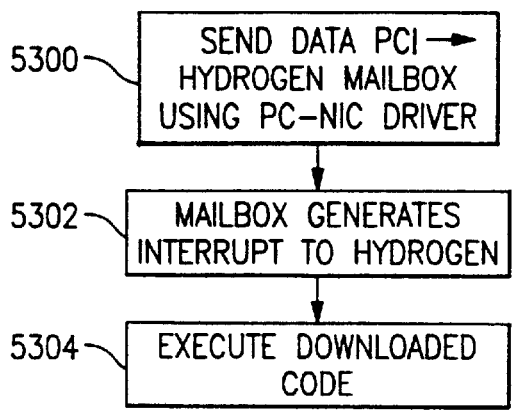
FIG. 53 shows mailbox operations with a hydrogen chip set.

After the configuration, the memory is configured as shown in FIG. 51.

a the 64 byte header 5100 at offset 010h has the memory base address of the 16K memory window used by the NIC window virtual driver to access into the HYDROGEN memory space.

b The 64 byte header 5102 at offset 014h has the I/O base address of the 64 byte window used by the NIC driver to access the HYDROGEN internal registers.

c The 64 byte header at offset 050h has the PC interrupt number(#0h–#0Fh) assigned to this device.

The HYDROGEN chip allows a fixed 16K memory space and 64 byte I/O space access. The values and offsets are defined in the HYDROGEN Data Book.

The sequences of code download on power upon reset are as follow. First, the HYDROGEN and i960 are held in reset at 5200. Then, the system downloads HYDROGEN POST binary at 5204 and waits for POST result. At 5206, a timeout error is established after 1–2 seconds. Step 5210 shows downloading the i960 processor Long or Normal POST binary via the mailbox. Step 5212 monitors for the POST result. The system waits up to xseconds at 5214 for the POST result to be read back from the i960 mailbox. The POST result is 4 bytes=32 bits long with the LSB read first. This 32 bit POST result will allow up to 32 different codes if used as a bitmap, or 2^32 different codes if used as a number. The POST code is written to an address in the numbers Registry name, at 5216 so that the Service Monitor can read the POST code later.

The i960 processor Main binary is downloaded via the mailbox at 5218. Step 5220 downloads the HYDROGEN Main binary. A DMA code is downloaded (5006) that allows access into the memory even though the processor remains in reset. After these downloads are complete, the HYDROGEN is released from reset at 5222, followed by releasing i960 from reset at 5224.

Steps 5216 and 5218 require 4 new registry names to be created by the install script. These include the i960 POST filename; the i960 POST wait time (X seconds at 5214); the POST result code; and the i960 Main filename.

The Long or Normal i960 POST is selectable by users [add] and the registry names are updated accordingly.

Currently, the wait time for the normal POST is 2 seconds and for the Long POST is 2 minutes.

The return code has a one byte unique prefix (0x5A) follows by a 32 bit mapped hex code as shown from first in time to last in time on the report.

| Ox5A | b3 I -b24 MSB only | b23-b16 Unused | b15-b8 Sachem | b7-b0 i960 |
|---|---|---|---|---|
| 1 byte | 1 byte | 1 byte | 1 byte | 1 byte |

In general, a bit value of 0 denotes test pass and a bit value of 1 denotes test fail, except for bit 31.

The normal POST return Code is 0x00000000 meaning there is no errors.

POST return code bit map detail:
b31: always 0 to denote this is a NORMAL POST result
b30–b 12: Not Used (value='0').
b11: Sachem UTOPIA cell loopback configuration.
b10: Sachem Config registers 0x22 and 0x24 return 0 after reset.
b09: Sachem general registers read and write test.
b08: Sachem version register return expected value.
b07: i960 timer0 interrupt test.
b06: Unused
b05: i960 DRAM 16 bit read and write test.
b04: i960 DRAM 8 bit read and write test.
b03: i960 DRAM 32 bit read and write test.
b02: i960 DRAM burst reada test.
b01: i960 DRAM burst write test.
b00: i960 DRAM bit read and write test.

All other bits are unused and should be returned as 0.

Long POST return code: 0x80000000 (No error)

POST return code bitmap detail:
b31: always 1 to denote that this is a LONG POST result
b30: Not used (value='0').
b29: Not used (value='0').
b28: Not used (value='0').
b27: Not used (value='0').
b26: Not used (value='0').
b25: Not used (value='0').
b24: Not used (value='0').
b23: Not used (value='0').
b22: Not used (value='0').
b21: Not used (value='0').
b20: Sachem Interrupt Test Success.
b19: Not used (value='0').
b18: Not used (value='0').
b17: Sachem internal RAM test success.
b16: Sachem internal RAM test completion.
b14: Sachem all registers 0XAA read and write test.
b13: Sachem all registers 0x55 read and write test.
b12: Sachem all registers reset value test.
b11: Not used (value='0').
b10: Sachem single register 0XAA read and write test.
b09: Sachem single register 0x55 read and write test.
b08: Sachem single register reset value test.
b07: i960 timer0 interrupt test.
b06: Not used (value='0').
b05: i960 DRAM 16-bit read and write test.
b04: i960 DRAM 8-bit read and write test.
b03: i960 DRAM 32-bit read and write test.
b02: i960 DRAM burst read test.
b01: i960 DRAM burst write test.
b00: i960 DRAM bit read and write test.

The HYDROGEN and the NIC driver interface through the PCI bus.

The accesses into the HYDROGEN internal memory location(AD[b31–b0]) including internal registers are through an I/O-mapped window. All data transport is via the HYDROGEN DMA channel. The 16K memory-mapped window is not used by the HYDROGEN.

The PC-NIC virtual driver initialization routine first obtains the I/O base address and interrupt number from port OCF8h and OCFCh. Another way to retrieve this information is by using software interrupt 1Ah with function code 0B1h in the AH register and the appropriate sub function code in the AL register. The PCI BIOS documentation provides a complete description of each function call.

The physical I/O base address is then mapped into the window virtual port address. Once the base address is obtained, the PC-NIC driver uses the _inpd( ) function to read/write to the following three 32-bit registers: I/OARMAddress at offset 00, I/OARMData at offset 04, and I/O MailBox at offset 08.

The combination of the I/O base addresses at offset 00 and 04 allows the PC-NIC driver access into the HYDROGEN space. The interrupt number allows the PC-NIC driver to chain its interrupt service routine into the appropriate PC interrupt vector table. The interrupt routine then services the interrupt generated by the INTA pin from the HYDROGEN chip.

The I/O base address at offset 08 is used for interrupt handling. The HYDROGEN Data book provides more information.

The transmit and receive DMA transport/communication data are handled-through the DMA engine in the HYDROGEN's LIST Manager hardware.

I/O Access is handled via the PCIbus,into the HYDROGEN. For clarity, an example of a 64 byte header at offset 014h=0B0A000000h is used. This I/O access is used for all command/response communication between the PC application to the PCIbus, and to the HYDROGEN. This may be directed to the ARM, i960, or SACHEM. The I/O access is also used initially to download HYDROGEN codes into the internal RAM(8K) and the external RAM(1M).

I/O base address+offset 00 store the full 32 bit of HYDROGEN address.

The I/O base address+offset 04 store the data R/W from/to the HYDROGEN address.

```
Sample code : mov dx, #0B0A00000h ;load I/O base address w/off00
              out dx, #10000200h ;write LMSR addr to I/O addr
              mov dx, #0B0A00004h ;load I/O base address w/off04
              in eax, dx           ;read the content of LMSR
              mov eax, #0000AA55h ;or
              out dx, eax          ;write dword to the LMSR reg
```

An interrupt from the PC-NIC driver to HYDROGEN is used primarily for commands/responses to/from communication. There are four PCI MailBox registers (b5–b2) at the I/O base-address with offset 08h. The PC-NIC driver sends data from the PC to this mailbox at 5300. These mailboxes can be read from/written to by the PC-NIC driver to interrupt the HYDROGEN chipset at 5302. Currently, one of the PCI MailBox interrupts is used by the PC-NIC driver to generate a PCILO interrupt to the HYDROGEN.

I/O base address+offset 08h in b5–b2 is used to access the PCI MailBox register. The MailBox register interrupt is to signals the HYDROGEN to start executing the downloaded code at 5304.

```
mov   dx, #0B0A00008h
in    eax, dx ; read the PCI mailbox register
or    eax, #80h     ; set maibox 0 bit
out   eax, dx ; write to PCI mailbox register
```

Figure 54A:
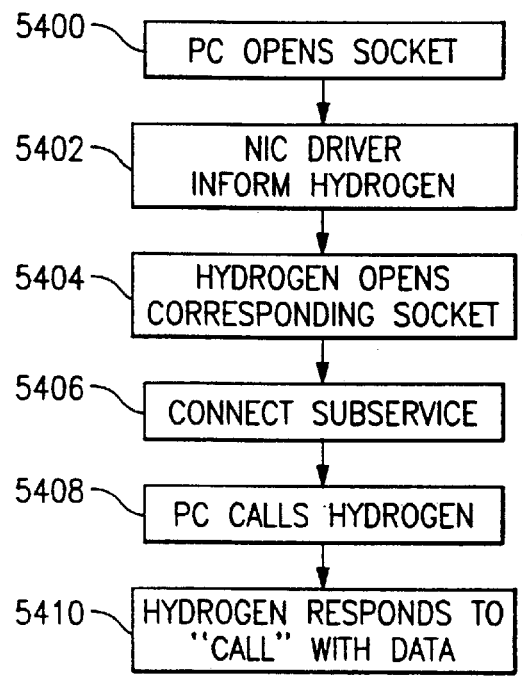
FIG. 54A shows connecting to the hydrogen.
Figure 54B:
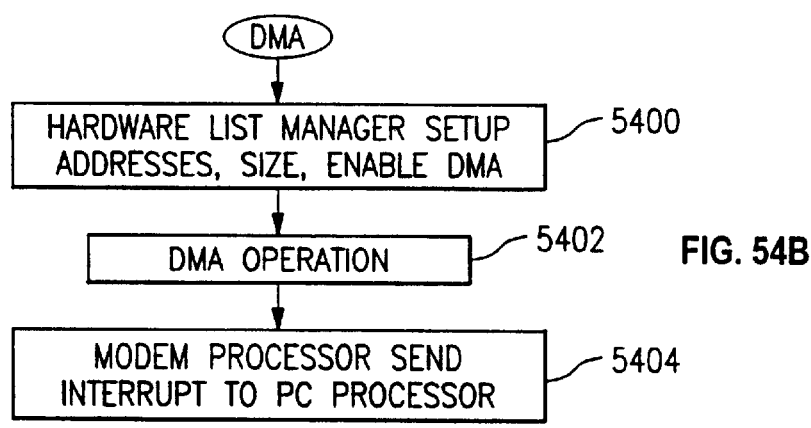
FIG. 54B shows direct memory access to the hydrogen.

Communication data transport and access into the PCI space can also be via the HYDROGEN DMA engine as shown in FIG. 54. In addition, The ARM MailBox register at location 0x10000808 is used to generate/clear interrupts to/from the PCI.

The data transport DMA operation is handled by the hardware List Manager in the HYDROGEN chip once set up. This requires little or no intervention from the ARM processor.

The command/response to/from the PCI is handled by the ARM processor by setting the appropriate List Manager registers for: to address, from address, size of data, and the enable DMA bit at 5400.

An interrupt from the HYDROGEN to the PC-NIb driver is used primary for commands/responses to communication. The ArmMailBox register is set at address 010000808h, as seen from the HYDROGEN. There are four mailboxes at this location that can be read from or written to the HYDROGEN to interrupt the NIC driver. The interrupt is generated by INTA pin. Currently, one of the ARM Mailbox interrupts is used by the. HYDROGEN to generate an interrupt to the NIC driver.

After the DMA operation at 5402, the ARM processor normally sends an interrupt to the PC at 5404 by setting the appropriate bit on the ARMMailBox register. In the same manner, when the ARM processor receives the PCI_LO interrupt from the PC, the PCI data is read into the ARM data by using DMA, then clearing the interrupt bits in the ARMMailBox. The 'to' and 'from' addresses (slots) of both the ARM& PCI are set during the driver and HYDROGEN firmware initialization routine.

Software API

An Application Program Interface (API) between the HYDROGEN and the PC application allows the HYDROGEN to communicate with the PC. The ATMSOCK socket services are used to communicate with the PC-NIC driver. The PC-NIC driver code then passes the request to the HYDROGEN through the PCI bus, using DMA and the mailbox interrupt. Most of the communication to/from the HYDROGEN has been implemented by ATML using ATMSOCK. Any additional communication (specific to ADSL or other) to/from HYDROGEN/ASIC/i960 is implemented with new socket services or modified existing socket services.

The API includes a Modem Control Interface, and a Hydrogen. Control Interface. The Current Implementation uses ATMSOCK.

FIG. 54 illustrates the command/response flow from the very top level software to the HYDROGEN.

From the very top level, the PC application opens an ATMSOCK socket service at 5400. The request is passed into the HYDROGEN code via the PC-NIC driver at 5402. The HYDROGEN responds by opening a corresponding ATM socket service process(AIF SOCKS) at 5404. Here, the PC is the socket client and the HYDROGEN is the socket server. The socket client then requests a sub-service to be connected at 5406 using the socket opened. Current supported subservices include SNMP, used by Vstatus, and VCONS, used by Vcons.

Once the service is established and active, the PC application makes calls into the HYDROGEN code at 5408. At the PC-NIC driver level, all the sqcket-called-data-format are written into a specific pre-allocated PC memory and followed by a PCI mailbox interrupt into the HYDROGEN. The HYDROGEN PCILO ISR then posts a wakeup message to the PC-DDI process in the HYDROGEN. The PC-DDI process then reads the call's data format from PC space into HYDROGEN space by using DMA. The HYDROGEN processes the call's format and makes the appropriate sub-service calls.

Modem Control Interface API uses a new sub-service call CTRL-ADSL. An existing socket(AIF_SOCKS) is used. CTRL-ADSL uses the following definitions and mnemonics:

define AF_HAYES_ADSL (1375)

The VCONS source code is a base code for implementation.

The PC application sends a command to the HYDROGEN at 5408 with the function call send (socket number, command string, length in bytes, 0). Analogously, the PC application receives the response at 5410 with the function call recv (socket number, return buffer, length in bytes, 0).

The complete HOST Commands as described in the management specification herein are passed to the HYDROGEN as part of the command string. The format for the command passing parameters are as follows:

| Destination address | Source address | Command opcode | Length of data. N bytes | N data bytes |
|---|---|---|---|---|
| 1 byte | 1 byte | 1 byte | 1 byte | N bytes |

Destination address: An unsigned character 0–255 for this request intended to. For the management application in the i960, the value for this byte is 0x10.

Source address: An unsigned character 0–255 showing the originator of this command. For the PC application in the Host, like Service Monitor, the value for this byte is 0x01.

Command opcode: An unsigned character 0–255 command opcode.

Length of data. (N bytes): An unsigned character 0–255 indicating if additional data bytes are present. N data bytes: If the previous byte is non zero, there will be N more data bytes.

The PC-DDI process in the HYDROGEN runs an endless loop to constantly check for any call back or response socket services in the queue to be sent back to the PC. The queue is being added by other active socket service processes that are running. The PC-DDI process passes the socket response data format into the PC space DMA followed by an ARM mail box interrupt into the PC. The PC-NIC driver then reads the data and passes the data up the corresponding PC application that owns the socket services.

The return buffer format is very similar to the command string except that the source and destination addresses are swapped.

The "length of data bytes follow" field is usually greater than 1 to hold the response data, which can be 1–255 bytes.

Hydrogen Control Interface (0x20)—Commands

Table 1 lists the Host commands that the Host may issue to the Hydrogen.

TABLE 1

Host Commands

| Command | Opcode | Date Field Length | Data Field Contents |
|---|---|---|---|
| Open PVC connection | 0x01 | Variable | ASCII textstring |
| Close PVC connection | 0x02 | 4 | Binary vpivci |
| Get PVC performance data | 0x03 | 4 | Binary vpivci |
| OAMF4 enable(1)/disable(0) | 0x04 | 1 | BOOL 1 or 0 |
| OAMF5 enable(1)/disable(0) | 0x05 | 1 | BOOL 1 or 0 |
| Get Global statistic counters | 0x06 | 0 | — |
| Get Hydrogen Version | 0x07 | 0 | — |
| Get Hydrogen Vendor | 0x08 | 0 | — |
| Get MAC Address | 0x09 | 0 | — |
| Add NATM Connection | 0x0A | Variable | ASCII textstring |
| Remove NATM Connection | 0x0B | 4 | Binary vpivci |
| Report ADSL Line Sync | 0x0C | 1 | BOOL 1 or 0 |

Open PVC Connection

The Data fields content have the following ASCII format:

Classical IP example:
"proto:pipa/ip:192.120.60.35/vpi:32/yci:110/pcr:3622/class:cbr"

RFC1483 example:
"vpi:255/vci:65535/pcr:500/class:ubr/encap:llcs"

The above strings terminate with a NULL character. The ordering of each key field is important.

The ranges of the above key values are as follows:

$0 <= vpi/vpi <= 255$ $0 < vci/vci <= 65535$ $xxx < pcr < 3622$ $aaa < scr < 3622$ class: cbr, vbr, abr, ubr, ub+ encap: llcs, vcmx, null

Data Field length=strlen(above string)

Close PVC Connection

The Data field contents hasone 32-bit binary value of the vpi-vci that needs to be closed.

| 32-bit vpi-vci | | |
|---|---|---|
| b31 | b15 | b0 |
| 00 vpi | Vci | vci |

Get PVC Performance Data

The Data field contents willh have one 32-bit binary value of the vpi-vci.

| 32-bit vpi-vci | | |
|---|---|---|
| b31 | b15 | b0 |
| 00 vpi | Vci | vci |

OAMF4 Enable/Disable, OAMF5 Enable/Disable

The Data field contents have one byte data value of either 1 (enable) or 0(disable).

Get Global Statistic Counters, Get Hydrogen Version, Get Hydrogen Vender, Get MAC Address No parameters required.

Add NATM Connection

The Data fields content have the following ASCII format:

"vpi:255/vci:65535/pcr:500/class:ubr"

The above strings terminate with a NULL character. The ordering of each key field is IMPORTANT.

The ranges of the above key values are as follows:

$0 <= vpi/vpi <= 255$ $0 < vci/vci <= 65535$ $xxx < pcr < 3622$ class: cbr, vbr

Data Field length=strlen(above string)

The above commands cause the HYDROGEN to add the connection parameters to the NATM table. No physical connection is established. The table list will be used to qualify if a subsequent open NATM connection is allowed.

Del NATM Connection

The Data field contents have one 32-bit binary value of the vpi-vci that needs to be removed.

| 32-bit vpi-vci | | |
|---|---|---|
| b31 | b15 | b0 |
| 00 Vpi | Vci | vci |

The above command removes the corresponding entry from the NATM table. No physical connection is closed.

Report ADSL Line Sync

The Data field contents have one byte data value of either 1 or 0.

1 is ADSL Line Synchronization has been established.

0 is ADSL Line Syncronization has not been established or failed Hydrogen Control Interface (0x20) Responds Table 2 lists the response from Hydrogen to the Host commands in Table 1.

TABLE 2

Host Response

| Response | Opcode | Data Field Length | Data Field Contents |
|---|---|---|---|
| Open PVC connection | 0x01 | 1 | See return code |
| Close PVC connection | 0x02 | 1 | See return code |
| Get PVC performance data | 0x03 | 32 or 1 | Binary |
| OAMF4 enable(1)/disable(0) | 0x04 | 1 | See return code |
| OAMF5 enable(1)/disable(0) | 0x05 | 1 | See return code |
| Get Global statistic counters | 0x06 | 16 | Binary |
| Get Hydrogen Version | 0x07 | Variable | ASCII text |
| Get Hydrogen Vendor | 0x08 | Variable | ASCII text |
| Get MAC Address | 0x09 | 6 | binary |
| Add NATM Connection | 0x0A | 1 | See return code |
| Remove NATM Connection | 0x0B | 1 | See return code |
| Report ADSL Line Sync Ack | 0x0C | 1 | Binary 0 |
| Unsolicited Messages | 0xFE | 1 | Binary |

Open PVC Connection

Return codes:

| | |
|---|---|
| 0 | Success. |
| 1 | Connection already opened and is currently active. |
| 2 | Cannot open connection, exceed maximum connections. |
| 3 | (3 & above) Error opening connection. |

Close PVC Connection

Return codes:

| | |
|---|---|
| 0 | Success. |
| 1 | No such active connection, cannot close. |
| 2 | Connection already closed |

Get PVC performance data

If this fails, the Data field length will be 1 and the Data field contents will have 1 byte return code:

1 No such active connection, data not available

2 Current connection is not active, data not available
Otherwise, the Data field length will be 32 and The Data field contents will have 6 32-bit words as follows:

First in Time:

VP/VCI (32-bit)

Total number of good data bytes transmitted for this PVC (32 bit)

Total number of good data bytes received for this PVC (32 bit)

Total number of bad data bytes received for this PVC (32 bit)

Total number of received cells count discarded for this PVC (32 bit)

Total number of received packets good for this PVC (32 bit)

Total number of received packets bad for this PVC (32 bit)

Time stamp of this command being polled, in seconds (32 bit)

Good data bytes transmitted is the number of data bytes from the PC sent to the HYDROGEN hardware transmit queue.

Good data bytes received is the number of data bytes send to the PC. This normally means the CRC of the data packet is OK.

Bad data bytes received is the number of data bytes received from the network and probably due to payload CRC error, LLC/SNAP header not recognized, and others.

Received cells counts discarded is detected at the very front end of the HYDROGEN hardware receive queue. The discard is probably due to: PTI field>4 in the cell header or no more free buffers (data coming in too fast). 1 cell=53 bytes Received packets good due to payload CRC OK.

Received packets bad due to payload CRC error, unrecognized llc/snap, or others.

**Note 1: The data bytes counters do not include ATM cell header, trailer, or padding.

**Note 2: l packet can be 60 bytes to 1.5K bytes of data.

OAMF4 Enable/Disable, OAMF5 Enable/Disable

This will always return 0.

Get Global Statistic Counters

The Data field length will be 16 and The Data field contents will have 4 32-bit values as follows:

First in time:

Total number of transmitted cells (32 bit)

Total number of received cells good (32 bit)

Total number of received cells discarded (32 bit)

Time stamp of this command being polled, in seconds (32 bit)

Note: A cell is equals to 53 bytes of data.

Received cells discarded due to: Cell header checksum bad and VCI 0 cells

Get Hydrogen Version, Get Hydrogen Vender

The Data field contents is a NULL terminated ASCII text string with a length of less than 255.

The Data field length is the strlen(above text string)

Get MAC Address

The Data field length is 6 and The Data field contents will have 6 bytes of MAC address.

Add NATM PVC Connection

Return codes:

| | |
|---|---|
| 0 | Success |
| 1 | No more free entry in the table. |

Remove NATM PVC Connection

Return codes:

| | |
|---|---|
| 0 | Success |
| 1 | No such connection entry in the table, cannot remove |

Report ADSL Line Sync Ack

The Data field contents has one byte data value of 0. It always return 0

Unsolicited Messages

The Hydrogen sends the following unsolicited 1 byte hex code to the Service Monitor if the following i960 errors have been detected by the HYDROGEN.

Return codes:

1 i960 mailbox not in sync yet. This unsolicited message will be sent to the Service Monitor in the event the HYDROGEN receives a command string destination to i960 and the i960 mailbox sync is not completed.

2 i960 command buffer overflow. This unsolicited message will be sent to the Service Monitor in the event the 32 bytes i960 command buffer is full, the most recent i960 command string will be discarded. Also indicating the i960 is not reading the mailbox, thus the HYDROGEN cannot send another command byte.

3 i960 response buffer exceed maximum, mailbox will be out of sync. This unsolicited message will be sent to the Service Monitor if the i960 send a response buffer greater than the maximum allocated. The mailbox will be out of sync.

HYDROGEN/ASIC Interface

The ASIC registers become an external memory map I/O device to the HYDROGEN.

The HYDROGEN external I/O addresses access reside on the memory block from 020000000h to 03 FFFFFFFh. Only the A23–A16 lines(or less) will be decoded by the ASIC to activate the mailbox register locations.

The register definition in the HWSPEC portion provide further detail. The HYDROGEN uses these registers for command/response communication to the i960.

The disclosed implementation of the communication includes modifying the current AIF_SOCKS process in the HYDROGEN to handle send/receive data to/from i960.

OBC (i960) Firmware

Operating System for the Modem Processor pSOS will be used initially as the pSOS operating system code image generated and downloaded to the i960 DRAM.

Power-on Self Test and.Self-Initialization

At power up, the i960 is held in reset by the ASIC. After the ASIC and the HYDROGEN are initialized, the ASIC allows the HYDROGEN to gain control over the i960 bus. The HYDROGEN downloads the i960 binaries into the i960 DRAM. The ASIC then return the bus control to the i960 and releases i960 out of reset. The downloaded i960 binaries may contain the following components:

i960 power-on self test(POST)

pSOS operating system image which contains the real time kernel, Board Support Package(hardware specific code), X-API, and File system Modem software Management Application code When the i960 is first released out of reset, The POST code is run first and the POST result is passed back to the PC through the mailbox. When the POST result is read, the i960 is put back into reset and the second download of the i960 main binary is go performed. When the i960 is released out of reset, the pSOS is run, followed by modem software and management application.

OBC/SACHEM Interface

The SACHEM becomes a memory map I/O device to the i960 processor. The address above the DRAM(>10000h) is mapped into the SACHEM memory space. The A20–A16 lines are decoded by the ASIC to assert the CSB signal to the SACHEM.

Host Interface Firmware

The ASIC implements a mailbox function for exchanging information between the i960 and the HYDROGEN. The Mailbox has transmit buffer registers(size TBD), receive Buffer registers(size TBD), Status registers. These registers become another memory map I/O device to the i960 processor. The A20–A16 lines are decoded by the ASIC to activate these registers.

The management application uses the mailboxes to send and receive commands/responses to/from the HYDROGEN. The i960 can receive the message by polling or interrupt.

Interrupt

A write to the transmit Buffer by the HYDROGEN causes the ASIC to generate an interrupt to the i960 (INT 1 pin). The i960 INT 1 routine reads the messages into the local buffer, clears the corresponding bit in the Status register, and sets a flag to inform the background routine to process the message.

Polling

The Status register can be checked regularly by the OBC for message full.

Although only a few embodiments have been described in detail above, other embodiments are contemplated by the inventor and are intended to be encompassed within the following claims. In addition, other modifications are contemplated and are also intended to be covered. For example, the present specification refers to the controller being a processor, and the PCI interface being a hydrogen chip set, other devices could alternatively be used.

What is claimed is:

1. A network interface card device for communicating with a plurality of simultaneous communications, comprising:

a register, storing a table including a plurality of simultaneous data transmissions, a subset of said data transmissions formed by a plurality of separated cells of information, where each of the cells have a shorter total length than the data transmission, and each data transmission and each cell of the data transmission are represented by an address;

said table storing contents comprising payloads of said cells and an address, such that each cell contents is added to an entry in said table which represents the address associated with said each cell, and said memory also storing a first variable related to contents of at least a Plurality of said simultaneous data transmissions in said table; and a controller, operating based on a stored instruction set, to receive a cell, to use said variable to search'said table in a way that enables searching less than all of said table, to add said cell to an appropriate entry in said table if an address of said cell is found in said table and to add a new address to said table if said address of said cell is not found in said table, wherein said controller also detects an end of message, and removes an entry corresponding to the ended message from said table and wherein there is a second variable related to a number of connections, and wherein said controller is operative to determine whether a blank space exists in said table by comparing said first variable to said second variable.

2. A device as in claim 1, wherein said controller compares said first variable to said second variable, adds a new entry at the end of the table if said first variable equals said second variable, and searches from a lowest value to a value of said first variable if said first and second variables are not equal.

3. A method of receiving a multi-part message at a receiver, comprising:

receiving cells at said receiver, each cell forming a portion of said multi-part message and including an address associated therewith;

maintaining, at said receiver, a table where each entry in said table refers to a specific address;

maintaining at said receiver, a first variable indicating a last-used index in said table and a second variable indicating a number of active connections in said table;

determining an open spot in said table to use by comparing first and second variables to one another; and comparing an address of an incoming cell to all existing addresses in said table by searching only between a lowest possible index and a value of said first variable.

4. A method as in claim 3 further comprising detecting a match in said searching, and terminating said search.

5. A method as in claim 3 further comprising detecting no match in said searching, and defining a new location in said table.

6. A method of operating an asynchronous transfer mode (ATM) system, comprising:

receiving a plurality of simultaneous messages, each of said simultaneous messages being formed of a plurality of separated cells with addresses which cells collectively have data forming the simultaneous messages;

maintaining a table in memory which stores said data associated with said addresses;

detecting a new message, which does not have a previous entry in said table; and finding a new location in said table further comprising storing two variables associated with said plurality of simultaneous messages, one of said variables relating to a number of active messages, another of said variables related to a size of the table, said new location being found by searching fewer than all locations in said table by comparing said variables to one another wherein if said variables are equal, establishing a new value at the end of the table.

7. A method as in claim 6 wherein if said variables are not equal, searching less than all of said table to find a blank space in the table.

8. A method of operating in asynchronous transfer mode, comprising:

maintaining a table in memory having a plurality of simultaneously-transmitted messages, each message transmitted as a plurality of separated cells, said table associating cells that are related to one another;

receiving a new cell;

receiving an address of said new cell from the new cell;

removing the address from said new cell to leave information without said address;

forming a first variable associated with said table which represents a last value in said table which is active;

forming a loop from a minimum value to said first variable to examine one or more address entries in said table;

at each point in said loop, comparing said removed address to one of said address entries in said table equivalent to a current loop position; and adding said information from said cell to said table in a location associated with a current address entry, when the removed address matches the address entry in the table equivalent to the current loop position.

9. A method as in claim 8 further comprising detecting no matches, and adding a new connection.

10. A method as in claim 8 or 9 further comprising a second variable related to a number of active connections, and wherein said second variable is incremented when a new connection is added.

11. A method for supporting a flexible addressing scheme for an ADSL interface using a VP/VCI value in a header of a cell, said VP/VCI value being within a range of connection values, said method comprising:

determining a first entry of a table for storage of a new VP/VCI value, said table having a number of table entries, said number of table entries being less than the number of connection values in said range;

storing a predetermined one of said connection values in said first entry;

receiving said cell;

extracting said VP/VCI value from said cell;

comparing said VP/VCI value to entries in said table in a sequential manner;

determining a match when said VP/VCI value is present in one of said entries; and passing the contents of said one of said entries and said cell to a processor for further processing when said match is determined wherein determining a first entry includes:

comparing a null value to entries in said table in a sequential manner, said null value being outside said range of connection values;

determining a null match when said null value is present in one of said entries; and setting said first entry as said one of said entries wherein said first entry replaces said null value when said null match occurs.

12. The method as in claim 11 including the steps of:

determining an additional entry of said table for storage of a connection value; and storing an additional predetermined one of said connection values in said additional entry.

13. The method as in claim 12 further including the steps of:

recognizing a delete connection value;

comparing said delete connection value to entries in said table in a sequential manner;

determining a match when said delete connection value is present in one of said entries; and storing said null value in said one of said entries.

14. The method as in claim 13 further including the steps of:

recognizing an additional connection value;

repeating said step of determining said additional entry of said table.

15. A method for supporting a flexible addressing scheme for an ADSL interface using a VP/VCI value in a header of a cell, said VP/VCI value being within a range of connection values, said method comprising the steps of:

setting a num of conn variable equal to zero;

setting a last index variable equal to zero;

determining a first entry of a table for storage of a new VP/VCI value;

said table having a number of entries, said number of entries being less than the number of connection values in said range, including;

setting said first entry equal to said last index;
incrementing said last index;
incrementing said num of conn;
storing said new VP/VCI value in said first entry;
receiving said cell;
extracting said VP/VCI value from said cell;
comparing said VP/VCI value to entries in said table in a sequential manner starting with said first entry and ending at said last index;
determining a match when said VP/VCI value is Present in one of said entries;
passing the contents of said one of said entries and said cell to a processor for further processing when said match is determined;
determining an additional entry of said table for storage of a connection, including;
   setting said additional entry equal to said last index, incrementing said last index, incrementing said num of conn;
   storing an additional predetermined one of said VP/VCI values in said additional entry;
   recognizing a delete connection value;
   comparing said delete connection value to entries in said table in a sequential manner starting with said first entry and ending at said last index;
   determining a match when said delete connection value is present in one of said entries;
   storing a null value in said one of said entries, said null value being outside said range of connection values; and
   decrementing said num_of_conn.

16. The method as in claim 15 including the steps of:

recognizing a second additional connection value;

determining a second additional entry of said table for storage of a connection value, said step of determining a second additional entry including;
   setting said second additional entry equal to said last-index, incrementing said last-index, and incrementing said num_of_conn;
   comparing said null value to entries in said table in a sequential manner starting with said first entry and ending at said last-index;
   determining a match when said null value is present in one of said entries;
   setting said second additional entry equal to said one of said entries when said match is determined, decrementing said last-index when said match is determined; and storing said second additional connection value in said second additional entry.

17. A system for supporting a flexible addressing scheme for an ADSL interface using a VP/VCI value in a header of a cell, said VP/VCI value being within a range of connection values, said system comprising:

first means for determining a first entry of a table for storage of a new VP/VCI value, said table having a number of table entries, said number of table entries being less than the number of connection values in said range;

second means for storing a predetermined one of said connection values in said first entry;

third means for receiving said cell;

fourth means for extracting said VP/VCI value from said cell;

fifth means for comparing said VP/VCI value to entries in said table in a sequential manner;

sixth means for determining a match when said VP/VCI value is present in one of said entries;

seventh means for passing the contents of said one of said entries and said cell to a processor for further processing when said match is determined;

an additional determining means for determining an additional entry of said table for storage of a another VP/VCI value, said second means storing an additional predetermined one of said connection values in said additional entry, wherein said additional determining means includes:
   a comparing means for comparing a null value to entries in said table in a sequential manner, said null value being outside said range of connection values;
   a determining means for determining a null match when said null value is present in one of said entries; and
   a setting means for setting said additional entry as said one of said entries.

18. The system as in claim 17 further including:

a recognizing means for recognizing a delete connection value, said comparing means comparing said delete connection value to entries in said table in a sequential manner, said determining means determining a match when said delete connection value is present in one of said entries, and said second means storing said null value in said one of said entries.

19. The system as in claim 18 wherein said recognizing means recognizing an additional connection value and said additional determining means determining said additional entry of said table.

\* \* \* \* \*

UNITED STATES PATENT AND TRADEMARK OFFICE
CERTIFICATE OF CORRECTION

PATENT NO. : 6,836,483 B1
APPLICATION NO. : 09/338935
DATED : December 28, 2004
INVENTOR(S) : Kenny Ying Theeng Lee It is certified that error appears in the above-identified patent and that said Letters Patent is hereby corrected as shown below:

In the Claims:

Claim 1 (column 84, line 46): delete "Plurality" and insert thereof --plurality-- after "of at least a" and before "of said simultaneous data trans-"

Claim 1 (column 84, line 49): delete " ' " (apostrophe punctuation) after "receive a cell, to use said variable to search" and before "said table"

Claim 6 (column 85, line 24): delete "piurality" and insert thereof --plurality-- after "receiving a" and before "of simultaneous messages, each of"

Claim 11 (column 86, lines 8, 9, 12, 19, 20 and 23): delete "VP/VCI" and insert thereof --VPI/VCI--

Claim 15 (column 86, lines 57, 58, and 64): delete "VP/VCI" and insert thereof --VPI/VCI--

Claim 15 (column 86, lines 60): delete "num of conn" and insert thereof --num_of_conn-- after "setting a" and before "available equal to zero" (the underscore punctuation is not visible due to the underline style).

Claim 15 (column 87, lines 3 and 19): delete "num of conn" and insert thereof --num_of_conn-- (the underscore punctuation is not visible due to the underline style).

UNITED STATES PATENT AND TRADEMARK OFFICE
CERTIFICATE OF CORRECTION

PATENT NO. : 6,836,483 B1
APPLICATION NO. : 09/338935
DATED : December 28, 2004
INVENTOR(S) : Kenny Ying Theeng Lee It is certified that error appears in the above-identified patent and that said Letters Patent is hereby corrected as shown below:

Claim 15 (column 87, lines 4, 6, 7, 10 and 21: delete "VP/VCI" and insert thereof --VPI/VCI --

Claim 15, (column 87, line 11): delete "Present" and insert thereof --present-- before "in one of said entries;"

Claim 17 (column 88, lines 2, 3, 6, 14, 16 and 18): delete "VP/VCI" and insert thereof --VPI/VCI--

Signed and Sealed this

Twelfth Day of June, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,836,483 B1 |
| APPLICATION NO. | : 09/338935 |
| DATED | : December 28, 2004 |
| INVENTOR(S) | : Kenny Ying Theeng Lee |

It is certified that error appears in the above-identified patent and that said Letters Patent is hereby corrected as shown below:

In the Claims:

Claim 1 (column 84, line 46): delete "Plurality" and insert thereof --plurality-- after "of at least a" and before "of said simultaneous data trans-"

Claim 1 (column 84, line 49): delete " ' "(apostrophe punctuation) after "receive a cell, to use said variable to search" and before "said table"

Claim 6 (column 85, line 24): delete "piurality" and insert thereof --plurality-- after "receiving a" and before "of simultaneous messages, each of"

Claim 11 (column 86, lines 8, 9, 12, 19, 20 and 23): delete "VP/VCI" and insert thereof --VPI/VCI--

Claim 15 (column 86, lines 57, 58, and 64): delete "VP/VCI" and insert thereof --VPI/VCI--

Claim 15 (column 86, lines 60): delete "num of conn" and insert thereof --num_of_conn-- after "setting a" and before "available equal to zero" (the underscore punctuation is not visible due to the underline style).

Claim 15 (column 87, lines 3 and 19): delete "num of conn" and insert thereof --num_of_conn-- (the underscore punctuation is not visible due to the underline style).

UNITED STATES PATENT AND TRADEMARK OFFICE
CERTIFICATE OF CORRECTION

PATENT NO. : 6,836,483 B1
APPLICATION NO. : 09/338935
DATED : December 28, 2004
INVENTOR(S) : Kenny Ying Theeng Lee It is certified that error appears in the above-identified patent and that said Letters Patent is hereby corrected as shown below:

Claim 15 (column 87, lines 4, 6, 7, 10 and 21: delete "VP/VCI" and insert thereof --VPI/VCI --

Claim 15, (column 87, line 11): delete "Present" and insert thereof --present-- before "in one of said entries;"

Claim 17 (column 88, lines 2, 3, 6, 14, 16 and 18): delete "VP/VCI" and insert thereof --VPI/VCI--

Signed and Sealed this

Twenty-sixth Day of June, 2007

JON W. DUDAS
*Director of the United States Patent and Trademark Office*